United States Patent
Van de Velde et al.

(10) Patent No.: US 8,196,818 B2
(45) Date of Patent: *Jun. 12, 2012

(54) APPARATUS AND METHOD FOR INTEGRATED PAYMENT AND ELECTRONIC MERCHANDISE TRANSFER

(75) Inventors: Eddy L. H. Van de Velde, Leuven (BE); David A. Roberts, Warrington (GB); Patrik Smets, Nijlen (BE); Duncan Garrett, London (GB); Jean-Paul Rans, Glabais (BE)

(73) Assignee: Mastercard International Incorporated, Purchase, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 12/701,998

(22) Filed: Feb. 8, 2010

(65) Prior Publication Data

US 2010/0252624 A1 Oct. 7, 2010

Related U.S. Application Data

(63) Continuation-in-part of application No. 12/102,472, filed on Apr. 14, 2008, now Pat. No. 7,681,788, which is a continuation of application No. 11/478,185, filed on Jun. 29, 2006, now Pat. No. 7,374,082.

(60) Provisional application No. 60/699,015, filed on Jul. 13, 2005, provisional application No. 61/173,471, filed on Apr. 28, 2009.

(51) Int. Cl.
G06K 5/00 (2006.01)
(52) U.S. Cl. ........................ 235/380; 235/382
(58) Field of Classification Search .................. 235/380, 235/382, 383, 384; 705/41, 44, 26
See application file for complete search history.

(56) References Cited

U.S. PATENT DOCUMENTS 6,101,477 A 8/2000 Hohle
(Continued)

FOREIGN PATENT DOCUMENTS

EP 0911 762 7/2006
(Continued)

OTHER PUBLICATIONS

Korean Patent Application 10-2008-7003090, Office Action dated Nov. 11, 2011.
(Continued)

*Primary Examiner* — Daniel StCyr
(74) *Attorney, Agent, or Firm* — Otterstedt, Ellenbogen & Kammer, LLP

(57) ABSTRACT

Interrogation of an electronic device by a first terminal is facilitated, to obtain an account number associated with the electronic device. The electronic device is configured according to a payment specification. The first terminal has a first terminal payment module configured according to the payment specification and a first terminal electronic merchandise module configured according to the electronic merchandise infrastructure and coupled to the first terminal payment module to permit transfer of non-payment e-merchandise related information from the first terminal electronic merchandise module to the first terminal payment module. The interrogation of the electronic device is performed by the first terminal payment module. Generation of non-payment e-merchandise related information by the first terminal electronic merchandise module is facilitated. Transfer of the non-payment e-merchandise related information from the first terminal electronic merchandise module to the electronic device via the first terminal payment module, within a transaction between the electronic device and the first terminal payment module that is conducted in accordance with the payment specification, is also facilitated. The non-payment e-merchandise related information is stored on the electronic device in accordance with the payment specification. The electronic device and the first terminal independently calculate a summary data item. The first terminal calculates a first message authentication code based on the non-payment e-merchandise related information and a terminal-calculated value of the summary data item. The non-payment e-merchandise related information is stored on the electronic device together with an electronic device-calculated value of the summary data item and the first message authentication code.

22 Claims, 25 Drawing Sheets

U.S. PATENT DOCUMENTS

| | | | |
|---|---|---|---|
| 6,119,945 A * | 9/2000 | Muller et al. | 235/492 |
| 6,375,084 B1 | 4/2002 | Stanford | |
| 6,398,110 B1 * | 6/2002 | Kikuchi | 235/384 |
| 6,402,038 B1 | 6/2002 | Stanford | |
| 7,374,082 B2 * | 5/2008 | Van de Velde et al. | 235/380 |
| 7,681,788 B2 * | 3/2010 | Van de Velde et al. | 235/380 |
| 2001/0018660 A1 | 8/2001 | Sehr | |
| 2002/0147907 A1 | 10/2002 | Ross | |
| 2003/0097344 A1 | 5/2003 | Chaum et al. | |
| 2003/0154169 A1 | 8/2003 | Yanai | |
| 2004/0238624 A1 * | 12/2004 | Nakano et al. | 235/380 |
| 2006/0049258 A1 | 3/2006 | Piikivi | |
| 2007/0012763 A1 | 1/2007 | Van de Velde et al. | |
| 2007/0215697 A1 | 9/2007 | Ward et al. | |
| 2008/0082452 A1 | 4/2008 | Wankmueller et al. | |
| 2008/0126398 A1 | 5/2008 | Cimino | |
| 2008/0179403 A1 | 7/2008 | Endlebardt et al. | |
| 2008/0251580 A1 | 10/2008 | Van de Velde et al. | |
| 2008/0301056 A1 | 12/2008 | Weller et al. | |

FOREIGN PATENT DOCUMENTS

| | | |
|---|---|---|
| GB | 2443489 | 5/2008 |
| JP | Hei No. 11-120391 | 4/1999 |
| JP | 2004227463 | 8/2004 |
| JP | 2004287805 | 10/2004 |
| KR | 2005-0006131 | 1/2005 |
| NL | 930 1902 | 6/1995 |
| WO | WO 03/081832 | 10/2003 |

OTHER PUBLICATIONS

Japanese Patent Application 2008-521536, Office Action mailed Feb. 1, 2012 (English Translation).

* cited by examiner

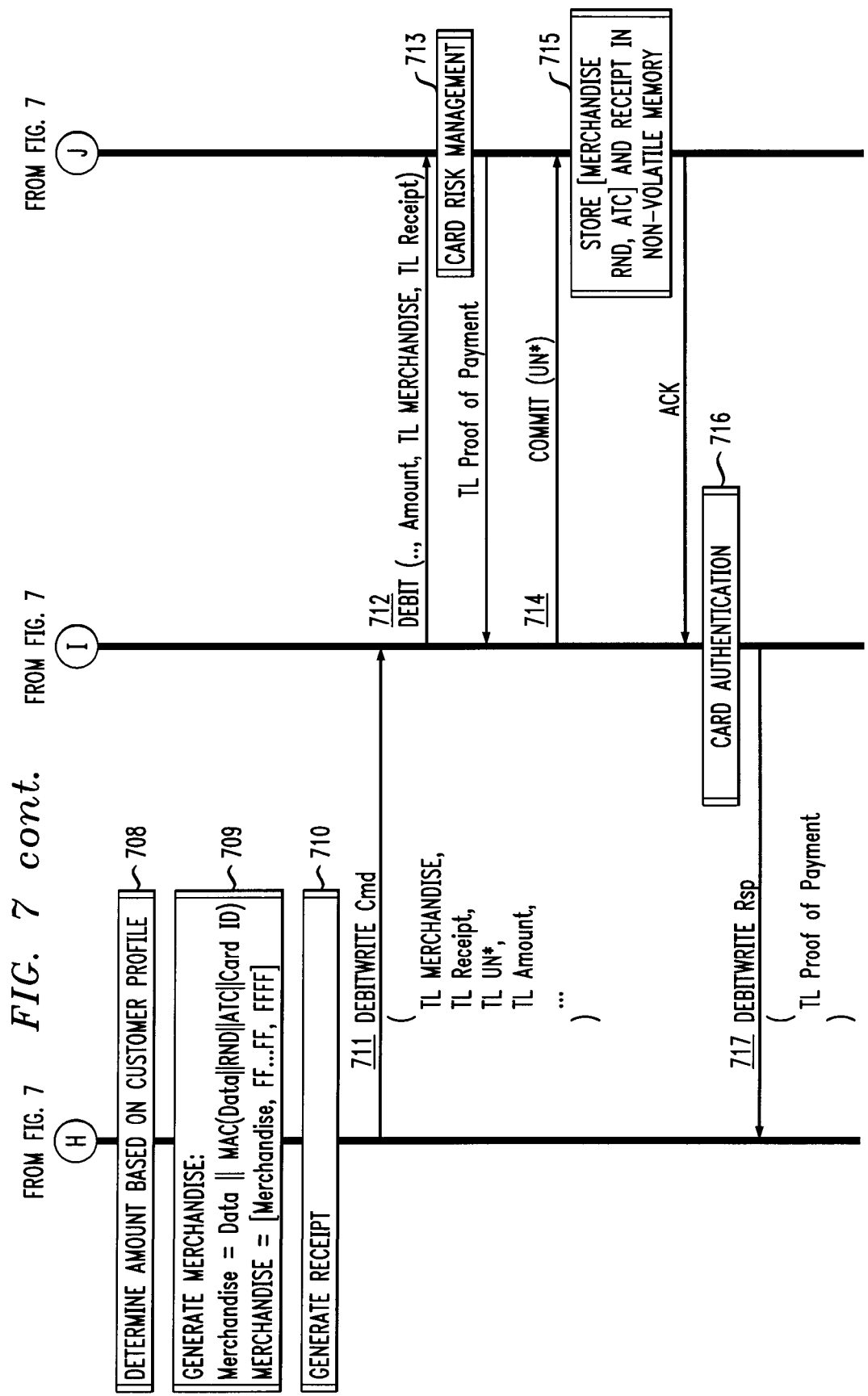

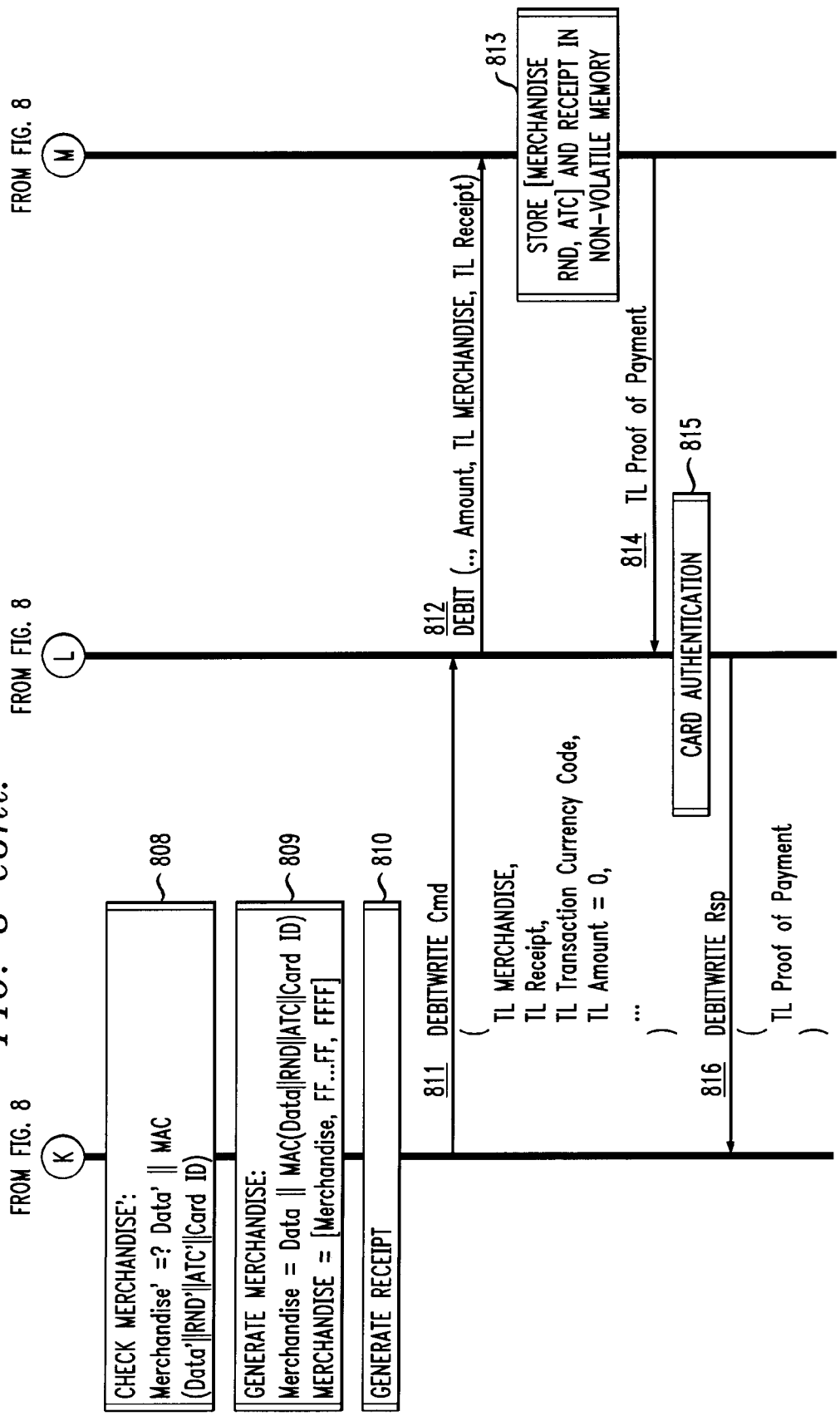

FIG. 14

DATA RETURNED LINKED TO THE READING OF A SLOT

| DATA ELEMENT | MEANING | MATCH | | NO MATCH |
|---|---|---|---|---|
| | | ACTIVATED | DEACTIVATED | |
| DS_SMC | THE TYPE OF DATA CURRENTLY STORED IN THE SLOT | ✓ | ✓ | |
| DS_ODS_CARD | THE DATA CURRENTLY STORED IN THE SLOT | ✓ | | |
| DS_SUMMARY_1 | THE HASH OF IMPORTANT TRANSACTION AND CONTEXT DATA AT THE TIME THE DATA WAS STORED | ✓ | | ✓ |

FIG. 15
DATA RETURNED LINKED TO THE WRITING TO A SLOT

| DATA ELEMENT | MEANING |
|---|---|
| DS_SA | OPTIONS FOR STORING DATA IN THE SLOT (PERMANENT AND/OR VOLATILE) |
| DS_UN | AN UNPREDICTABLE NUMBER FROM THE CARD |

FIG. 16
RELEVANCE OF DS_INPUT_T AND DS_DIGEST

| CURRENT TYPE OF DATA (AS PER DS_SMC) | FUTURE TYPE OF DATA (AS PER DS_ODS_INFO) | DS_INPUT_T VALIDATED | DS_DIGEST REPLACED |
|---|---|---|---|
| PERMANENT | PERMANENT | ✓ | ✓ |
| PERMANENT | VOLATILE | ✓ | ✓ |
| VOLATILE | PERMANENT | ✓ | ✓ |
| VOLATILE | VOLATILE | ✗ | ✗ |

Note: Additional table (top of figure) — SLOT ALREADY ALLOCATED (DEACTIVATED / ACTIVATED ✓) | SLOT NOT ALREADY ALLOCATED (✓); row: IF DS_SA ≠ NO SLOT IS AVAILABLE / IF DS_SA ≠ NO SLOT IS AVAILABLE

FIG. 17

LAYOUT OF ICC DYNAMIC DATA

| DATA ELEMENT | LENGTH |
|---|---|
| ICC DYNAMIC NUMBER LENGTH | 1 |
| ICC DYNAMIC NUMBER | 8 |
| CRYPTOGRAM INFORMATION DATA (CID) | 1 |
| APPLICATION CRYPTOGRAM (AC) | 8 |
| HASH RESULT | 20 |
| DS_SUMMARY_2 | 8 |
| DS_SUMMARY_3 | 8 |

FIG. 19

SECURITY PROPERTIES

| ID | PROPERTY |
|---|---|
| P.1 | WRITE ACCESS CONTROL, THAT IS, ONLY THE LEGITIMATE OWNERS OF A PERMANENT SLOT IS ALLOWED TO WRITE DATA IN THAT SLOT. THE LEGITIMATE OWNERS OF A SLOT ARE THE CARD ISSUER OR THE OPERATOR HAVING BEEN ASSIGNED THE SLOT BY THE CARD ISSUER. THE CARD ISSUER MAY WRITE DATA IN THE SLOT EITHER BEFORE THE SLOT IS ASSIGNED TO AN OPERATOR OR SUBSEQUENTLY THROUGH SLOT UPDATE BY MEANS OF SCRIPTING. |
| P.2 | DATA CLONING PROTECTION, THAT IS, DATA VALID FOR ONE CARD AND BEING REWRITTEN BY ANOTHER PARTY THAN THE LEGITIMATE OWNERS OF THE SLOT, EITHER ON THE SAME CARD OR ON ANOTHER CARD OR DEVICE, CANNOT BE SUBSEQUENTLY ACCEPTED AS GENUINE BY AN OPERATOR TERMINAL. HAVING WRITE ACCESS TO SLOT BY MEANS OF SCRIPTING, THE CARD ISSUER IS IN A POSITION TO CLONE DATA. |
| P.3 | DATA INTEGRITY PROTECTION, THAT IS, ANY MODIFICATION TO DATA WRITTEN ON THE CARD WILL BE DETECTED WHEN DATA IS READ FROM THE CARD BY THE OPERATOR |
| P.4 | CONDITIONAL WRITE OF DATA LINKED TO THE SUCCESS (AND THE DETAILS) OF A PARTICULAR PAYMENT TRANSACTION |
| P.5 | WRITE CONFIRMATION, THAT IS, IT MUST NOT BE FEASIBLE TO REMOVE THE CARD EARLY AND RECEIVE GOODS WITHOUT LEAVING AN EVIDENCE OF PAYMENT WITH THE OPERATOR |

*FIG. 20*

SECURITY MECHANISMS

| ID | MECHANISM |
|---|---|
| M.1 | PARALLEL COMPUTATION OF SUMMARY BY CARD AND OPERATOR TERMINAL AT DATA WRITING TIME |
| M.2 | USE OF AN OPERATOR-PROPRIETARY MAC ON BOTH OPERATOR DATA AND SUMMARY |
| M.3 | INCLUSION OF SUMMARY IN INPUT TO CDA SIGNATURE COMPUTATION |
| M.4 | CONDITIONAL WRITE, THAT IS, THE CARD DOES NOT STORE THE ODS IF THE APPLICATION CRYPTOGRAM PROVIDED BY THE CARD IS DIFFERENT FROM THE APPLICATION CRYPTOGRAM REQUESTED BY THE TERMINAL |
| M.5 | INCLUSION OF TRANSACTION DETAILS AND TYPE OF CRYPTOGRAM IN INPUT TO SUMMARY COMPUTATION |
| M.6 | COMPUTATION OF CDA SIGNATURE FOR ANY TYPE OF AC GENERATED (INCLUDING AAC) WHEN REQUESTED BY THE TERMINAL |
| M.7 | VALIDATION BY OPERATOR TERMINAL OF DSID AGAINST AUTHENTICATED CARD PAN AND PSN |
| M.8 | CARD-BASED CREDENTIALS VALIDATION (DIGEST) |
| M.9 | INCLUSION OF CARD-GENERATED RANDOM AND DSID IN INPUT TO SUMMARY COMPUTATION |
| M.10 | OPERATOR DATA WRITING DEFERRED TO 2nd GEN AC OR UPDATE OF TEMPORARY GOODS ON A SECOND TRANSACTION FOLLOWING PAYMENT APPROVAL BY THE ISSUER |

FIG. 24

SECURITY MECHANISM COVERAGE

|     | M.1 | M.2 | M.3 | M.4 | M.5 | M.6 | M.7 | M.8 | M.9 | M.10 |
|-----|-----|-----|-----|-----|-----|-----|-----|-----|-----|------|
| P.1 |     |     |     |     |     |     |     | X   |     |      |
| P.2 | X   | X   | X   |     |     |     |     |     | X   |      |
| P.3 |     | X   |     |     |     |     |     |     |     |      |
| P.4 |     |     |     | X   | X   |     |     |     |     |      |
| P.5 |     |     |     |     |     | X   | X   |     |     | X    |

APPARATUS AND METHOD FOR INTEGRATED PAYMENT AND ELECTRONIC MERCHANDISE TRANSFER

CROSS-REFERENCE TO RELATED APPLICATIONS

This application is a continuation-in-part of U.S. patent application Ser. No. 12/102,472 (Now U.S. Pat. No. 7,681, 788), filed Apr. 14, 2008, which is a continuation of U.S. patent application Ser. No. 11/478,185 (Now U.S. Pat. No. 7,374,082), filed Jun. 29, 2006, which in turn claims the benefit of U.S. Provisional Patent Application Ser. No. 60/699,015 filed on Jul. 13, 2005, and entitled "Ticketing Extended Contactless Payment Device." This application also claims the benefit of U.S. Provisional Patent Application 61/173,471 filed on Apr. 28, 2009 entitled "M/CHIP 4 RELEASE 2 (PAYMENT CARD APPLICATION) (A&B)" of inventors Cowen et al. The disclosure of the aforementioned Provisional Patent Application Ser. No. 60/699,015, including the complete appendix thereof, the disclosure of the aforementioned U.S. patent application Ser. No. 11/478,185 (Now U.S. Pat. No. 7,374,082), and the disclosure of the aforementioned U.S. patent application Ser. No. 12/102,472 are all expressly incorporated herein by reference in their entireties for all purposes.

FIELD OF THE INVENTION

The present invention relates generally to the electronic and computer arts, and, more particularly, to apparatus and methods for electronic payments and electronic merchandise transfer.

BACKGROUND OF THE INVENTION

Typically, payment transactions and delivery of electronic merchandise (also known as "e-merchandise"; the terms are used interchangeably herein) are handled by separate infrastructures. For example, a payment transaction may be conducted using a payment card or other payment device, together with an infrastructure that handles only the payment. Similarly, delivery of e-merchandise (for example, electronic tickets, tokens, digital credentials, movies, music, loyalty points, benefit coupons, vouchers, data, a cryptographic key or "unlock" code, and similar non-physical items) is handled by a separate, perhaps complimentary, infrastructure which may invoke the payment infrastructure in order to charge for the goods as a separate process.

Netherlands Patent Application No. NL9301902, published Jun. 1, 1995, of Nederland PTT, discloses a method for the acquisition of the right to a specific facility by means of a smart card. The acquisition of the right is performed via a terminal and a control system. The right to the facility can be an access or a usage right. A smart card or other registration device is used to aid the access. The smart card is used not only to pay for the required facility, but as a registration and validation means to replace paper tickets. Thus, the same smart card can be used for the purchase of the right to a future facility, for the payment thereof, and for the subsequent use of the facilities, that is, the exercise of the purchased right.

U.S. Pat. No. 6,375,084 of Stanford et al., issued Apr. 23, 2002, describes card charging systems. A host ticket facility is operable by both credit cards usable at a card read/write device and concessionary payment cards usable at a contactless card reader, and a security and transaction device located between the card readers and the host facility stores in separate storage devices full fares and concessionary fares which the host facility is able to calculate. A card charging system is described, having one or more card readers and a security and transaction device connected between the card readers and a host facility for transmitting information back to a clearing center. U.S. Pat. No. 6,402,038 of Stanford et al., issued Jun. 11, 2002, appears to be similar to the Stanford et al. '084 reference just described.

U.S. Pat. No. 6,101,477 of Hohle et al., issued Aug. 8, 2000, discloses methods and apparatus for a travel-related multi-function smart card. In one embodiment, the smart card system includes a card holder identification application and various additional applications useful in particular travel contexts, for example, airline, hotel, rental car and payment-related applications. Memory space and security features within specific applications provide partnering organizations, such as airlines, hotel chains, and rental car agencies, the ability to construct custom and secure file structures.

United States Patent Publication No. 2006/049258 of Piikivi, published Mar. 9, 2006, discloses a wireless communication device providing a contactless interface for a smart card reader. A wireless terminal including a smart card application host, such as a contact smart card or the terminal or a terminal security component, and including a terminal interface, and also including a smart card router that enables RF communication with a contactless card reader in a ticketing system is provided. The smart card application host does not contain a contactless interface. The smart card router includes an RF antenna, separate from and external to the smart card application host, as well as a modulator/demodulator and a card access module and router for routing communication traffic arriving via the RF antenna to either the smart card application host or to the terminal interface, based on information included in the arriving communication traffic.

United States Patent Application Publication No. 2002/0147907 of Ross, published Oct. 10, 2002, is directed to a system for authorizing transactions using specially formatted smart cards. The transaction system includes the use of a fixed data structure that allows multiple point-of-sale systems to recognize and access a transaction card regardless of upper-level user interfaces. The smart card includes a memory with a defined data file structure, and the data file structure includes at least one read-only field, at least one encrypted read/write field, and at least one non-encrypted read/write field. The smart card can be utilized in a transaction system and the smart card authorization device interacts with a defined data file structure provided on the smart card.

United States Patent Application Publication No. 2001/0018660 of Sehr, published Aug. 30, 2001, is directed to an electronic ticketing system and methods utilizing multi-service visitor cards. A plurality of entities are encompassed, such as an event organizer, admission center, service providers and a visitor population, so as to automatically compile, issue, utilize and process ticketing cards for the admission to leisure and entertainment events, and for other card-based entitlements. The portable ticketing cards are realized by smart credit and/or debit card technology and have the ability to store in the card a computerized ticket template or electronic credit points, or to deduct from the card a monetary value or award points previously loaded onto the card. Biometrics identification of card holders, as well as cryptographic certification of card data and database information, can optionally be encoded into the cards, and can be verified and validated at various point-of-service locations upon presentation of the card for admission and for other services.

Prior art techniques inefficiently employ separate and unlinked payment and e-merchandise (e.g., ticketing) infrastructures and transactions.

It would be desirable to overcome the deficiencies of prior art techniques.

SUMMARY OF THE INVENTION

Principles of the present invention provide techniques that permit the efficient combination of payment transactions using a payment infrastructure with e-merchandise transactions using an e-merchandise infrastructure, while allowing each infrastructure to concentrate on its primary function, typically without the necessity for detailed understanding and incorporation of the other infrastructure. Thus, provision of tickets or other e-merchandise can be linked to a transaction, such as a payment transaction. An exemplary embodiment of a method for integrated payment and electronic merchandise transfer via: (i) a payment infrastructure, configured in accordance with a payment specification, in association with (ii) an electronic merchandise infrastructure (which method can be implemented in whole or in part by one or more computers and/or other processors) according to one aspect of the invention, includes the step of facilitating interrogation of an electronic device by a first terminal to obtain an account number associated with the electronic device, the electronic device being configured according to the payment specification, the first terminal having a first terminal payment module configured according to the payment specification and a first terminal electronic merchandise module configured according to the electronic merchandise infrastructure and coupled to the first terminal payment module to permit transfer of non-payment e-merchandise related information from the first terminal electronic merchandise module to the first terminal payment module, the interrogation of the electronic device being performed by the first terminal payment module. The method also includes facilitating generation of the non-payment e-merchandise related information by the first terminal electronic merchandise module; and facilitating transfer of the non-payment e-merchandise related information from the first terminal electronic merchandise module to the electronic device via the first terminal payment module, within a transaction between the electronic device and the first terminal payment module that is conducted in accordance with the payment specification, the non-payment e-merchandise related information being stored on the electronic device in accordance with the payment specification. The method further includes facilitating the electronic device and the first terminal independently calculating a summary data item; and facilitating the first terminal calculating a first message authentication code based on the non-payment e-merchandise related information and a terminal-calculated value of the summary data item. The non-payment e-merchandise related information is stored on the electronic device together with a electronic device-calculated value of the summary data item and the first message authentication code.

In another aspect, an exemplary embodiment of a method (which method can be implemented in whole or in part by one or more computers and/or other processors) for integrated payment and electronic merchandise transfer via: (i) a payment infrastructure, configured in accordance with a payment specification, in association with (ii) an electronic merchandise infrastructure, includes the step of facilitating interrogation of an electronic device by a first terminal to obtain an account number associated with the electronic device, the electronic device being configured according to the payment specification, the first terminal having a first terminal payment module configured according to the payment specification and a first terminal electronic merchandise module configured according to the electronic merchandise infrastructure and coupled to the first terminal payment module to permit transfer of non-payment e-merchandise related information from the first terminal electronic merchandise module to the first terminal payment module, the interrogation of the electronic device being performed by the first terminal payment module. The method also includes facilitating generation of the non-payment e-merchandise related information by the first terminal electronic merchandise module; and facilitating transfer of the non-payment e-merchandise related information from the first terminal electronic merchandise module to the electronic device via the first terminal payment module, within a transaction between the electronic device and the first terminal payment module that is conducted in accordance with the payment specification, the non-payment e-merchandise related information being stored on the electronic device in accordance with the payment specification. Furthermore, the method includes facilitating interrogation of the electronic device by the first terminal to obtain at least one of a transaction counter and an electronic device-generated random number; as well as at least one of the account number and a device identity of the electronic device. Still further steps include facilitating calculation of a message authentication code based on the e-merchandise related information, the at least one of the transaction counter and the electronic device-generated random number, and the at least one of the account number and the device identity of the electronic device; and facilitating detection of irregularity via the message authentication code.

In another aspect, an exemplary embodiment of a terminal for integrated payment and electronic merchandise transfer can include a payment module and an electronic merchandise module that is coupled to the payment module. The payment module can be configured according to the payment infrastructure and the electronic merchandise module can be configured according to the electronic merchandise infrastructure. The modules can be configured to facilitate the steps described above.

An exemplary embodiment of an electronic payment device (such as a card or appropriately-configured cellular phone), according to another aspect of the invention, can include a memory and at least one processor coupled to the memory. The processor can be operative to facilitate performance of one or more of the method steps described herein. One or more method steps of the present invention can be implemented in the form of an article of manufacture comprising a machine readable medium that contains one or more programs that when executed implement such step or steps.

One or more techniques of the present invention can provide one or more of the following substantial beneficial technical effects. These can include, for example, allowing for the close coupling of separate infrastructures, such as, for example, electronic payment and ticketing, while still respecting the separation of functions and responsibilities of each. Further, in another aspect, one or more inventive techniques allow extending rather than replacing existing payment protocols, in such a way that the extensions remain compatible with other parts of the existing payment infrastructure. Yet further, in an exemplary embodiment conforming to the EMV payment specifications as discussed more fully below, a payment card application can remain compliant with all relevant open standards and the relevant type approval processes can remain applicable.

Still further, in yet another aspect, by closely coupling payment and data handling and/or storage functionality, the extension of open scheme payments, such as credit card payments, can be facilitated into environments where traditionally only tickets or closed scheme payments, such as prepaid transport cards, have been accepted. Because payment and data handling and/or storage can, if desired, be implemented in a single application on a payment card, transaction time and complexity can be greatly reduced; in particular, as opposed to employing separate card applications for payment and data handling and/or storage, and especially for high-speed contactless operations such as mass transit ticketing and payment, transaction time can be substantially reduced as compared to prior art techniques. Yet further, the complexity of the card management process can be substantially reduced since only a single card application need be managed, and multiple electronic merchandise applications can be supported without change. Even further, complexity of terminals can be reduced, since ticketing and other e-merchandise processing need not "understand" the payment side, and payment processing need not "understand" e-merchandise functionality (i.e., functionality of each side can remain substantially unmodified). In yet another aspect, one or more inventive techniques can permit combination of payment and electronic merchandise delivery in a single step, in such a way that the payment transaction and the delivery of e-merchandise, such as a permit to travel, are closely bound, thus minimizing the risk of payment without delivery or of delivery without payment, and in such a way that multiple payment for the same e-merchandise or unintended multiple delivery of merchandise for a single payment can typically be avoided.

These and other features and advantages of the invention will become apparent from the following detailed description of illustrative embodiments thereof, which is to be read in connection with the accompanying drawings.

BRIEF DESCRIPTION OF THE DRAWINGS

FIG. 14 depicts exemplary data returned linked to the reading of a slot;

FIG. 15 depicts exemplary data returned linked to the writing to a slot;

FIG. 16 provides a summary of aspects of writing slot data;

FIG. 17 depicts exemplary layout of ICC Dynamic Data;

FIG. 19 depicts exemplary security properties;

FIG. 20 depicts exemplary security mechanisms;

FIG. 24 depicts exemplary security mechanism coverage.

DETAILED DESCRIPTION OF PREFERRED EMBODIMENTS

Figure 1:
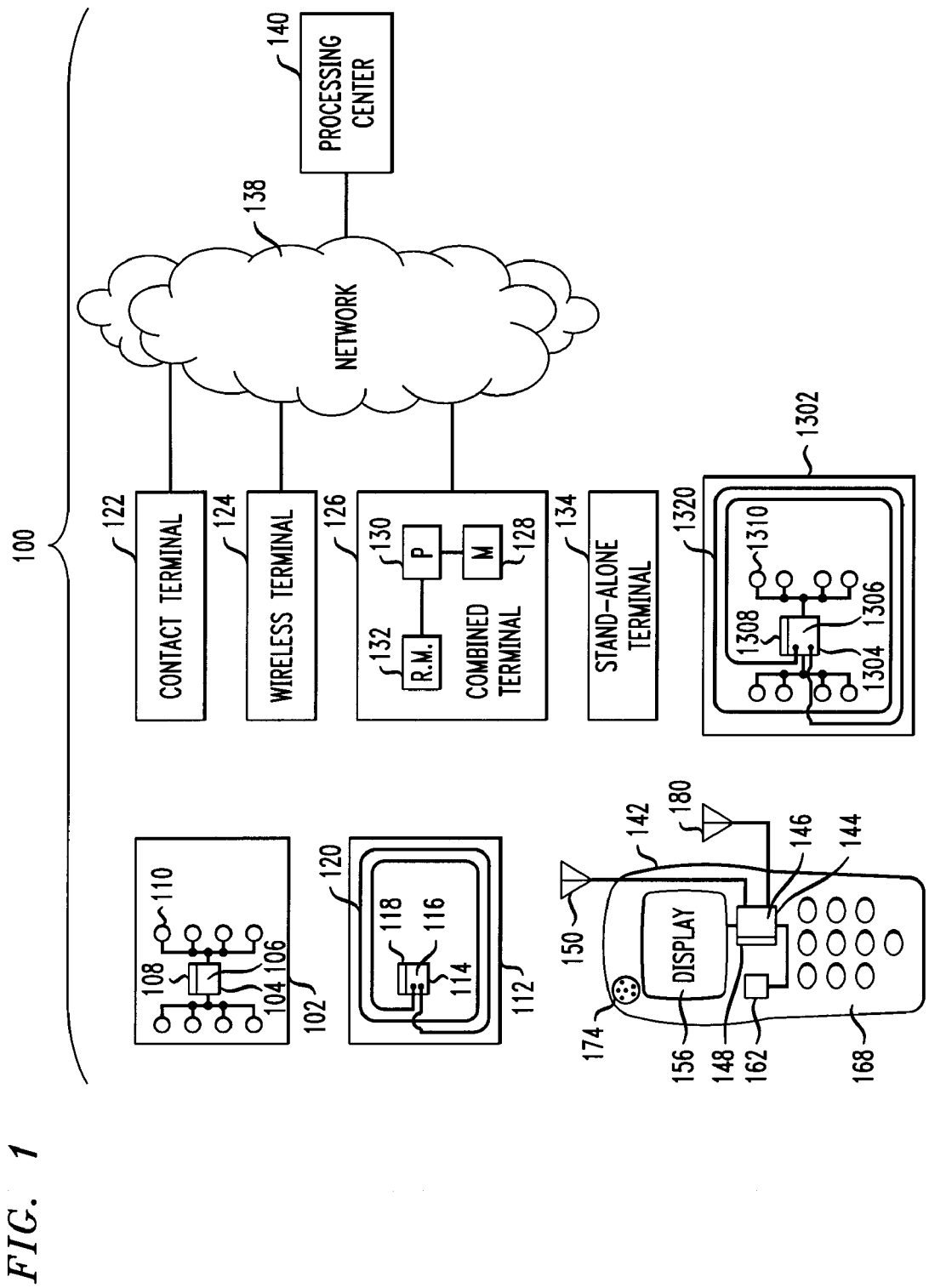
FIG. 1 shows an example of a system and various components thereof that can implement techniques of the invention.

Attention should now be given to FIG. 1, which depicts an exemplary embodiment of a system 100 together with various possible components of the system. System 100 can implement inventive techniques, and can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. In one or more embodiments of the invention, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112. The description of devices, elements, or components 102, 104, 106, 108, 110, 112, 114, 116, 118, 120 throughout this document are equally applicable to the corresponding items 1302, 1304, 1306, 1308, 1310, 1320. Memories 108, 118, 148 (discussed below) and 1308 may further be divided into non-volatile and volatile memory.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic.

The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and personal identification number ("PIN"). The memory portions or units 108, 118 can store the operating system of the cards 102, 112. The operating system loads and executes applications and provides file management or other basic card services to the applications. In some embodiments, one or more applications may "sit" directly on hardware, e.g., may be outside the domain of the operating system. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications as described herein. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that, strictly speaking, the EMV specification defines the behavior of a terminal; however, the card can be configured to conform with such EMV-compliant terminal behavior and in such a sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets, or access cards for a public transportation system, that implement techniques of the present invention. Such devices could include cards having a conventional form factor, smaller or larger cards, cards of different shape, key fobs, personal digital assistants (PDAs), appropriately configured cell phone handsets, or indeed any device with the processing and memory capabilities to implement techniques of the present invention. The cards, or other payment devices, can include memories 108, 118 and processors 106, 116 coupled to the memories. Optionally, body portions (e.g., laminated plastic layers of a payment card, case or cabinet of a PDA, chip packaging, and the like) are associated with memories 108, 118 and processors 106, 116. The memories 108, 118 can contain applications as described herein. The processors 106, 116 can be operative to execute one or more method steps to be described herein. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, or a combined terminal 126. Note that "contactless" and "wireless" are used in an interchangeable fashion herein and that the skilled artisan is familiar with the meaning of such terminology. Combined terminal 126 is designed to interface with either type of device 102, 112. Terminals may be contact terminals with plug-in contactless readers. Combined terminal 126 can include a memory 128, a processor portion 130, and a reader module 132. Note that the principles of construction of terminal 126 are applicable to other types of terminals and are described in detail for illustrative purposes. Reader module 132 can be configured for contact communication with card or device 102, or contactless communication with card or device 112, or both (different types of readers can be provided to interact with different types of cards e.g., contacted or contactless). Terminals 122, 124, 126 can be connected to a processing center 140 via a computer network 138. Network 138 could include, for example, the Internet, or a proprietary network. Processing center 140 can include, for example, a host computer of an issuer of a payment device. One or more distinct networks can be employed. As discussed below, inventive terminals can have payment modules coupled to electronic merchandise modules; the modules can be implemented in software, firmware, and/or hardware. In one or more embodiments, the modules may be software modules running on the same processor.

Stand-alone terminal 134 is representative of a terminal that is not connected to a computer network (either not connected at a particular time, or not connected at all, by design), and is otherwise generally similar to the other terminals described.

An appropriately configured cellular telephone handset 142 can also be employed in system 100. Handset 142 is depicted in semi-schematic form in FIG. 1, and can include one or more IC chips such as chip 144 including a processing unit 146 and a memory unit 148. Wireless communication with a terminal can be provided via antenna 150 or with a second antenna 180 similar to above-described antenna 120 (i.e., the handset could have a second antenna for the payment application). Note that antenna 180 is depicted schematically, but could be, e.g., a coil antenna as used in a typical "smart" card. Handsets 142 can each be equipped with a suitable display 156. Further, an appropriate power supply 162 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1.

In one aspect of the present invention, an electronic payment device, which may be portable, is provided for facilitating transactions by a user with a terminal, such as 122, 124, 126, 134, of a system such as system 100. The device can include a processor, for example, the processing units 106, 116, 146 discussed above. The device can also include a memory, such as memory portions 108, 118, 148 discussed above, that is coupled to the processor. Further, the device can optionally include a communications module that is coupled to the processor and configured to interface with a terminal such as one of the terminals 122, 124, 126, 134. The communications module can include, for example, the contacts 110 or antennas 120, 150, 180 together with appropriate circuitry (such as the aforementioned oscillator or oscillators and related circuitry) that permits interfacing with the terminals via contact or wireless communication. The processor of the apparatus can be operable to perform one or more steps of methods and techniques described herein. The processor can perform such operations via hardware techniques, and/or under the influence of program instructions stored in one of the memory units. The portable device can include a body portion. For example, this could be a laminated plastic body (as discussed above) in the case of "smart" cards 102, 112, or the handset chassis and body in the case of handset 142.

It will be appreciated that the terminals 122, 124, 126, 134 are examples of terminal apparatuses for interacting with portable payment devices in accordance with one or more exemplary embodiments of the present invention. The apparatus can include the aforementioned payment and electronic merchandise modules, implemented, e.g., via a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138.

The above-described devices 102, 112 are preferably ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device.

In some instances, the payment card or other electronic device is configured to operate in conjunction with a payment network configured to facilitate transactions between multiple issuers and multiple acquirers. In such a network, a number of different users interact with a number of different merchants. The merchants interact with a number of different acquirers. The acquirers interact with a number of different issuers through, for example, a single operator of a payment network configured to facilitate transactions between multiple issuers and multiple acquirers; for example, MasterCard International Incorporated, operator of the BANKNET® network, or Visa International Service Association, operator of the VISANET® network.

During a conventional credit authorization process, the cardholder pays for the purchase and the merchant submits the transaction to the acquirer (acquiring bank). The acquirer verifies the card number, the transaction type and the amount with the issuer and reserves that amount of the cardholder's credit limit for the merchant. At this point, the authorization request and response have been exchanged, typically in real time. Transactions are then completed by the merchant and these transactions are stored in "batches," which are sent to the acquirer for clearing. During subsequent clearing and settlement, the acquirer sends the batch transactions through the credit card association, which debits the issuers for payment and credits the acquirer. Once the acquirer has been paid, the acquirer pays the merchant.

Figure 2:
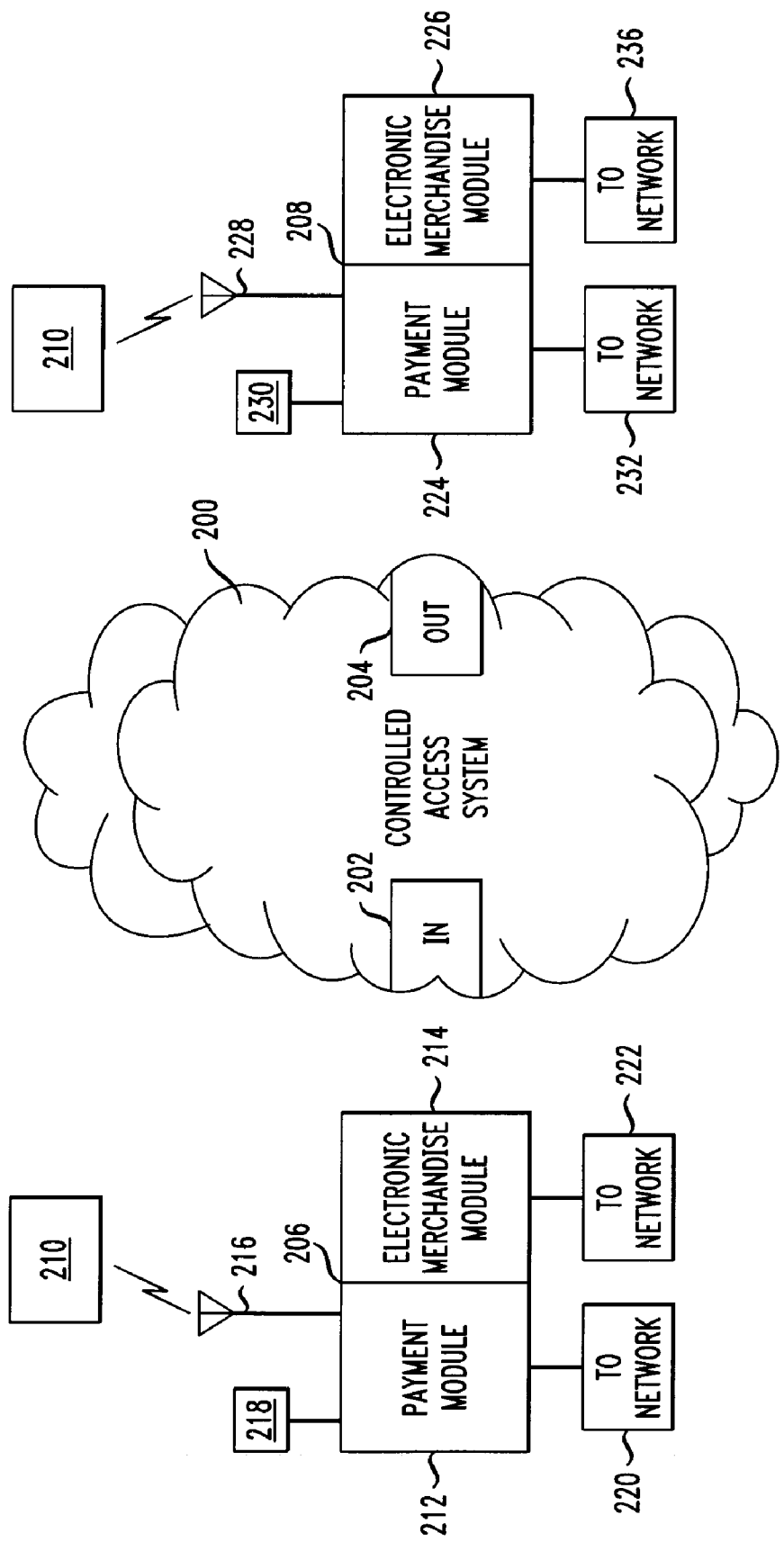
FIG. 2 shows one specific exemplary application of inventive techniques to a controlled access system.

FIG. 2 shows an exemplary application of techniques of the invention to a controlled access system, in accordance with one aspect of the invention. The system 200 can be, for example, a transportation vehicle, a complete transportation infrastructure including one or more railroad stations or bus terminals, an amusement park, a museum, and the like. System 200 may have an entrance point 202 and an exit point 204. A first terminal 206 can be located adjacent entrance point 202 and a second terminal 208 can be located adjacent exit point 204. It will be appreciated that there may be multiple entry and exit points, and that each may be provided with an appropriate terminal. The terminals, such as terminal 206, can be configured for integrated payment and electronic merchandise transfer via a payment infrastructure, in association with an electronic merchandise infrastructure, and in conjunction with an electronic payment device, such as device 210, that is configured according to the payment infrastructure. The device 210 can be, for example, a contacted card, a contactless card, a cell phone, or other device as described above.

Terminal 206 can include a payment module 212 that is configured according to the payment infrastructure and that is also configured to interrogate the electronic payment device 210 to obtain financial data. Further, terminal 206 can include an electronic merchandise module 214 that is configured according to the electronic merchandise infrastructure and coupled to the payment module 212. The electronic merchandise module 214 can be configured to facilitate processing of e-merchandise related information, for example, ticketing information. The payment module 212 can be further configured to facilitate transfer of the e-merchandise related information to the electronic payment device 210, in a transaction conducted in accordance with the financial data and the payment infrastructure. Note that the payment module can include an antenna 216 for contactless communication (appropriate modulation and conversion circuitry, well known in the art and similar to that discussed above, can also be included). Further, the payment module can include a reader for contacted cards, 218. Note that the reader 218 and antenna 216 can be separate entities or can be integrated with the terminal 206 (e.g., payment module 212 thereof) as desired. Payment module 212 and electronic merchandise module 214 can have network connections 220, 222. It will be appreciated that if desired, a single network connection could be provided. The connection can be to any type of network described above with regard to FIG. 1, and the different modules can be connected to the same or different networks as desired. Elements 224, 226, 228, 230, 232, 236 of terminal 208 can function similarly to corresponding elements 212, 214, 216, 218, 220, 222 of terminal 206.

In one or more embodiments, payment module 212 need not itself be connected to a network and network communication can be accomplished via merchandise module 214. Further, in one or more embodiments, communication with the card or other payment device is handled by payment module 212, and any data that needs to be passed between the card and the merchandise module 214 is handled by the payment module 212 (for both contacted and contactless cards).

By way of an example to aid understanding of the skilled artisan, one example of a payment infrastructure is the EMV infrastructure, i.e. a payments system incorporating EMV, such as that operated by MasterCard International Inc. in conjunction with Issuers, Acquirers, and Merchants. Further, one example of a payment infrastructure is an Automatic Fare Collection (AFC) system, Optionally, payment module 212 can be further configured to interrogate the electronic payment device 210 to obtain profile data pertaining to a holder of the electronic payment device. In this case, the electronic merchandise module 214 of the first terminal 206 can be configured to process the e-merchandise related information based on the profile data. The processing of the e-merchandise related information can include generating, reading, and/or updating the e-merchandise related information. It will be appreciated that different types of e-merchandise modules 214 are possible. For example, there may be some which only generate e-merchandise, such as ticket vending machines; there may be some which only read e-merchandise, for example, a portable device of a train conductor or other ticket inspector; and there may be those which only update e-merchandise, for example, a ticket validation machine. Further, there may be combined modules which do some or all of the foregoing in any combination. It is to be emphasized that by way of example, many aspects of the invention are illustrated with regard to a ticketing system, for example, for transportation. However, this is purely exemplary, and techniques of the present invention can be employed in many applications, wherever integration of payment and e-merchandise infrastructures will be beneficial, such as, e.g., controlling access to amusement parks, museums and the like.

Modules 212, 214, 224, 226 as described can include, e.g., two physically separate devices, a single device comprising two discrete sub-devices, a single device comprising two discrete virtual devices (i.e. software modules) and a single fully integrated device doing both jobs.

Figure 3:
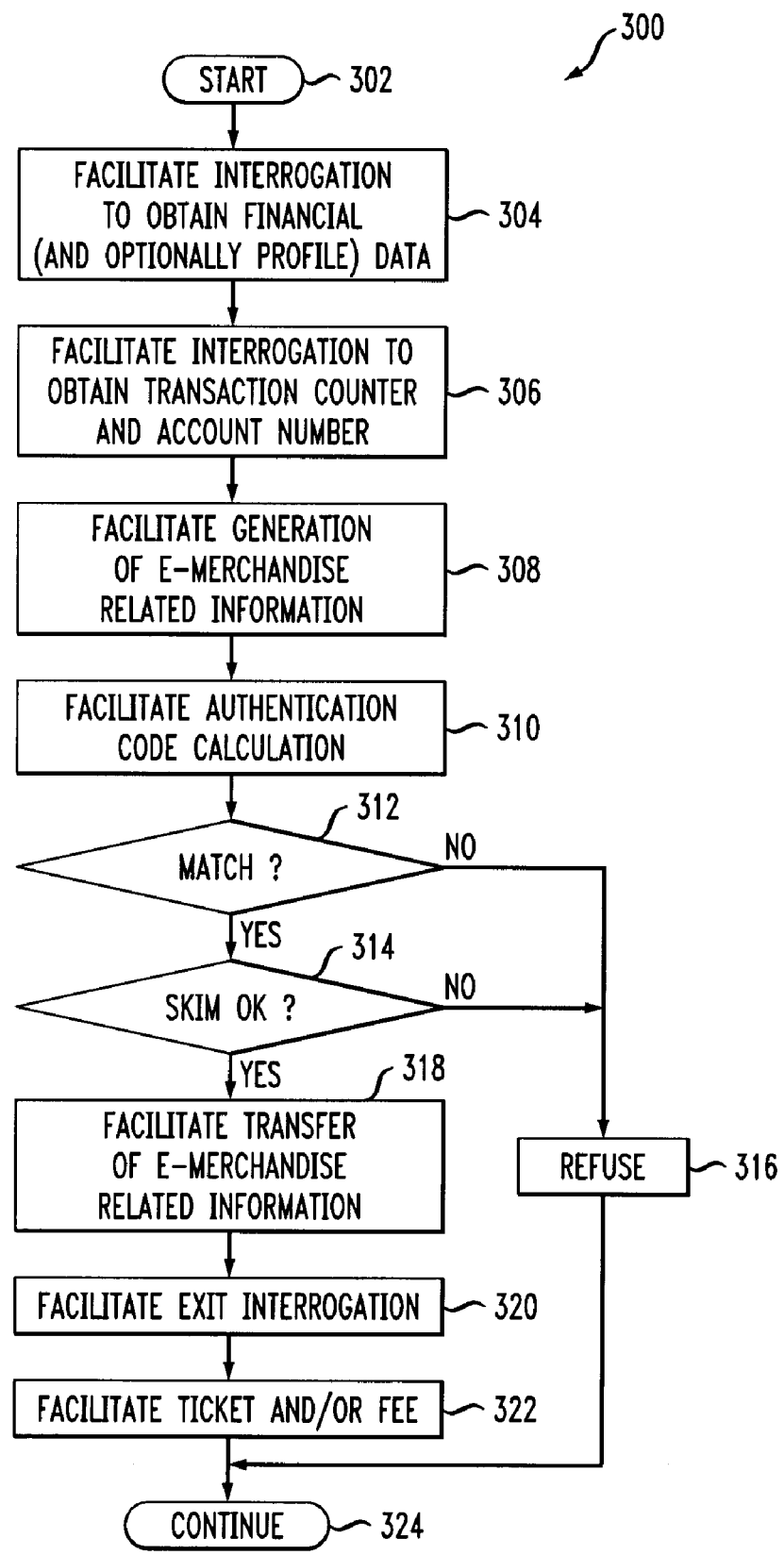
FIG. 3 is a flowchart of exemplary method steps according to an aspect of the invention.

Attention should now be given to FIG. 3, which presents a flowchart 300 of exemplary method steps according to an aspect of the invention. The method, which can be computer-implemented, can be employed for integrated payment and electronic merchandise transfer via a payment infrastructure in association with an electronic merchandise infrastructure. The e-merchandise can be of the kind described above. After beginning at block 302, block 304 includes facilitating interrogation of an electronic payment device by a first terminal to obtain financial data. The financial data can be, for example, an account number of the electronic payment device. The electronic payment device can be configured according to the payment infrastructure, and the first terminal can have a payment module and an electronic merchandise module as described above with regard to FIG. 2. The interrogation of the electronic payment device can be performed by the first terminal payment module. Optionally, in the step of facilitating interrogation 304, profile data pertaining to a holder of the electronic payment device can be obtained. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

As noted, the financial data can be, for example, an account number associated with the payment device. By way of example and not limitation, the profile data could include information such as the fact that the person is a student or a senior citizen who is entitled to a lower fare. Further, two or more categories of profile data could be provided. For example, one category could include ticketing profile data, such as senior citizen or student status. Further, card member profile data could also be provided; such data might not be needed for the transaction. This could include, for example, when and where the card member joined, personal information such as the size of clothing, and the like. Where the profile data is obtained, the e-merchandise related information can be generated by the first terminal electronic merchandise module based on the profile data.

Optional step 306 will be discussed below. Step 308 can include facilitating generation of e-merchandise related information by the first terminal electronic merchandise module. Such information could include, for example, ticketing information. Optional steps 310 through 316 will be discussed below. Step 318 can include facilitating transfer of e-merchandise related information to the electronic payment device, via the first terminal payment module, within a transaction conducted in accordance with the financial data and the payment infrastructure. In one or more embodiments, the transaction may be a payment transaction. It should be appreciated, however, that the transaction may be for zero value, and/or might only be a subset of a full payment transaction flow.

As noted, the profile data that can optionally be obtained in step 304 can include information identifying the holder of the electronic payment device as a member of a class having one or more of a plurality of entitlement categories that are associated with the class membership. The entitlement categories can relate to the electronic merchandise; for example, such categories could include entitlements to discounts or privileges. As noted, in one exemplary embodiment, the entitlement categories may include transportation fare categories, and the e-merchandise related information may include transportation ticket information.

As noted, techniques of the invention may be used to control entrance to and/or exit from a controlled access system. In some cases, one may only be concerned with entrance to the system. This may be appropriate, for example, when a single fixed fee is charged for access, such as entrance to a museum or amusement, or in mass transportation systems, such as the New York subway system, where a single fare is charged for passage between any two stations. However, in other applications, it may be desirable to also control exit, and/or to link the ticket or cost information to both the entrance and exit points. This could correspond, for example, to a system such as the London Underground or Washington, D.C. Metro. Thus, the steps described could be executed in connection with entrance of the holder to a controlled access system, and in such case, the e-merchandise related information in steps 308 and 318 could include the initial entry point information. Thus, the first terminal, such as terminal 206 in FIG. 2, can in this case be thought of as an entrance terminal. In this case, additional steps can include step 320, namely, facilitating interrogation of the electronic payment device by an exit terminal upon exit of the holder from the system, to obtain system entry point information (the exit terminal in essence already "knows" its own location, i.e., the system exit location). The exit terminal could be, for example, terminal 208 of FIG. 2. Step 322 can include facilitating one or more of providing a ticket to the holder and charging a fee to the holder, via the exit terminal payment module, based upon the controlled access system entry point information and controlled access system exit point information (e.g., location of the exit terminal). It will be appreciated that the ticket provided in step 322 (or elsewhere herein) could be an electronic ticket, a physical ticket, an optical ticket, and the like.

In one or more embodiments, the entrance and exit terminals 206, 208 may be different. For example, in a transportation system, such as a subway, metro or underground system, the first, or entrance terminal 206 could be located at a station where a person boarded a train, while the second or exit terminal 208 could be located at a station where a person exited a train. However, it is possible that the entrance and exit terminals may in fact be the same terminal. This could occur, for example, on a bus, where fares depended on how far one traveled. The exit terminal, which would be the same as the entrance terminal, could obtain information about how far one traveled by, for example, global positioning system (GPS) or other suitable techniques. The electronic payment device employed with the method depicted in FIG. 3 can be, for example, a contactless radio frequency (RF) proximity card, a contacted card, or a dual-interface card having both contactless radio frequency (RF) and contacted interfaces.

Furthermore, the device could have a non-card form factor such as, for example, a cellular telephone, a PDA, a key fob, and the like; all that is required is that the appropriate capabilities be present to interface with the terminal.

It will be appreciated that in one or more exemplary embodiments, it may be desirable to provide appropriate security features, to minimize the chance of fraud or improper usage. Specific examples will now be provided within the context of a ticketing application. When an open data store is used for a ticket, the card or other device may not provide any security services to the ticketing application with regard to data storage. In this case, the ticketing application will need to address attacks such as skimming (i.e. copying a ticket to another card) or replay. However, in other embodiments, the card or other device could provide appropriate security support. One way would be to employ a transaction counter, such as the application transaction counter (ATC) in the PutData operation, in conjunction with the PutData command, to prevent the attacks. Note that the example is provided within the context of the aforementioned EMV specification. The skilled artisan, with the teachings presented in this application in hand, will be able to readily adapt the example to other types of systems and standards.

More specifically, the reader (or reader portion of a terminal) could ask for the ATC and the primary account number (PAN). The ticketing module could include the ATC and PAN in the message authentication code (MAC) that it calculates, and could pass this back to the card or other device using the PutData command. The PutData command would refuse to accept the storage of the data, unless the PAN and ATC matched its current values. This would stop replay onto a legitimate card by the card holder. Further, use of the PAN in conjunction with the combined data authentication (CDA) feature present in EMV could reduce or eliminate the chances of "skimming," i.e., where someone attempts to read valid ticket data from another card and copy it onto their own card. As the MAC includes the PAN and the PAN is signed by CDA, the payment module can detect that fraudulent attempt and refuse the transaction.

With reference to FIG. 3, where it is desired to implement security techniques, optional step 306 can include facilitating the interrogation of the electronic payment device, by the first terminal, to obtain a transaction counter and an account number, such as, for example, the aforementioned ATC and PAN. Step 310 can include facilitating calculation of an authentication code using the transaction counter and the account number; the code can be, for example, the MAC. Step 312 can include facilitating the determination whether the transaction counter and the account number obtained from the electronic payment device match the transaction counter and the account number included in the authentication code. If they do not, as indicated by the NO branch of block 312, refusal of storage of the authentication code by the electronic payment device can be facilitated, as shown at block 316. Such refusal is responsive to the determining step revealing that the transaction counter and the account number obtained from the electronic payment device do not match those included in the authentication code. Implementing these steps can reduce the likelihood of a replay fraud. If the match is acceptable, as indicated by the YES branch of block 312, optionally, skimming detection can be facilitated at decision block 314, based on the account number and a unique data authentication signature associated with the transaction, for example, the EMV signature method known as Combined DDA/AC Generation, more commonly referred to as "CDA". Thus, chances of replay (attempting to copy previously legitimate ticketing data back onto the original card) and skimming (attempts to copy legitimate ticketing data onto another authentic or fraudulent card) can be substantially reduced or eliminated. It will be appreciated that the replay and skimming prevention steps can be performed in any order, and need not be performed together; either or both can be performed, or neither. Indeed, in general, the steps depicted in FIG. 3 can be performed in any appropriate order, and not all the steps need be carried out in any particular situation. Once a refusal has been generated in block 316, processing proceeds to continue block 324.

In another approach exemplary of many possible approaches to security enhancement, steps can include facilitating interrogation of an electronic payment device by a first terminal to obtain a transaction counter such as an ATC, an electronic payment device identifier such as Card ID, and an electronic payment device-generated random number such as RND, and facilitating calculation of an authentication code such as MAC based on the e-merchandise related information, the transaction counter, the electronic payment device identifier, and the electronic payment device-generated random number. These steps permit facilitating detection of replay fraud via the transaction counter and the payment device-generated random number, as well as facilitating skimming detection, based on linkage of the e-merchandise related information to the electronic payment device identifier. Further details will be provided below with regard to FIGS. 7 and 8.

By way of review, one or more embodiments of the invention can provide techniques for combining payment and e-merchandise infrastructures and/or transactions while allowing each to concentrate on its primary function, and with little or no need for one to understand or incorporate the other. Thus, in one or more aspects, the invention can provide techniques for incorporating data handling operations into a transaction, such as a payment transaction. In one particular exemplary implementation, the payment transaction employs the aforementioned EMV specifications.

Thus, techniques of the present invention permit the processing of non-payment data within a transaction, such as a payment transaction. In one or more exemplary embodiments, data handling can be conducted within such a transaction. As discussed with regard to FIG. 2, terminals can include e-merchandise and payment modules; these can be implemented as separate hardware modules or separate software modules. In one or more embodiments, two separate applications are provided, one for e-merchandise such as ticketing, and one for payments. The device, such as a card, only needs to "know" how to interface with the payment portion. The e-merchandise data, such as ticketing, can be conveyed to the card or other device through the payment application or other type of payment module. Appropriate ticketing or other e-merchandise data can be stored on the card or other device, but using the payment infrastructure preexisting on the card. In one or more embodiments, the existing payment infrastructure can be in accordance with the aforementioned EMV specification. Standard EMV commands can be used to move non-payment data, such as e-merchandise data. However, the card or other payment device can be made downward-compatible, so that it can be readily employed for ordinary purchase transactions. Further specific examples showing application of techniques of the invention within the EMV framework will now be presented with respect to FIGS. 4-6.

Figure 4:
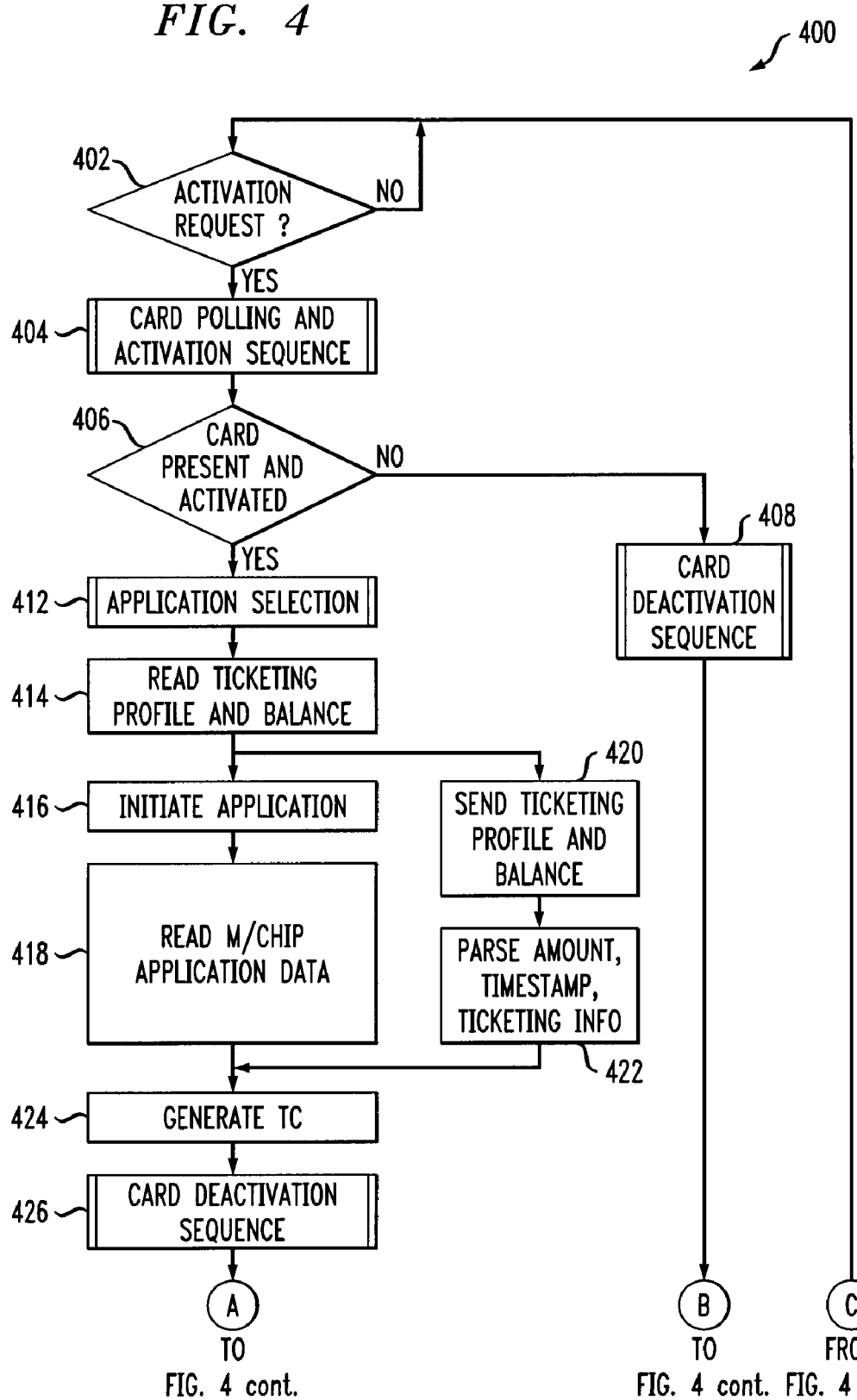
FIG. 4 is a specific exemplary flowchart showing an exemplary transaction flow at the entry of a system for payment at the entry to the system.
Figure 4:
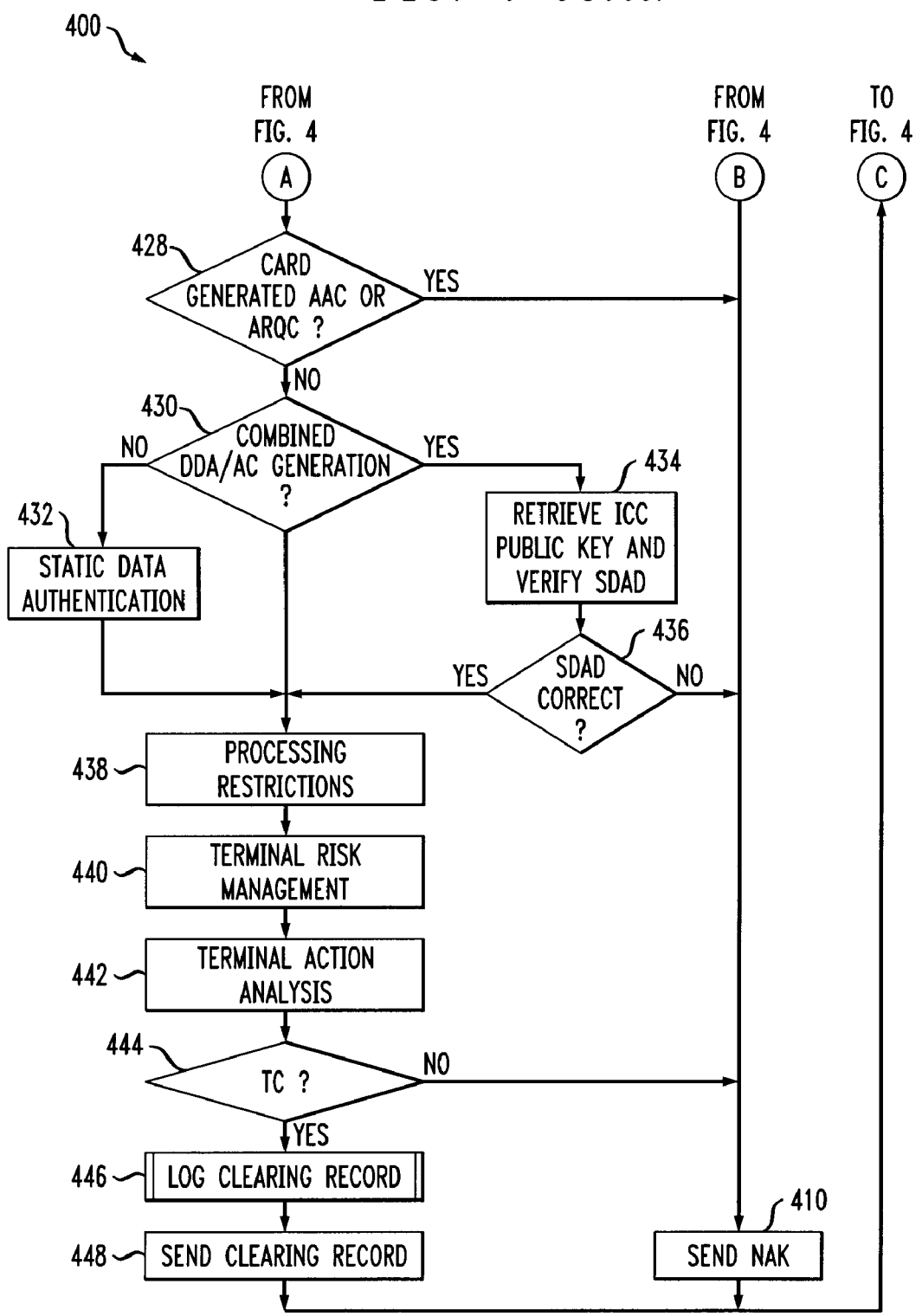

In the following discussion of FIGS. 4-8, "reader" encompasses an element such as payment module 212 with elements 216 and/or 218, while "terminal" encompasses an element such as e-merchandise module 214. FIG. 4 shows exemplary method steps in a transaction flow at the entry to a controlled access system, where payment is to be made at the entry. The steps are described in the context of the aforementioned EMV specifications, with appropriate modifications implementing techniques of the invention. The techniques are applicable to both contactless and contacted applications. As shown in step 402 of flowchart 400, an activation request can be sent from a ticketing application to a payment application. An appropriate card polling and activation sequence can be conducted at step 404. If an invalid card or multiple cards are present, as determined at step 406, a card deactivation sequence can be run at step 408, and a "NAK" symbol can be sent from the reader to the terminal at block 410 (corresponding to the reader informing the terminal that something has gone wrong).

Only in the case when a single card is present, the reader will implement the application selection, and an appropriate application on the card is selected at block 412. Data is then read from the card, as at block 414. Such data can include profile information such as a ticketing profile, as well as a balance. When multiple cards are present, as in the NO branch, the reader will initiate a removal sequence, as at 408.

In step 416, the appropriate application is initiated. In step 418, the reader can read all the data from the card or other device, but may retrieve only the PAN from the response message, saving other data for later use. In the example shown in FIG. 4, the application data is compliant with the ONES-MART PAYPASS® application, also known as PAYPASS M/CHIP®, promulgated by MasterCard International Incorporated. However, this is purely for purposes of example, and other appropriate specifications can be complied with or employed. In parallel, at step 420, the reader can send the ticketing profile and balance as part of an activate entry response, as a result of two successful GetData commands. At step 422, the reader can receive a debit entry command and parsed data from the terminal as a preparation for a first Generate AC command to be conducted in the future. In parallel, in step 418, appropriate data is read from the card or other device by a Read Record command. Typically, in an optimized flow, the terminal will send the Debit Entry command before the reader reaches the point where it is ready to send the first Generate AC command. In block 424, the reader requests a transaction certificate (TC). In block 426, the reader sends the Debit Entry response to the terminal, containing the clearing record.

In block 428, a determination is made whether the card or other device has generated an application authentication cryptogram (AAC) or an authorization request cryptogram (ARQC). If such is the case, the reader declines the transaction without further processing as shown at block 410. Conversely, following the "no" branch at block 428, a determination is made whether combined DDA/AC generation was requested. Note that "DDA" stands for Dynamic Data Authentication, "AC" stands for Application Cryptogram, and the two are combined into "CDA" which stands for "Combined DDA/AC." If such generation was requested, at block 434, the reader retrieves the public key of the electronic payment device (such as, e.g., an Integrated Circuit Card (ICC)) and verifies the signed dynamic application data (SDAD). At block 436, if the SDAD is correct, processing flows to block 438, while if the SDAD is incorrect, the reader declines the transaction as per block 410. In the "no" branch of block 430, static data authentication is performed at block 432 by the reader. The reader will set an appropriate bit in the TVR if the static data authentication fails. Note that "TVR" stands for Terminal Verification Results, a set of flags generated by the terminal that contains the results of the terminal's risk management decisions. It passes this to the card in "genAC." In blocks 438 and 440 the reader performs appropriate processing restrictions and terminal risk management. Again, appropriate bits in the TVR are set if one or more tests fail.

In block 442, the reader performs terminal action analysis. If the result is a TC request, as determined in block 444, the reader accepts the transaction; conversely, at the "no" branch of block 444, the transaction is declined as at block 410. In block 448, the reader sends the Debit Entry response to the terminal, containing the clearing record. The reader can send the Debit Entry response to the terminal containing the output from the first Generate AC response; suitable exception handling may be implemented by the reader in the case that the card or the other device does not respond to the Generate AC command. It will be appreciated that blocks 406, 418, 424, 428, 430-436, 438, 440, 442 and 446 can correspond to actions taken at an application level. Further, blocks 402, 410, 420, 422, and 448 can correspond to actions taken at a transport or e-merchandise level. The steps in FIG. 4 may be carried out in connection with terminal-reader interactions.

In general terms, in a normal EMV transaction flow, the right application is selected on the card or other device, data is read from the card or other device, terminal risk analysis and terminal action analysis are performed, the card is asked for a cryptogram of a type determined by the above analysis, and the card then does its risk analysis and responds to the terminal in an appropriate fashion. In the modified transaction flow set forth herein, when reading data from the card, ticketing or e-merchandise related data may optionally also be read and supplied to the ticketing or other e-merchandise terminal. Such data can be read by the normal EMV Read Record command, or by one or more GetData commands. When the card or other device is asked for a cryptogram, the card is told certain data items in a format requested by the card. The card request will typically include the ticket tag so that if a ticket is present, it is passed to the card when the cryptogram is requested (if ticketing is not understood, zeroes are simply passed to the card). The card logs the data in an extension to the normal transaction log. Optionally, it is also possible to write to a data store before or after the cryptogram request. This can be done with a PutData command, but in a variation to normal EMV, it can be done without any security acting just as an open data store. Both options have been discussed above. Optionally, if one is just logging entry into an area, the PutData need not be followed by a cryptogram request.

When the appropriate application is selected, the terminal can perform a GetProcessingOptions command. This command tells the terminal some basic facts about the card and transaction and also provides a parameter which is used to determine which Terminal File Records need to be read (in one or more embodiments, such parameter can be, for example, the Application File Locator or "AFL" parameter from the EMV specification). This latter record is a list of the data items to be read for a given transaction. Records can then be read using the Read Record command. Other data items such as the offline balance can be read with a GetData command.

Normally, PutData commands are done as part of "scripting," i.e., a sequence of cryptographically secured commands with MACs. In one or more card applications configured in accordance with techniques of the invention, both this type of PutData and a type of PutData that does not have a MAC can be supported. A number of data stores used for storing tickets can be defined. Half of these can be open and half can be secure (i.e. freely read, scripting for write). Again, these details are exemplary in nature and other variations are possible.

One of the data items read in the Terminal File Records is called CDOL1. This data item tells the terminal the list of tags to be supplied in the cryptogram request, items such as amount, currency, and the like. To this can be added an extra tag for tickets or other e-merchandise, so that the terminal provides a ticket or other e-merchandise in the cryptogram request. The basic rule under the EMV specifications is that if a tag is not understood, zeroes are filled in. This feature can be employed to ensure that a non-ticketing or non-e-merchandise terminal will not reject a card or other device employing inventive techniques.

The cryptogram can be requested by means of a "Generate AC" command. This cryptogram is typically only understood by the issuer, but the card or other device may digitally sign it using RSA. RSA is a well-known algorithm for public key encryption that can also be used for digital signatures. The terminal can check this as it obtains the keys that it needs from the terminal file records.

Figure 5:
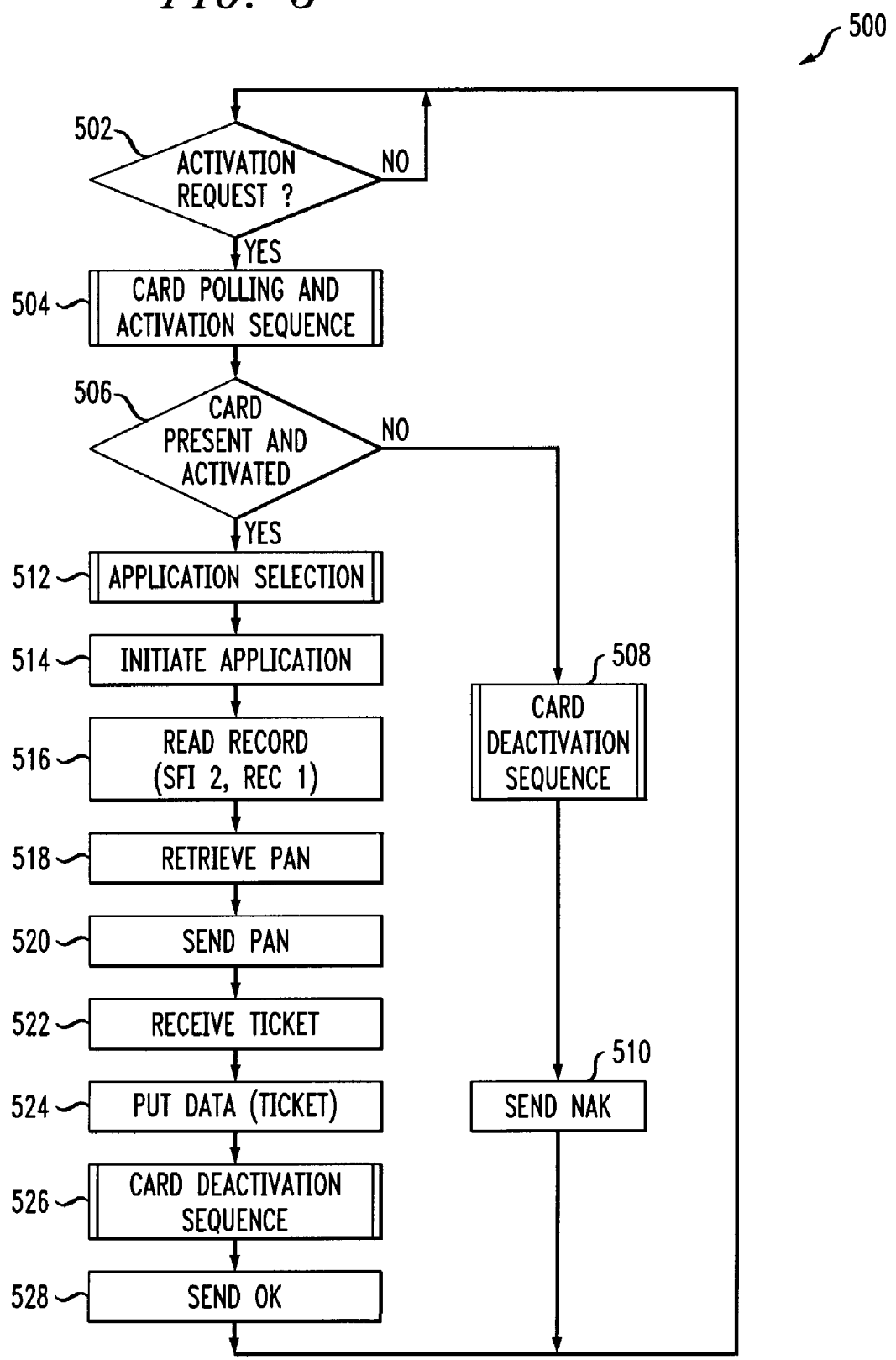
FIG. 5 is a specific detailed flowchart showing exemplary method steps in one specific exemplary transaction flow for storing an electronic ticket at a reader.

Attention should now be given to FIG. 5, which depicts an exemplary reader transaction flow for the storage of a ticket or other e-merchandise. At block 502, the reader receives a GET CARD ID command and begins polling for cards in the field (in the case of contactless cards), as at block 504. At block 506, if a single card is present in the field, the reader moves the application selection at block 512. If multiple cards are present, the reader initiates the removal sequence as at block 508 and block 510. At block 516, the reader reads the first record from the Terminal File Records. This record contains the PAN, the application expiry date, and optionally the PAN sequence number. While the arrangement described may offer speed advantages, the PAN can, if desired, be located in any other record. The variables mentioned throughout are familiar to the skilled artisan from the EMV specification. At block 518, the reader parses record one, and retrieves the PAN, application expiry date, and PAN sequence number. If the PAN sequence number is not included in the record, the reader uses the value "00."

At block 520, the reader sends the PAN, PAN sequence number and the application expiry date as the GetCard ID response. At block 522, the reader receives a store ticket command and parses the data as a preparation for the PutData command. The PutData command, for the ticket or other e-merchandise, is shown in block 524. The reader sends the ticket or other e-merchandise to the card with the PutData command (without using secure messaging). At block 526, the card deactivation sequence occurs, while at block 528 the reader informs the terminal that everything proceeded appropriately. Block 510 "Send NAK" corresponds to the reader informing the terminal that something has gone wrong.

It will be appreciated that blocks 506, 516, 518 and 524 can correspond to activity at the application level. Blocks 504 and 526 can correspond to activity at the transport level. Blocks 502, 510, 520, 522, and 528 can correspond to terminal-reader interactions.

Figure 6:
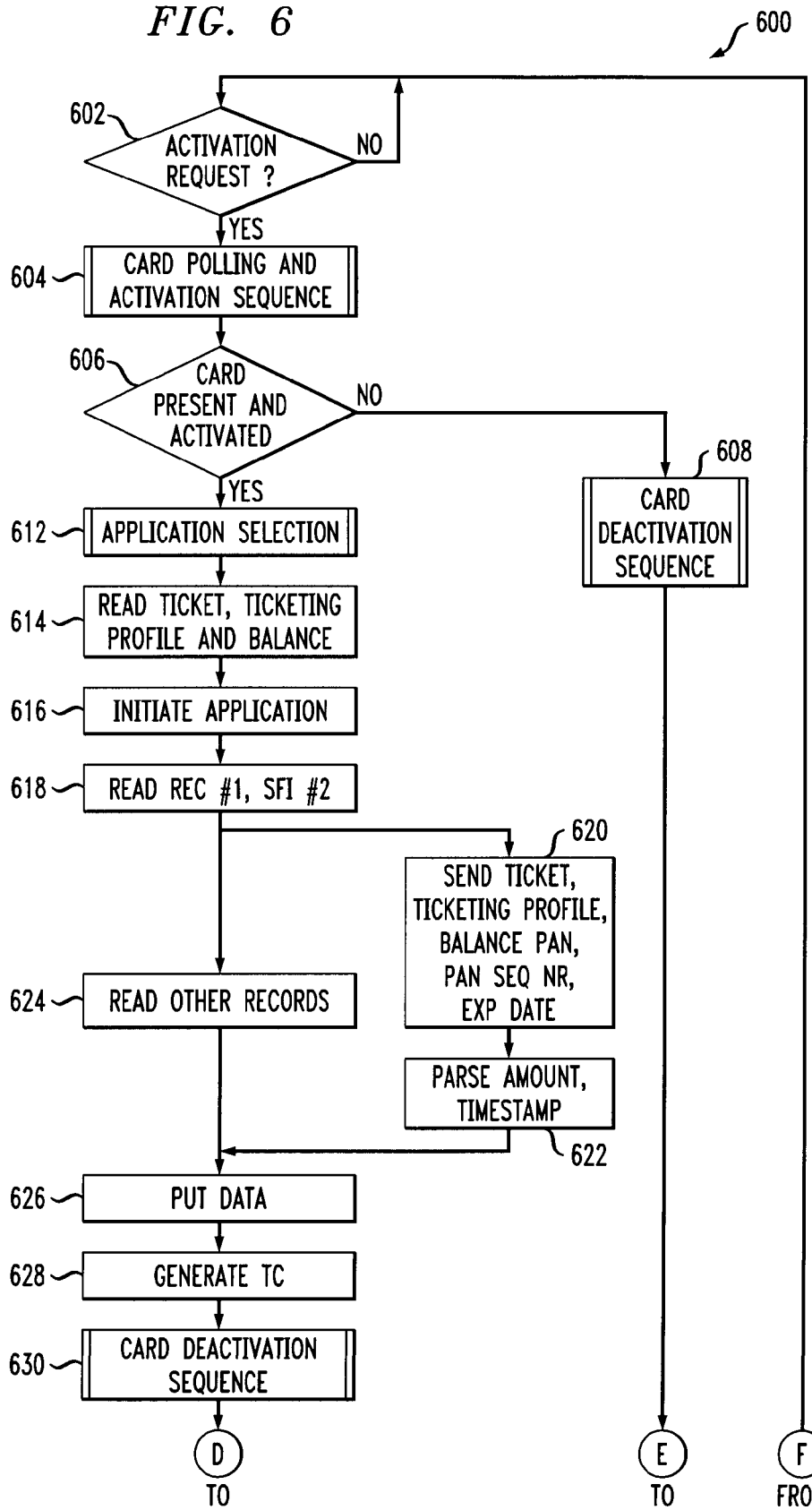
FIG. 6 shows specific exemplary method steps for the transaction flow at the exit to a controlled access system for payment at the exit.
Figure 6:
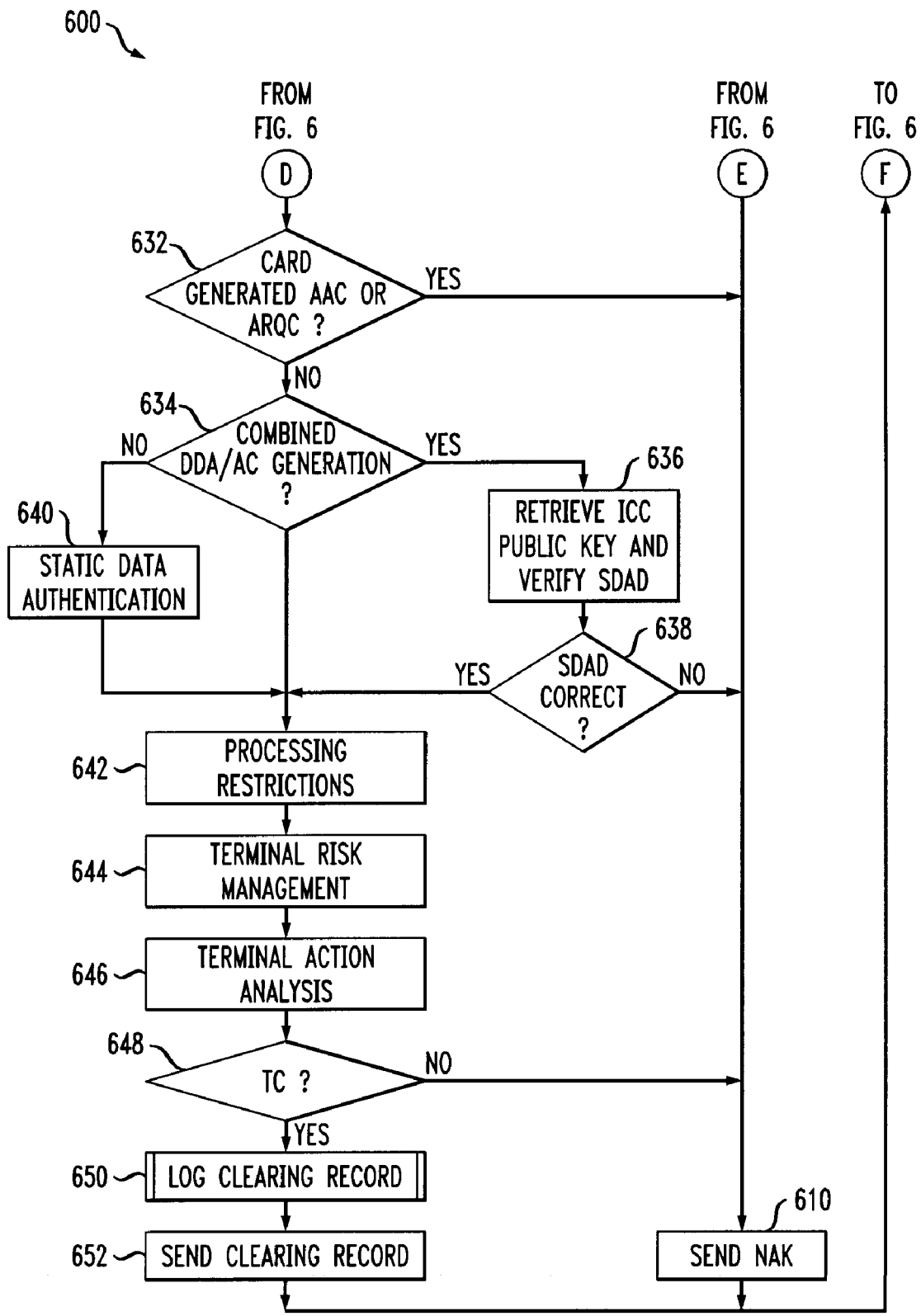

FIG. 6 shows a flowchart 600 of exemplary method steps in a transaction flow at the exit from a controlled system, such as a transportation system, for payment at the exit. At block 602, the reader receives the ACTIVATE EXIT command and begins polling for cards in the field, as at block 604. If no ACTIVATE EXIT command has been received, monitoring continues, as indicated at the "no" branch of block 602. The card polling and activation sequence is depicted at block 604. At block 606, a determination is made whether a single card is present in the field; if so, the reader moves the application selection as at block 612. Conversely, if multiple cards are present, the reader initiates the removal sequence, as at block 608, and the "Send NAK" block 610 is performed; the reader sends a debit response to the terminal, containing the status bytes from the first generate AC response as described further herein. After application selection at block 612, a ticket, ticketing profile and balance can be read at block 614, and the appropriate application is initiated at block 616. In block 618, the reader reads record one of SFI 2 to retrieve the PAN, PAN sequence number and application expiry date. At block 624, the reader reads other records to retrieve all required application data. In parallel, as shown at block 620, the reader sends the ticket, ticketing profile, balance, PAN, PAN sequence number and application expiry date as part of the ACTIVATE EXIT response. Meanwhile, the reader is reading the other card data, as at block 624 via Read Record commands.

At block 622, the reader receives the Debit Exit command and parses the data as a preparation for a future first Generate AC command. Again, in parallel, as at block 624 the reader keeps reading card data via read record commands. Typically, the terminal has sent the Debit Exit command before the reader is to send the first Generate AC command. The data parsed in block 622 can include an amount and a transaction date and/or time stamp. In block 626, the reader sends the PutData command to remove the ticket from the card, while in block 628, the reader requests a transaction certificate. The card deactivation sequence occurs in block 630. In block 632, it is determined whether the card generated an AAC or ARQC; if such is the case, as at the "yes" branch, the reader declines the transaction without further processing. If such is not the case, as at the "no" branch, a determination is made in block 634 whether combined DDA/AC generation was requested. If this is the case, the reader retrieves the ICC public key and verifies the signed dynamic application data at block 636. If the signed dynamic application data is incorrect as determined at block 638, the transaction is declined, while if the SDAD is correct, processing continues at block 642. If the decision in block 634 is negative, static data authentication is performed by the reader at block 640. The reader will set the appropriate bit in the TVR if the static data authentication fails. In blocks 642 and 644 the reader performs processing restrictions and terminal risk management, setting the appropriate bits in the TVR if one or more tests fail. The reader performs terminal action analysis in block 646. If the result is a TC request, as determined in block 648, then the reader accepts the transaction, as per the "yes" branch. In the case of a "no" answer, the transaction is declined. In block 650, for the clearing record, the reader should use the TVR as sent to the card, not the TVR used to collect the terminal risk management results. In block 652, the reader sends the debit exit response to the terminal, containing the clearing record.

It will be appreciated that the method depicted in FIG. 6 is a modification of a standard EMV procedure, adding, for example, steps 620 and 622. It will be further appreciated that blocks 606, 614, 618, 624, 626, 628, 632, 634-638, 640, 642, 644, 646 and 650 can correspond to actions at the application level. Further, blocks 604, 608 and 630 can correspond to actions at the transport level. Finally, blocks 602, 610, 620, 622, and 652 can correspond to terminal-reader interactions.

Figure 7:
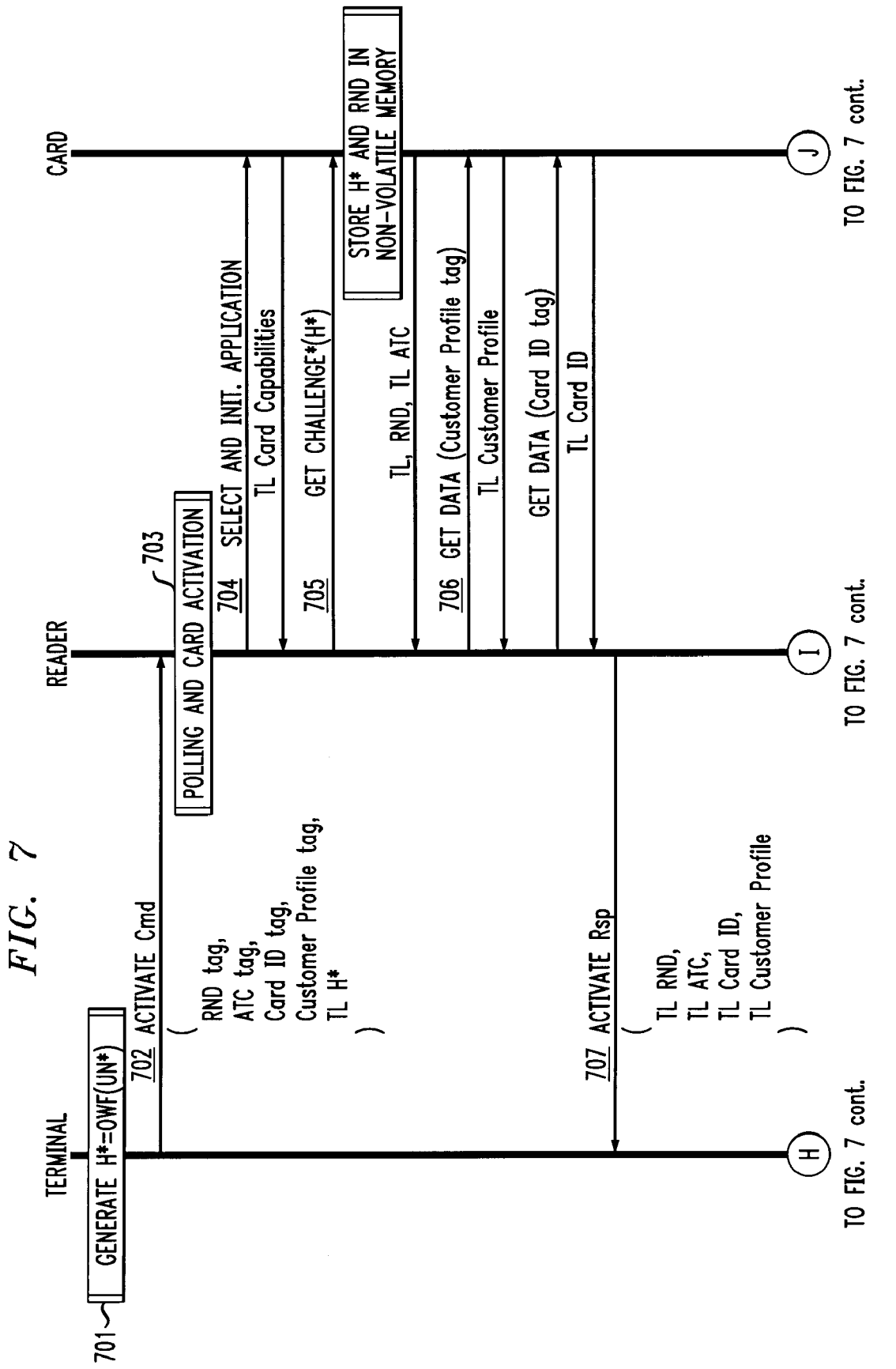
FIG. 7 shows exemplary data flows for purchasing and storing e-merchandise, including exemplary security features.

FIG. 7 shows how the e-merchandise is written to the payment device (referred to as a "Card") as part of a payment transaction. With regard to FIGS. 7 and 8, the skilled artisan will appreciate from the context the significance of the variables and will also appreciate that different variable names could be chosen. The Terminal, Reader and Card go through the following steps. In step 701, the Terminal generates a random number UN*. The Terminal calculates a challenge H* from the random number UN* using a one-way-function (OWF). At this stage, only the Terminal knows UN* and it is difficult to calculate UN* if H* is known. At 702, the Terminal sends an ACTIVATE command to the Reader to initiate the application. The Terminal includes the tags of the data elements that the Reader should return in the ACTIVATE response message. This includes, e.g., the RND tag, ATC tag, Card ID tag and Customer Profile tag. The Terminal also includes H* indicating to the Reader that the interaction with the Card must be completed with the COMMIT command.

In step 703, the Reader starts polling for a Card. If a Card is found, the Reader activates the Card. In step 704, the Reader selects the appropriate application and initiates the application. In step 705, the Reader sends H* to the Card and receives RND and ATC. The Card stores RND and H* in volatile memory for later use during the DEBIT and COMMIT command. The presence of H* indicates to the Card that non-volatile memory must be updated with the COMMIT command. The Reader retrieves the Customer Profile and Card ID from the Card in step 706.

In step 707, the Reader sends the data objects requested in step 702 to the Terminal in the ACTIVATE response message. This includes the RND, ATC, Card ID and Customer Profile. The Terminal determines the Amount based on the Customer Profile, at step 708; and calculates a MAC over the data of the Merchandise, RND, ATC and Card ID, at step 709. This way the Merchandise is linked to the Card ID and therefore it can not be used in another (genuine) Card. As it also includes the RND and ATC, it cannot be replayed to the same Card either. The Terminal stores the Merchandise in the MERCHANDISE envelope and fills the RND and ATC with hexadecimal 'F's. In step 710, the Terminal generates the Receipt.

At step 711, the Terminal sends the MERCHANDISE envelope together with the payment related data and the Receipt to the Reader as part of the DEBITWRITE command. At step 712, the Reader sends the MERCHANDISE envelope together with the payment related data and the Receipt to the Card as part of the DEBIT command. At step 713, the Card performs its card risk management and generates a Proof of Payment. The Card keeps any updates, including the Merchandise and Receipt, in volatile memory until UN* is presented as part of the COMMIT command. At step 714, the Reader sends UN* to the Card as part of the COMMIT command. Upon receipt of the COMMIT command, in block 715, the Card verifies if H* received as part of the GET CHALLENGE* is the same as OWF (UN*). If this is the case, then the Card updates its non-volatile memory. It stores the Merchandise together with RND and ATC in the Merchandise container and stores the Receipt in the Receipt container. The Card also updates the payment related parameters in non-volatile memory.

In block 716, the Reader authenticates the Card. The card authentication assures the Reader that the Card linked to the Card ID is a genuine Card. The Reader passes the Proof of Payment to the Terminal in block 717.

Figure 8:
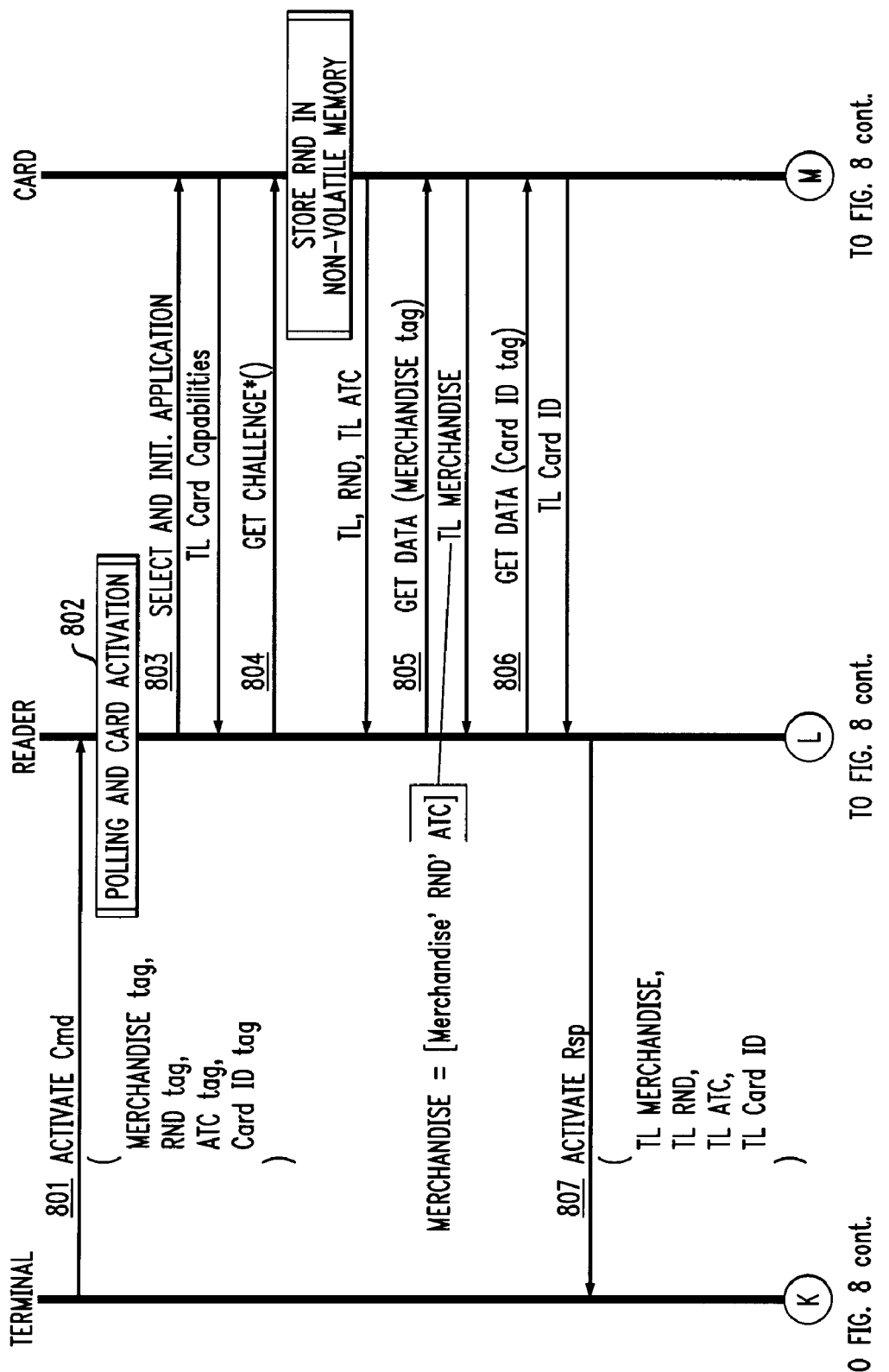
FIG. 8 exemplary data flows for updating e-merchandise, including exemplary security features.

FIG. 8 shows how the e-merchandise is read, checked for integrity and authenticity and then replaced by an update of the Merchandise. If the original Merchandise is a multiple-ticket package, such as a London Underground Carnet, the updated Merchandise will contain one Ticket less. If the original Merchandise is a single Ticket, the update invalidates the Ticket. The Terminal goes through the following steps. At step 801, the Terminal sends the ACTIVATE command to the Reader to initiate the application. The Terminal includes the tags of the data elements that the Reader must return in the ACTIVATE response message. The Terminal does not send H* to the Reader. This indicates to the Reader that the transaction does not have to be completed with the COMMIT command.

At block 802, The Reader starts polling for a Card. If a Card is found, the Reader activates the Card. In step 803, the Reader selects the appropriate application and initiates the application. In step 804, the Reader sends the GET CHALLENGE* command and receives RND and ATC. The Card stores RND in volatile memory for later use during the DEBIT command. The Card does not receive H* from the Reader. This indicates to the Card that no COMMIT command will be sent and that non-volatile memory must be updated with the DEBIT command.

In step 805, the Reader retrieves the MERCHANDISE envelope currently stored in the Card. The MERCHANDISE envelope contains Merchandise', RND' and ATC'. In step 806, the Reader retrieves the Card ID from the Card. In step 807, the Reader sends the Card ID, RND, ATC and the MERCHANDISE envelope to the Terminal in the ACTIVATE Rsp message. In block 808, the Terminal checks whether Merchandise' was calculated over the RND' and ATC' for the particular Card ID. If so, in block 809, the Terminal calculates the new Merchandise over the same Card ID but uses the new RND and ATC. The Terminal stores the Merchandise in the MERCHANDISE envelope and fills the RND and ATC with hexadecimal 'F's. In block 810, the Terminal generates a Receipt.

In step 811, the Terminal sends the new MERCHANDISE envelope together with the Receipt to the Reader as part of the DEBITWRITE command. The DEBITWRITE command can be for a zero Amount so that there is no financial impact on the Card. In step 812, the Reader sends the new MERCHANDISE envelope together with the Receipt to the Card as part of the DEBIT command. In block 813, the Card stores the Merchandise together with RND and ATC in the Merchandise container and stores the Receipt in the Receipt container.

In steps 814, 815 and 816, the Reader authenticates the Card (the card authentication assures the Reader that the Card linked to the Card ID is a genuine card) and the Reader passes the Proof of Payment (for a zero Amount) to the Terminal.

It will be appreciated that in general, prior art systems rely on merchandise to be delivered after payment. One or more inventive techniques enable a trust model of data storage that allows merchandise to be delivered before payment occurs. Within this data storage concept, the availability of the merchandise is free but the usage ("consumption") is restricted. Unlike physical goods, it doesn't cost anything to "manufacture" bits & bytes. One can take the risk of providing e-merchandise as long as one is sure that payment is received before the e-goods are consumed. Therefore, the trust model of data storage is believed to be particularly pertinent to e-merchandise. The merchant can use this trust model if, e.g., he can rely on additional card functionality (such as trust in the issuer); the card application should provide protection against cloning as well as against re-use of goods. Thus, the integration of payment with on-card data storage (e.g. ticketing or other e-merchandise) enables the new trust model, and one or more inventive techniques can implement on-card data storage using a fast and simple transaction flow.

To review, in the traditional trust model for card payment, the merchant trusts the acquirer for payment. The merchant provides the client with goods after a simple "OK" from the acquirer. The merchant knows the acquirer will honor this "OK" and pay the merchant as part of the settlement process. In the extended model, the merchant also relies on additional functionality in terminal and card to control distribution and usage of e-merchandise. Hence, the merchant needs to trust both the acquirer and the issuer for management of goods.

Figure 9:
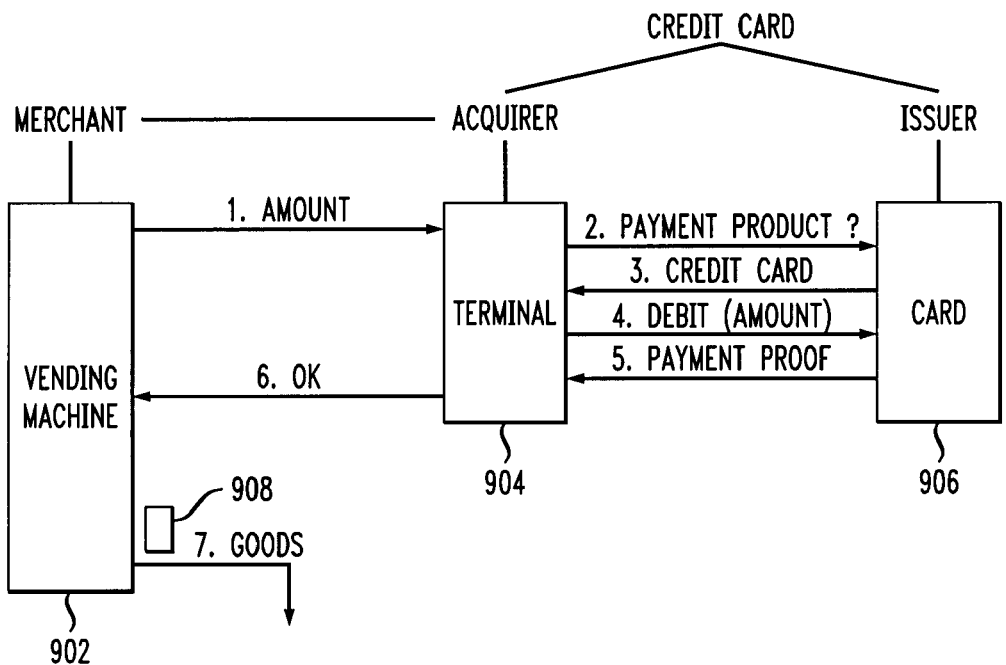
FIG. 9 shows a traditional trust model.

FIG. 9 illustrates the traditional trust model. In this model, there is a clean separation of responsibilities:

The merchant is responsible for the vending machine 902.

The acquirer is responsible for the (payment) terminal 904.

Merchant and acquirer have a (commercial) relation based on trust: if the acquirer (via the terminal) confirms to the merchant (i.e. to the vending machine) that a transaction is successful, then goods 908 are delivered. The acquirer shields the complexity of the card interaction from the merchant; there is no direct relation between merchant and issuer of the card 906.

Figure 10:
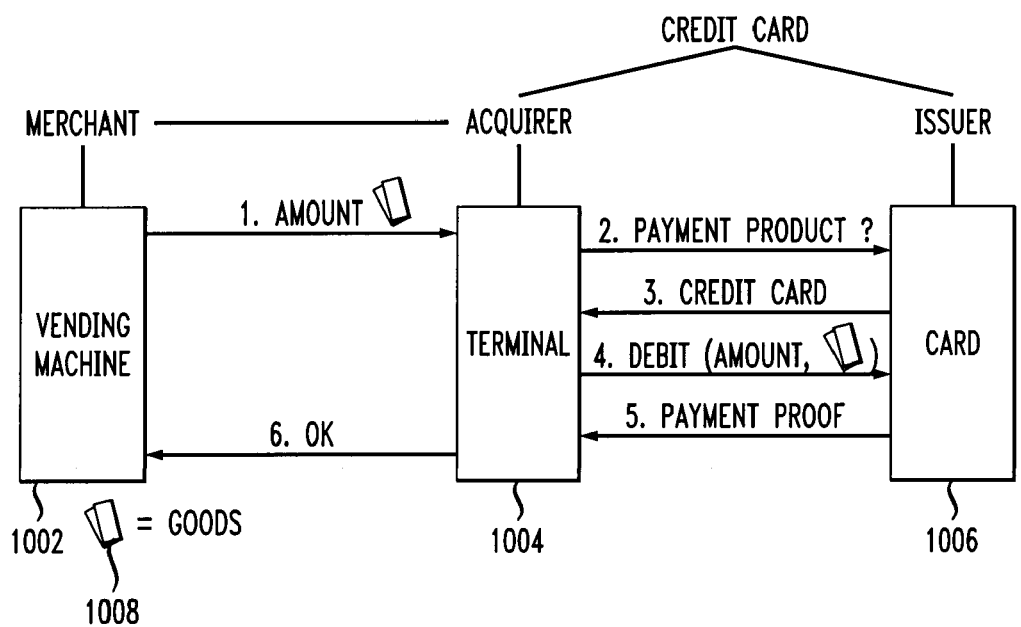
FIG. 10 shows purchase within an exemplary inventive extended trust model.
Figure 11:
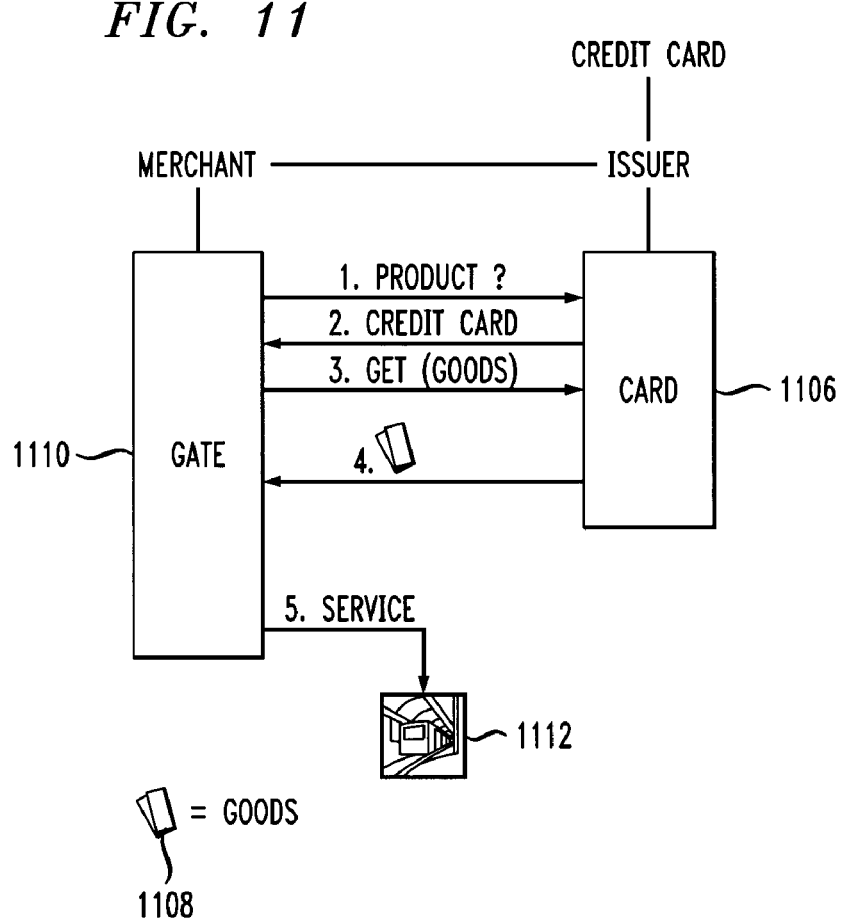
FIG. 11 shows usage within the exemplary inventive extended trust model.

The extended trust model applies when the goods are in electronic format. In this case, the e-merchandise gives access to a service (transport, music, and the like), further referred to as "usage". A typical case is a client buying a ticket (e-merchandise) at a vending machine and then putting the ticket into a turnstile to open the gate (usage). If it concerns an e-ticket, a data carrier is needed to hold the data. One choice for such a data carrier is the payment card used for buying the ticket. As the card is the carrier of the ticket, the card will be involved at time of usage. This extra involvement of the card requires an extension of the trust model to include both acquirer and issuer. FIG. 10 illustrates the proposed trust model for buying an e-ticket at the vending machine; FIG. 11 illustrates the proposed trust model at the gate.

Unlike FIG. 9, the vending machine 1002 in FIG. 10 provides the goods (e-merchandise) 1008 to the terminal 1004 prior to confirmation of payment. This requires an additional level of trust from the merchant. The merchant relies on the acquirer to implement a transaction flow that prevents access to goods without payment. This additional level of trust from the merchant is acceptable as it concerns e-merchandise (binary data). The e-merchandise has no value other than the service it gives access to. In case of non-payment, the merchant bears no financial loss as long as a client cannot use the goods. The issuer of the card 1006 is depicted as in FIG. 9.

As seen in FIG. 11, when the client exchanges the e-goods 1108 for services such as rail transport 1112, the gate 1110 "talks" directly to the card 1106. As there is no payment to settle, acquirer and terminal are out of the loop. The merchant relies on additional card functionality as protection against counterfeit goods. Hence, there must be a relation of trust between the merchant and the issuer.

Counterfeit goods include:
1. data created by a fraudster that is similar to or the same as genuine goods
2. clones of genuine goods
3. replays of genuine goods.

Merchants already have ways of detecting fake goods in the gate. They rely on the card functionality to protect against cloning and replay. Therefore, within the extended trust model, the merchant relies on the issuer to control usage of e-merchandise and to provide countermeasures against cloning and replay.

In summary, in order for the extended trust model to work, the data storage should protect against:
1. usage of unpaid goods (extended responsibility of acquirer)
2. cloning of goods (extended responsibility of issuer)
3. re-use of goods (extended responsibility of issuer)

Protection against fake goods remains the responsibility of the merchant.

The relevance of having generic data storage functionality on card and terminal will now be described within the context of the extended trust model. In one or more inventive embodiments, protection mechanisms as just described can be implemented via a generic (payment) terminal
via a generic (payment) card
without requiring merchant controlled keys in either card or terminal.

The usage of generic devices allows:
Issuers to provide payment cards that
Can be used for ticketing, loyalty, and the like
Without a pre-arrangement between the issuer and the merchant
Without knowledge of the specific requirements of the merchant.
Acquirers to provide terminals that
Can be used for ticketing, loyalty, and the like
Without knowledge of the specific requirements of the merchant.
Merchants to use generic payment cards and terminals
As vehicle for their specific data storage application
Without knowledge of the payment application.

More detail will now be given on the functionality provided by the generic data storage. In order to have the full benefit, the data storage function in the card (and terminal) should allow for all merchant specific requirements. In one or more embodiments, the envisaged functionality covers may be as set forth in the following table:

| Functionality | Meaning |
| --- | --- |
| 1. Retrieval of different client profiles | Client profiles contain information about the client from the perspective of the merchant. The merchant can use the client profile for<br>giving access to particular services<br>determining the transaction amount<br>As the client profile is merchant specific, a single client may have different profiles for different merchants in the same card. |
| 2. Management of single tickets, booklets ("carnets") as well as subscriptions. | A single ticket provides a one-time access to a service. After usage, the merchant invalidates the ticket so that a client cannot use it again.<br>A booklet is a collection of single tickets. Hence, a booklet is a particular type of goods that is used gradually (e.g. one ticket at the time).<br>A subscription gives access to a service over a longer time. The validity of the subscription is defined by the merchant (a day, a week, a month, and so on). |

-continued

| Functionality | Meaning |
| --- | --- |
| 3. Management of receipts. | A receipt is proof given to the client when goods are exchange for services. It allows a customer to proof that he/she is entitled to use the service (e.g. being present on a train). Note: for subscriptions, receipts may not be necessary. |

One or more embodiments of the invention address the supply of e-merchandise (for example, ticketing data, loyalty data, and the like) to a card or other payment device, during the course of a payment transaction. The data is stored by the card or other payment device during a payment transaction and can subsequently be read from the card or other payment device. In some embodiments, data is read from the card during the Get Processing Options command, as part of the EMV flow. In particular, the terminal will issue a Get Processing Options command, and in such command, the terminal will, in that command, specify a new data parameter. This new data parameter is the identity of the operator that is performing the transaction (e.g., Transport for London, New York Metropolitan Transit Authority, and so on). The card (references to a card should be understood to include other appropriate payment devices unless specifically identified as limited to a payment card per se) will use that identity to retrieve the appropriate set of data that it has stored for that particular operator (or terminal). A set of data can be associated with each operator, to support many different operators with a single card.

The appropriate data stored by the card is read by the terminal during the Get Processing Options command. The payment transaction process continues, with the terminal reading the rest of the data from the card (e.g., normal payment data), deciding how much should be charged for the transaction (e.g., purchase of a ticket), based on the information that it has read from the card (e.g., profile data as described above), and then generating an appropriate set of e-merchandise related data to send to the card, corresponding with the payment. Note that in some instances, the payment amount may be zero (e.g., person eligible for a free ride). The terminal writes the data to the card using the Generate AC command that is actually used for the payment itself. Thus, the command that performs the payment is also the command that is used to write the new e-merchandise data to the card. A standard EMV transaction flow can then ensue, and the response, when performing the standard CDA data authentication, is authenticated by the terminal, thereby proving the legitimacy of the card and the e-merchandise related data.

In one or more embodiments, enhanced arrangements are provided to address the security of the data stored on the card. As set forth above, in some instances, security issues may be addressed using, e.g., the account number or device identity of the card, the transaction counter (ATC), and potentially a random number generated by the card. These pieces of data may be obtained from the card and used in securing the data against replay and/or skimming attacks, for example. A number of other security-relevant data items that are involved in the transaction could potentially be manipulated by an attacker in an attempt to compromise security. In one or more embodiments, techniques are provided wherein the terminal takes into account any one, some, or all of these additional security-relevant data items (possibly together with any one, some, or all of the account number or device identity of the card, the transaction counter (ATC), and random number, as discussed above) and hashes them together to form a "summary" data item. Furthermore, in one or more embodiments, the card also independently calculates this "summary" data item.

In one current exemplary approach, the "summary" data item calculation includes the account number or device identity of the card, a random number generated by the card, the amount of the transaction, and the currency code of the transaction. If data is being supplied to the card for it to store (e.g., e-merchandise related information), and if a certain amount of value is being charged for that data, it would be highly undesirable if an attacker were able to reduce or eliminate the amount value that should appropriately be charged (e.g., reducing a $10 charge to $1). A number of different parameters (data items) can be hashed into the "summary" data item as discussed elsewhere herein.

As described above, in some instances, the account number and the ATC are employed and such data is sent along with the e-merchandise related data, and a MAC on the data, to the card; the card validates whether the account number matches the card's own account number, whether the ATC value matches the ATC known by the card, and the card refuses to store the data if there is not a successful match of these parameters. In one or more embodiments, the terminal calculates the "summary" data item by hashing together all the relevant pieces of data about the transaction, and the card carries out the same calculation independently.

In theory, the two independently-calculated values of the "summary" data item should of course match. In one or more embodiments, there is no need to transmit the "summary" data item from the terminal to the card, or for the card to check the terminal-calculated value; rather, the terminal calculates its MAC on the data it wants to store on the card using the terminal-calculated "summary" data item value (in a manner analogous to the approach described above wherein the terminal calculates the MAC over the data incorporating the card identity and the ATC), the data is written to the card, and, as the card has calculated its own value of the "summary" data item, the card merely stores the card-calculated "summary" data item along with the data (e.g., e-merchandise-related information and any operator MAC).

The card will typically not refuse to store the data, even if the data is not "correct," since if anyone has interfered with any of the security-relevant details of the transaction (e.g., amount, currency code, type of application cryptogram requested) then the card will have generated a different value for the "summary" data item as compared to that calculated by the terminal. For example suppose the terminal "wants" to charge $10 for the data, but an attacker has interfered with the transaction and the card has only been asked for $1, then the card will have calculated a different value for the "summary" data item than that calculated by the terminal.

When the data is then read back from the card in the future, the terminal will receive both the operator data previously stored and the value for the "summary" data item calculated by the card. When the terminal attempts to validate the MAC of the stored data, by using the value for the "summary" data item calculated by the card and returned to the terminal, the MAC will not validate, because the card had a completely different value for the "summary" data item than the value for the "summary" data item calculated by the terminal and used by the terminal when it initially stored the data onto the card.

Thus, in one or more embodiments, rather than using two or three specific data items pertaining to the card and the transaction, i.e., the account number or device identity of the card, the transaction counter (ATC), and potentially a random number generated by the card, one or more embodiments incorporate a number of other data items which are potentially relevant to the security of the transaction, wherein the modification of any of such items by an attacker is at least potentially detrimental to the security of the system, in terms of obtaining data (such as e-merchandise-related information) without paying the appropriate fee for same. One or more embodiments reduce or eliminate the possibility of such an attack being successful by having the card and the terminal calculate the (nominally) same "summary" data item (hash of the relevant transaction data). The operator, when it produces the data to be stored on the card, MACs its data and incorporates its value of the "summary" data item within the MAC calculation. The operator can thus ensure that the data it reads and checks as valid had not had any of the associated transaction parameters modified during the process where the data was actually given to the card.

In one or more embodiments, when the card performs the CDA signature at the end of the Generate AC command, also included in the signature calculation, on top of the normal transaction processing, is the value of the "summary" data item associated with the data that was stored on the card before the transaction, and the value of the "summary" data item stored on the card at the end of the transaction. In essence, a signature of the before and after values of the "summary" data item is obtained. This enables the terminal to verify that the data is being returned by an authentic, genuine card, in all its details. In certain techniques discussed above, the terminal undertakes CDA verification and verifies that the account number of the card is the same using the verification of the CDA process. However, this approach does not necessarily give an indication regarding other details pertaining to the transaction. In one or more embodiments, by including the "summary" data item in the CDA signature, it is possible to verify that the entirety of the data elements included in the calculation of the "summary" data item were indeed correct at the time the data was stored by the card.

This extension to the CDA process enables the terminal to gain more detailed verification of the authenticity of the data that was stored on the card at the beginning, and at the end, of the transaction.

Purely by way of example and not limitation, consider transit on the London Underground system. The fare will depend on the number of zones the passenger travels through. Suppose a subject embarks on a journey and presents his or her card to the entrance fare gate at the onset of the journey. The system will usually store, on the card, information regarding where the subject joined the system (e.g., what station). The system will typically also at this time charge a minimum fare and validate that the subject is presenting an authentic, legitimate card, and therefore reduce the credit risk of traveling on the system. In one or more embodiments, the terminal associated with the fare gate will perform a 'normal' EMV transaction, it will perform a Get Processing Options command to the card to initiate the transaction, and it will specify the operator that is performing the transaction as being London Underground (as opposed to the New York MTA, for example). The card will search its stored data and endeavor to find any existing data that it has stored for London Underground, and will return same. Such data could relate, for example, to a previous journey, existence of a season pass or a special fare category such as child or pensioner (retiree or senior citizen who has exceeded a certain age), or the like. In some instances, no data may be stored.

Assume, for the sake of argument, that profile data is present and that it indicates that the subject is a child. Recall that the card has received the operator identity (London Underground) from the terminal at the start of the transaction (Get Processing Options), and has retrieved the data indicating that the subject is a child. The card will return such data to the terminal along with the "summary" data item value that was stored in association with the existing (in this case, profile) data in connection with the previous transaction that stored the data. The value will be returned to the terminal, along with the data that the terminal stored (i.e., was stored in the card for this operator—assume, for example, that the same includes a MAC that is calculated by the operator over the profile data indicating that the subject is a child, and the "summary" data item value). The terminal will verify that the MAC is correct; if so, it knows that at least in theory the subject is a child. The terminal will store data onto the card indicating the start of the journey, by performing the normal EMV Generate AC command, and, in the process of doing so, the terminal will write back to the card the data indicating that the subject is a child, as well as additional data indicating that the subject has entered the system at a particular station.

In order to protect this new data, the terminal will hash together the necessary data items to form the new value of the "summary" data item, to calculate a new value of the "summary" data item. The terminal will then calculate a new MAC over the new data that indicates that the subject is a child and provides a ticket indicating that he or she boarded the system at a particular station, e.g., St. Paul's station. The new MAC and the data are sent to the card with a Generate AC command.

For the avoidance of doubt, the terminal and the card each independently calculate the value of the "summary" data item. The terminal MACs the data using the value of the summary that it has calculated. It provides to the card the data and the corresponding MAC. The value of the "summary" data item does not need to be stored within the transit system.

The transit system writes the appropriate data, which may, in at least some instances, be associated with a payment transaction. For example, there may be a minimum fare (say £3) that all users of the system pay regardless of the length of the journey. So, the terminal may write the data in the Generate AC command, while also requesting payment for the minimum charge of £3. Thus, the terminal is submitting to the card data that it has just calculated, and is also charging the card £3. The value of the "summary" data item that the terminal calculated was calculated using, as one of the input parameters, the £3 charge (both amount and type of currency) which is to be charged for the data (here, ticket indicating the journey so far). The £3 charge is thus incorporated into the calculation of the value of the "summary" data item. This value is used in the MAC of the data. The data is written to the card in the Generate AC command, which also includes the request for the £3 charge. The card will store the new data in its memory along with the card-calculated value of the "summary" data item that it has calculated at the same time during the transaction, and then return the normal EMV CDA signature confirming the outcome of the transaction, including the normal EMV parameters that are authenticated as part of the CDA transaction (e.g., transaction certificate needed for the payment processing and clearing). However, also included in the CDA calculation at the end of the Generate AC command will be the value of the "summary" data item that was stored in the card at the beginning of the transaction (which was read at the beginning of the transaction in the Get Processing Options command processing and was returned along with the data confirming that the card holder was currently recognized as a child). Also included in the CDA calculation is the newly-calculated value of the "summary" data item that is associated with the new data that has now been stored in the card (i.e., pertaining to the new transaction of £3). The storage of the new data indicates that the subject is still a child and a ticket has now been given to the subject by London Underground.

The terminal receives and verifies the CDA signature. Given that the terminal has already validated the MAC, the terminal can verify that the data that it received during the beginning of the transaction in the Get Processing Options command (e.g., entitlement data indicating that the subject is a child) really did come from the card, is genuine data, and was currently stored on the card at the beginning of the transaction, and has not been replayed from any earlier time or instance, and has not been taken from any other card or any other instance, and was basically the data in place at the beginning of the transaction (was the value of the "summary" data item at the beginning of the transaction). Equally, the terminal can verify that data has just been written and stored in the card in such a manner that when it is next read from the card in the next transaction it will be valid and its MAC will verify provided the data itself has not been modified. The terminal needs to check the summary against that provided in the Get Processing Options response and may also check the summary against that expected for the new data. The terminal can then determine if everything is in order in terms of the data originally stored in the card in the first place (e.g., subject is a child); data was genuinely stored by the card and the terminal has verified that it is authentic by checking its own MAC on it based on the "summary" data item value that it was given; card has confirmed that the "summary" data item value was stored by the card at that time; new data has been successfully written to the card; new "summary" data item value that has been calculated is same as that calculated by the terminal which confirms that the transaction data corresponds to expected transaction amount and transaction outcome. If all is in order, the turnstile (fare gate) can be opened, and access can be granted to the system.

For the avoidance of doubt, the terminal needs to check the "summary" of the data at the beginning of the transaction that is included in the CDA signature against that provided in the Get Processing Options response in case the data that was received in the Get Processing Options response was a replay of some data that had been previously stored and valid at that time but is no longer actually stored and is therefore not valid. The card does not need to check that the "summary" the terminal calculated matches what the card calculates so in one or more embodiments the terminal's version isn't even transmitted to the card. If the card had calculated a different value then the operator's MAC over the data will be found to be invalid when the data is next read. The terminal may also check the new "summary" that is included in the CDA signature from the card against that expected for the transaction performing the write of the new data. The terminal might not care about this value knowing that if it was wrong then the new data's MAC will be invalid. It may simply just care that the value is different from the value at the beginning of the transaction which confirms that something was actually written and therefore the old data has been erased. It may want to detect that the value does not match the value expected so that it can attempt to repair the situation so that the cardholder does not have problems when he or she attempts to use the data e.g. it may attempt to write the data again.

Consider now exit from the system at the end of the ride. The terminal associated with the exit fare gate will carry out a similar process. It will read the data currently stored on the card, during the Get Processing Options command, it will get back the data itself and the "summary" value that was calculated when the data was stored, it will validate the data by verifying the MAC on the data that it calculated using the "summary" data item value that it is given from the card. The terminal validates that the MAC included in the data is correct and also calculates how much (if anything) more to charge the card holder for the completion of the journey, based on the start point of the journey as stored on the card, and the exit location. The terminal concludes the transaction requesting the additional payment (e.g., £1). During the processing of the Generate AC command the terminal updates the data stored on the card to indicate that the subject has left the system and paid the additional required fee, and now the journey is complete. Again, the terminal will get back in the CDA signature of the transaction confirmation of the "summary" data item value stored in the card at the beginning of the transaction, and a confirmation of the "summary" data item value stored in the card at the end of the transaction.

If anyone attempted to tamper with the data stored on the card (e.g., at which station the subject got on or off), such tampering would invalidate the MAC that is calculated by the operator and stored with the data. For the avoidance of doubt, the identity of the station at which the subject boarded is typically not part of the "summary" data item value but rather is part of the operator's data per se; i.e., data that the operator is storing. In one or more embodiments, the data that is part of the "summary" data item value includes details related to the payment transaction that occurred when the data was stored, e.g., the fact that £3 was paid for the ticket, the identity of the card and the instance of the transaction (to prevent replay). The new summary value and all of the operator's data (e.g., profile, station where the subject boarded, etc.) is all MAC-ed by the operator in the operator's proprietary MAC which the operator calculates and stores with the data. If anyone attempts to modify the operator's data (e.g., at which station the subject boarded), then, inasmuch as this is part of the data that was MAC-ed, the MAC will not validate, thus protecting the operator in a well-known manner.

Use of the "summary" data item value, in accordance with one or more embodiments of the invention, advantageously addresses the situation where an attacker manipulates data pertaining to the transaction, e.g., amount. This would cause a difference in the calculated "summary" data item values, which will in turn result in the MAC, and thus the data itself, being found to be invalid. For example, suppose the subject boards the system at St. Paul's station but somehow manipulates the card to only deduct £1 instead of the usual £3 minimum charge. The terminal sends the ticket to the card, along with the request for £3, and the subject changes the amount from £3 to £1 in an attempt to obtain a cheaper ticket. The card, when it calculates the "summary" data item value, will use £1 instead of £3, as expected by the terminal, which means that the card will calculate a different value for the "summary" data item value than will the terminal. As a consequence, when attempting to leave the system, the terminal at the exit station will not be able to validate the MAC because the value of the summary was different than expected. Whilst the CDA process would immediately tell the terminal that the amount had been altered, the card would report valid data to the next terminal; by including the amount in the summary the data is invalidated for future transactions.

If an attacker attempted to take the data stored on a legitimate card and simply replay it to the operator, then the attacker could not satisfy the condition that the summary value is included in the CDA signature of the transaction, to prove that the card is authentic and genuine. If an attacker attempted to store the data onto a new and different card, then an entirely new and different "summary" data item value would be calculated, and again, when the data was read in an attempt to use the different card, the data would not be valid.

Thus, the "summary" data item value, in accordance with one or more embodiments of the invention, is used by both the card and the terminal to ensure the security of the data.

By binding the data that is being paid for (e.g., e-merchandise related information such as a ticket) with the payment being requested, through the use of the "summary," it is possible to ensure that even if the subject prevents the payment from occurring, the ticket or other data that has been obtained is useless, since the card will not calculate the same "summary" data item value as the terminal. If an attacker tries to interfere with any details of payment such as amount, currency, state of card when it was doing the payment, again, the data written to the card will again be invalid because it has been inherently bound to the details of the transaction using the "summary" data item value. Thus, in essence, the operator may safely "give away the goods" before the payment has finished successfully; however, the goods will be invalid in case of any interference with the payment process, e.g., amount, type of currency, and so on, since the "summary" data item values will not match and the data itself will be invalid.

By way of recapitulation, in one or more embodiments described in U.S. patent application Ser. No. 12/102,472 and U.S. Pat. No. 7,374,082, the account number or device identity of the card, the transaction counter (ATC), and potentially a random (unpredictable) number generated by the card, are included along with the data (e.g., e-merchandise related information such as a ticket) that is being stored by the merchant, and in a MAC of such data. These two or three data items, in combination with the data and the MAC, are employed to provide some security. Since the card already knows these items, it is not really necessary to include them in the data transmitted to the card as long as they are included in the terminal's calculation and verification of the MAC and stored by the card.

It should be noted that in one or more instances, the ATC is not included.

To extend such one or more embodiments described in U.S. patent application Ser. No. 12/102,472 and U.S. Pat. No. 7,374,082; for example, by incorporating another relevant security parameter such as the amount of the transaction (i.e. how much is being charged for the data), again, it does not need to be transmitted from the terminal to the card as part of the data (e.g., e-merchandise related information such as a ticket), because it is already known as part of the financial transaction that is occurring. The amount is but one of a number of different data items that may be relevant. Again, these data items do not need to be transmitted to the card because they are already known. In one or more embodiments of the present invention, replace all the security relevant transaction data by simply hashing together all the relevant parameters (both the card and terminal hash the same set of data), with no need to transmit the hash result per se but rather incorporating same into the MAC calculation of the data to be stored.

Purely for purposes of illustration and not limitation, a specific example will now be provided. In some instances, non-payment related data may be stored in so-called "slots," also referred to as Integrated Data Storage (IDS). In this aspect, some embodiments of the invention may be employed in the context of a payment and data storage specification which supports containers or slots in which data can be stored and subsequently retrieved. The slots are dynamically assigned to a "DS Operator ID" (abbreviated as DS_OID) and have a variable size between 0 and 160 bytes.

In one or more embodiments, software, a finite state machine, and data organization are designed for a dual interface platform. In some instances, all the slots of the application are the same; they have the same data storage capabilities, accessible over both a contact and contactless interface. The functionality of each slot can be changed through personalization, post-issuance updates, or updates as part of transaction processing. These changes take effect for both interfaces so that the functionality is always the same for contact and contactless. (References to "always," "Mandatory" and the like are in the context of a particular embodiment and may be optional in other embodiments).

In one or more embodiments, the data storage functionality includes six stages that integrate into the single finite state machine of the payment application. These stages are:
(1) Activation of the data storage functionality
(2) Selection of a slot
(3) Reading of the slot data
(4) Association of a slot to an identifier of the data storage operator (DS Operator ID or DS_OID)
(5) Updating of the slot data
(6) Confirmation of the slot status Depending on the DS Operator ID (DS_OID) and whether a slot is already assigned to this DS_OID, some of these stages are combined and/or can be skipped.

The commands triggering the transitions between the above stages are:
GET PROCESSING OPTIONS
First GENERATE AC
Second GENERATE AC The data storage functionality is activated by having the GET PROCESSING OPTIONS command include a non-zero value for the DS Operator ID (DS_OID) from the terminal. The activation of data storage triggers the reading of any existing slot data. A terminal not performing data storage would provide all zeros as the DS_OID and data storage would not be activated.

If a slot is already associated to the DS_OID sent by the terminal, then this slot is selected; otherwise, the card application will select an eligible slot for future association.

Data is written to the application by including data in the GENERATE AC command. The slot will be associated to the DS_OID sent by the terminal, if this was not already the case. Note that the GENERATE AC command does not include the DS_OID and that data is written to the slot that was read or selected in the GET PROCESSING OPTIONS command. Therefore, the successful execution of the write instruction (in the GENERATE AC) is conditional to the read instruction (in the GET PROCESSING OPTIONS). Once the data storage functionality is activated, the GENERATE AC response includes confirmation of the data storage processing in its CDA signature.

Figure 13:
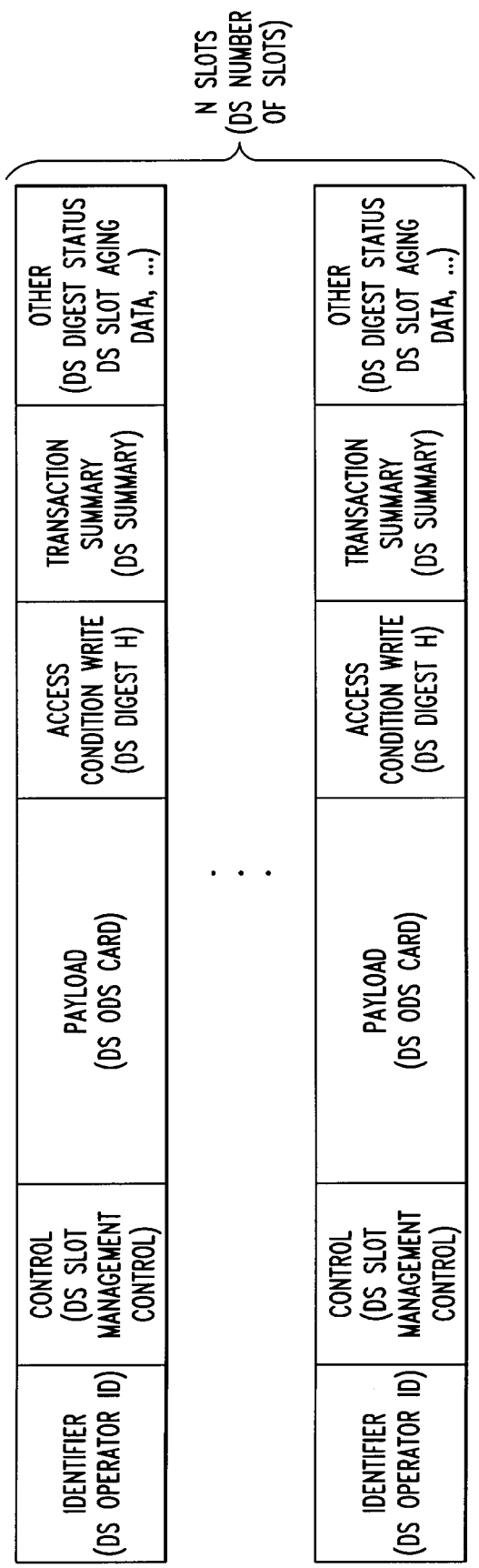
FIG. 13 depicts exemplary organization of slots.

In one or more embodiments, the slots are organized as depicted in FIG. 13.

The number of slots (DS Number Of Slots) is an implementation parameter and depends on the (non-volatile) memory allocated to integrated data storage (IDS).

The overall data storage configuration is set in DS Management Control (DS_MC) and is accessible through the GET DATA and PUT DATA (script) commands.

The setting of DS_MC decides on whether storage of permanent and/or volatile data is allowed. The difference between permanent and volatile data lies in the data retention.

For permanent data, the data retention is decided by the operator. Data can only be overwritten (or discarded) upon authorization of the operator and the card will not overwrite the data and re-assign the slot to a different operator when short of free space.

For volatile data, the card is in control of the data retention. The card can overwrite the data and re-assign the slot to a different operator when short of free space. The card can do so without authorization of the operator or the issuer. The application makes a further distinction between high volatile and low volatile data and manages an aging system for low volatile data.

By disabling data storage for both permanent and volatile data, the overall data storage is disabled. This means that the GET PROCESSING OPTIONS and GENERATE AC commands are processed as if the DS Operator ID (DS_OID) were all zeroes.

The setting of DS_MC also decides on whether the slot data can be read through the READ RECORD command.

Each slot has its own identifier, control setting, payload, access conditions, transaction summary, and other data. For each slot, all this data can be read using the READ RECORD command (if enabled in DS_MC) and written using the UPDATE RECORD (script) command. This mechanism is different and separate from the mechanism explained above (using the GET PROCESSING OPTIONS and the GENERATE AC command) and has a different purpose. The READ RECORD and UPDATE RECORD commands should be used for administrative purposes only (e.g. configuration of the data storage at a Bank Branch Terminal) while the GET PROCESSING OPTIONS and GENERATE AC mechanism is intended for normal transaction processing.

For data access using the READ RECORD and UPDATE RECORD commands, the slots are organized as records of an Application Elementary File (AEF), with Short File Identifier SFI=14. There is one slot per record, embedded in an 'E5' template, with all the data elements BER-TLV coded. It should be noted that the person having ordinary skill in the art will be familiar with the EMV specifications and the ISO 7816 standard and will consequently be familiar with the terminology employed herein. The different data elements are explained below:

The identifier is an eight byte value, referred to as DS Operator ID (DS_OID).

The control information is stored in the DS Slot Management Control (DS_SMC) and includes the access conditions for read and write. DS_SMC indicates whether
  the data is either permanent or volatile; a slot cannot contain permanent and volatile data at the same time
  the slot is activated or deactivated; when deactivated, only the control information (DS_SMC) of the slot is returned in the response to the GET PROCESSING OPTIONS command and the slot cannot be updated in the GENERATE AC command.
  the slot is locked or unlocked; when locked, the data are returned in the GET PROCESSING OPTIONS but they cannot be updated in the GENERATE AC command.

An initial value for DS_SMC is personalized by the issuer for each slot.

The payload is referred to as Operator Data Set (ODS). It has variable length and its maximum length is set by the length of the data that can be written to the application (see writing slot data below).

When writing permanent data to a slot, the terminal installs access conditions in the form of DS_DIGEST. DS_DIGEST is the result of a one-way-function (OWF) over a value known to the terminal. A future update of the slot is subject to knowing the pre-image of DS_DIGEST. This pre-image will be referred to as DS_INPUT_T. An initial value for DS_DIGEST is personalized by the issuer for each slot.

A hash of transaction and context data is stored in DS_SUMMARY. DS_SUMMARY is a security imprint taken when the data is written in the slot. It is the result of the card hashing a collection of transaction data (such as Amount Authorized and Transaction Currency Code) and context data (such as the previous value of DS_SUMMARY). An initial value for DS_SUMMARY is by the issuer for each slot.

The slot also contains other data to manage the slot. Two examples are given below:
  Aging: as indicated above, the application manages an aging system for low volatile data that allows it to identify the slot with low volatile data that was least recently updated. For ease of reference, the data elements associated with the aging mechanism are referred to as DS Slot Aging Data (DS_SAD).
  DS_DIGEST Status: while all slots have the same functionality, only a number of slots can contain permanent data and the other slots can only contain volatile data. At personalization, each slot will get a value for DS_DIGEST and a setting indicating whether the DS_DIGEST is meaningful or not. This flag is called DS_DIGEST_STATUS. When the flag is set, it means the DS_DIGEST is meaningful and can be used as an access condition for writing permanent data to a slot. When the flag is not set, the DS_DIGEST is meaningless. The number of meaningful DS_DIGESTs is also the maximum number of slots that can contain permanent data.

In one or more embodiments, there are two data storage functions, namely, read and write, and writing is conditional to reading the data first.

Reading Slot Data: As indicated above, the data storage space is logically organized in slots and each slot can be identified using a DS Operator ID (DS_OID). The terminal includes the DS Operator ID (DS_OID) in the GET PROCESSING OPTIONS command and the card will do the following checks:
  If the DS_OID value field in the GET PROCESSING OPTIONS command data is all zeroes, the terminal did not select any slot and does not want to perform data storage. Going forward, the data storage functionality is deactivated for this transaction. The GET PROCESSING OPTIONS command does not return any data storage related data and the GENERATE AC command will perform the same as for payment i.e. without the capability of including additional command data.
  If the DS_OID value field in the GET PROCESSING OPTIONS command data is different from all zeroes but the overall data storage configuration DS Management Control (DS_MC) has data storage deactivated (by disallowing both volatile and permanent data storage), then the card does not return any data storage related data and data storage will remain deactivated throughout the transaction.
  If the DS_OID value field in the GET PROCESSING OPTIONS is different from all zeroes and the overall data storage configuration DS Management Control (DS_MC) allows at least one type of data storage (volatile and/or permanent), then the card will do a (full) match between the DS_OID value field and the identifiers it has associated to its slots.

If there is a match, the slot is selected and the application will
 return the data associated to this slot if the slot is activate (as per DS_SMC (slot management control)); the data returned are DS_SMC, DS_ODS (operator data set)_CARD and DS_SUMMARY_1 or
 return only DS_SMC if the slot is deactivated.
 Reading the slot does not change the slot contents.
If there is no match, no slot is allocated (yet); there is no slot data to return and the application returns a zero value DS_SUMMARY_1.

The above is summarized in the table of FIG. 14. DS Slot Management Control (DS_SMC), DS_ODS_CARD and DS_SUMMARY have already been explained above. The notation DS_ODS_CARD and DS_SUMMARY_1 is used here to indicate the ODS and DS_SUMMARY returned in the GET PROCESSING OPTIONS command.

In the response to the GET PROCESSING OPTIONS command, the application may also return the DS Slot Availability (DS_SA) and a DS Unpredictable Number (DS_UN), two elements that are relevant for writing data to the slot. The presence of DS_SA in the response data depends on whether a slot is already allocated to the specified DS_OID and, if so, the state of the slot:
 If a slot is allocated and the slot is deactivated, then DS_SA is not returned.
 If a slot is allocated and activated or no slot is currently allocated, then DS_SA is returned.

The presence of DS_UN depends on the presence and the value of DS_SA:
 if DS_SA is present and has a value different from 'No slot is available,' then DS_UN is returned.
 if DS_SA is not present or DS_SA has a value equal to 'No slot is available,' then DS_UN is not returned.

The above is summarized in the table of FIG. 15.

The DS Slot Availability (DS_SA) has one of four values which are coded on the two most significant bits. The value of these two most significant bits is decided in two steps.
 Its initial value is set in line with DS_MC:
  (1) No slot is available (00b)—when storage of permanent data or volatile data is not allowed (b=binary)
  (2) Only a slot for volatile data storage is available (01b)—when only storage of volatile data is allowed
  (3) Only a slot for permanent data storage is available (10b)—when only storage of permanent data is allowed
  (4) A slot is available for both volatile and permanent data storage (11b)—when storage of permanent data and volatile data is allowed
 In a second step, its value is refined, depending on whether a slot is actually available for storing data of each type (permanent or volatile) which depends on the currently allocated slot, if any, and the status of the rest of the slots.
  If no slot is currently allocated and no active slot can be found that is not currently storing permanent data then no slot is available (00b)
  If no slot is currently allocated and no active slot can be found that is not currently storing permanent data and that has a usable DS_DIGEST then the bit in DS_SA that indicates that permanent data storage is available is cleared (the most significant bit)
  If a slot is currently allocated but does not have a usable DS_DIGEST and no other active slot can be found that is not currently storing permanent data and has a usable DS_DIGEST then the bit in DS_SA that indicates that permanent data storage is available is cleared (the most significant bit)

If the outcome of the search for available slots is that a slot is available (two most significant bits of DS_SA not equal to 00b) and if no slot is currently allocated the application also searches for the slot that is most eligible in case data needs to be written.
 (1) Slots with high volatile data are first in line. Once such a slot is found, the application can stop its search.
 (2) Slots with low volatile data are second in line. In the case of multiple low volatile slots, the slot with the oldest data is chosen either by scanning all the low volatile slots or by an alternative technique.

The outcome of the scanning process is either a value of DS_SA with the two most significant bits different from 00b in combination with an available slot or a value of DS_SA with the two most significant bits equal to 00b and no available slot.

The full response of the GET PROCESSING OPTIONS command contains:
 the Application Interchange Profile (AIP)
 the Application File Locator (AFL)
 the applicable part of the table of FIG. 14
 the applicable part of the table of FIG. 15

As all data elements of the response are BER-TLV coded, the order of the data elements in the response is variable and up to the implementation. Except for DS_ODS_CARD, all data elements have fixed length. Also as the data is TLV coded, other data may also be returned if a specific implementation needs it.

Note that DS_ODS_CARD can have zero length; in this case the Tag and Length field of DS_ODS_CARD are still present in the response data but the value field is absent.

Writing Slot Data: If the terminal wants to update the slot data, the GENERATE AC command will contain additional data items in addition to the (payment) data indicated in the card risk management data object list (CDOL). These additional data items are listed in a dedicated Data Object List, called the Data Storage Data Object List (DSDOL). The DSDOL data items are appended after the CDOL data in the GENERATE AC command data and have a minimum length of 17 bytes.

If the terminal does not include additional data in the GENERATE AC command data (after the CDOL data), then the terminal does not want to write data. The content of the slot is left unaltered but the data storage functionality that was activated in the GET PROCESSING OPTIONS remains active. This is significant for the response to the first GENERATE AC command and for the second GENERATE AC command—if any.

If between 1 and 16 additional bytes, or more bytes than requested in DSDOL are included, the application rejects the command (SW12='6700', wrong length) and the content of the slot is left unaltered.

If the GENERATE AC command includes at least the minimum number of data bytes but the GET PROCESSING OPTIONS did not return DS_UN or the slot is locked, then the application rejects the command (SW12='6700') and the content of the slot is left unaltered. If however, the GET PROCESSING OPTIONS did return DS_UN and the slot is unlocked, then the card will attempt to process the write instruction.

Together with the update, the GENERATE AC command includes an indication of the criticality of the update. If the update is labeled critical and for some reason the update fails, the card application should decline the transaction and deliver an application authentication cryptogram (AAC). If the update is not considered critical, the success or failure of the data storage update has no impact on the Card Risk Management (CRM) and the resulting Application Cryptogram (AC).

The GENERATE AC command can change one of the following data elements or a combination thereof:

The type of data (permanent or volatile, high or low volatility)

The access condition for the data (DS_DIGEST)

The content of the data (value and length)

If the terminal wants to only change type, access or content, it must still include all the data elements in the GENERATE AC command and the data elements must be in the order specified in DSDOL, as the command data of the GENERATE AC command are not BER-TLV coded. Other embodiments could differ.

Given that ODS may have variable length, it must be the last data element in the GENERATE AC command data. For the card application, the content of ODS in the GENERATE AC command is transparent.

From hereon, the notation DS_ODS_TERM will be used to indicate the ODS sent in the GENERATE AC command.

The type of data and the criticality of the data is coded in a single data element requested by DSDOL, called DS_ODS_INFO and contains:

A setting for the type of data to store: permanent or volatile, high or low volatility A setting for the data update criticality: critical or non-critical.

The access condition for the data includes two data elements requested by DSDOL, DS_INPUT_T and DS_DIGEST. The application will use the values of DS_INPUT_T and DS_DIGEST or ignore them depending on the current and future type (permanent or volatile) of the data stored in the slot. For a slot to contain permanent data, it must have a meaningful DS_DIGEST (i.e. DS_DIGEST_STATUS set). Anyone that wants to alter this permanent data in any way (type or content) must provide a value for DS_INPUT_T so that the result of a one-way-function (OWF) over DS_INPUT_T is equal to the current value of DS_DIGEST. In one or more exemplary embodiments, the OWF is based on triple DES, it being understood that techniques besides triple DES could be used in other embodiments.

If, following the update, this slot is to continue to contain permanent data, then the new value of DS_DIGEST supplied in the GENERATE AC command data is installed so that the next update requires a new DS_INPUT_T value. If, following the update, this slot is to contain volatile data, then the new value of DS_DIGEST supplied in the GENERATE AC command data is equally installed but the slot data is set to volatile. This implies that the (new) DS_DIGEST is no longer associated with this slot. This (new) DS_DIGEST is now part of the pool of meaningful DS_DIGESTs (i.e. DS_DIGEST that are in slots that have DS_DIGEST_STATUS set) that are not used by a slot yet (i.e. DS_DIGESTs stored in slots that currently contain volatile data).

In a similar manner, access conditions must be satisfied for a slot that is to contain permanent data but that currently contains volatile data. When storage of permanent data is requested the card application will compare the result of the one-way-function (OWF) over DS_INPUT_T with the pool of meaningful DS_DIGESTs that are not used by a slot yet. If there is a match between the result of the one-way-function (OWF) over DS_INPUT_T and one of the DS_DIGESTs in the pool, then the DS_DIGEST of the slot of where the ODS data is to be written is swapped with the DS_DIGEST in the slot that contained the matching digest. The supplied DS_INPUT_T now corresponds to the DS_DIGEST that is stored in the slot where the ODS data will be written so the write is allowed and the new value of DS_DIGEST that was supplied in the GENERATE AC command data is installed for use next time the slot data is updated.

No access conditions are checked if the slot contains volatile data before and after the update.

The table of FIG. 16 provides a summary of the above. A '√' in the DS_INPUT_T column means the application checks the value of DS_INPUT_T; an 'x' means the application ignores this field in the GENERATE AC command data. A '√' in the DS_DIGEST column means the application replaces the old DS_DIGEST with the new value provided in the GENERATE AC command data; an 'x' means the application ignores this field in the GENERATE AC command.

The value and length of ODS are changed through the data element DS_ODS_TERM. The maximum length of DS_ODS_TERM is limited by the available space in the GENERATE AC command and reported by the card as the length of the DS_ODS_TERM data element in the card's DSDOL. The length of the command data in the C-APDU in EMV is limited to 255 bytes and the CDOL related data is at least 66 bytes. This leaves 189 bytes for the use by Integrated Data Storage, with a fixed overhead of 17 bytes for DS_ODS_INFO, DS_INPUT_T and DS_DIGEST. So DS_ODS_TERM is limited to approximately 160 bytes leaving some "headroom" for longer CDOL data.

DS_ODS_TERM can have zero length. If so, then the length of the DSDOL related data is 17 bytes and the ODS data are 'erased.'

The GENERATE AC command data includes the following DSDOL data elements:

DS_ODS_INFO—1 byte
DS_INPUT_T—8 bytes
DS_DIGEST—8 bytes
DS_ODS_TERM—0 to 160 bytes Data storage updates may fail as part of normal processing or because of errors in the command data. Within the latter, distinguish format errors from application errors.

Normal processing: if the Application Cryptogram (AC) requested by the terminal in the GENERATE AC command differs from the Application Cryptogram resulting from Card Risk Management, then the data storage update in this command fails. The content of the slot is left unaltered and the failure of the data storage update is reflected in the value of the DS_SUMMARY returned rather than by the command returning an error code (SW12≠'9000'). If the terminal asked for an Application Cryptogram (AC) that was different from an AAC then it can detect that the data storage update failed by comparing the requested AC type and the AC type provided by the card.

Format error: there is only one format error possible which is that DS_ODS_INFO has an invalid coding and indicates that the new data should be both permanent and volatile, neither permanent nor volatile, permanent and low volatility, or that the bits reserved for future use (RFU) are not all set to zero then the content of the slot is left unaltered, the application returns an error code (SW12≠'9000'), and the transaction is aborted.

Application error:
DS_ODS_INFO requested a data type (e.g. volatile) while DS_SA indicated that this data type was not available (e.g. permanent only). In this case, the data storage update in this command fails If the slot contains permanent data, and therefore has a DS_DIGEST associated to it, the application will check whether OWF (DS_INPUT_T) is equal to DS_DIGEST. If this is not the case the data storage update in this command fails.

If permanent data is being stored and the slot does not already contain permanent data the application will check whether OWF (DS_INPUT_T) matches one of the pool of unused meaningful DS_DIGESTs. If this is not the case the data storage update in this command fails.

In all three cases, the content of the slot is left unaltered and the failure of the data storage update is reflected in the value of the DS_SUMMARY returned rather than in the command returning an error code (SW12≠'9000'). If the data update is labeled 'critical' (in DS_ODS_INFO) then the application will decline the transaction and return an AAC.

If all the above checks pass then the application will update the data, using the following steps:
  Update DS_DIGEST as described above in the table of FIG. 16.
  If the new data is low volatile, update the DS Slot Aging Data (DS_SAD).
  Update the DS Slot Management Control (DS_SMC) information in line with the type of the new data (as indicated in DS_ODS_INFO).
  Update the length and value of the slot data with the length and value of DS_ODS_TERM The application will then calculate a new DS_SUMMARY. The new DS_SUMMARY is the result of the card hashing a collection of transaction and context data. The full list of the data elements included in calculation of the DS_SUMMARY and the calculation method is given below. Note that in this exemplary embodiment, the list does not include DS_ODS_TERM.

If the GENERATE AC command requests a CDA signature, and independent on whether the data storage update is successful or not, the ICC Dynamic Data will always include two values of DS_SUMMARY, referred to as DS_SUMMARY_2 and DS_SUMMARY_3. DS_SUMMARY_2 is the value of DS_SUMMARY prior to the update while DS_SUMMARY_3 is the value of DS_SUMMARY after the update—if any. When the data storage functionality has been activated a CDA signature is always returned the GENERATE AC response if it was requested in the GENERATE AC command irrespective of the type of Application Cryptogram returned (e.g. a CDA signature will also be returned for AACs).

As indicated above, DS_SUMMARY_2 and DS_SUMMARY_3 are appended at the end of the ICC Dynamic Data, resulting in the layout of the ICC Dynamic Data as shown in the table of FIG. 17.

For the first GENERATE AC command:
  DS_SUMMARY_2 has the same value as DS_SUMMARY_1 i.e. the DS_SUMMARY as returned in the response to the GET PROCESSING OPTIONS command.
  If the data storage update is successful, then DS_SUMMARY_3 is calculated over the transaction and context data which includes DS_SUMMARY_2. If the data storage update is not successful, DS_SUMMARY_3 has the same value as DS_SUMMARY_2 (as the content of the slot is left unaltered)

For the second GENERATE AC command:
  DS_SUMMARY_2 has the same value as DS_SUMMARY_3 in the first GENERATE AC (or DS_SUMMARY_1 in the GET PROCESSING OPTIONS if no update was done in the first GENERATE AC)
  If the data storage update is successful, then DS_SUMMARY_3 is calculated over the security relevant transaction and context data which includes DS_SUMMARY_2. If the data storage update is not successful, DS_SUMMARY_3 has the same value as DS_SUMMARY_2 (as the content of the slot is left unaltered)

The above is illustrated via two non-limiting examples. For the examples, only a single slot is considered and the following assumptions apply:
  The DS_SUMMARY currently stored in the slot has value A.
  In a first transaction,
    the first GENERATE AC performs a data storage update that is successful.
    the second GENERATE AC performs a data storage update that is not successful.
  a second transaction,
    the first GENERATE AC does not contain a data storage update.
    the second GENERATE AC performs a data storage update that is successful.
  For both transactions, the first and the second GENERATE AC request a CDA signature in the response.

For the first transaction:
  When the data is read using the GET PROCESSING OPTIONS, the response to this command will include a value A for DS_SUMMARY_1.
  The response to the first GENERATE AC command will contain the value A for DS_SUMMARY_2 and will contain the value B calculated from the transaction and context data (which includes the value A as the previous DS_SUMMARY) for DS_SUMMARY_3.
  The response to the second GENERATE AC will contain the value B for DS_SUMMARY_2 and will equally contain the value B for DS_SUMMARY_3.

For the second transaction:
  When the data is read using the GET PROCESSING OPTIONS command, the response will include the value B for DS_SUMMARY_1.
  The response to the first GENERATE AC command will contain the value B for DS_SUMMARY_2 and DS_SUMMARY_3.
  The response to the second GENERATE AC will contain the value B for DS_SUMMARY_2 and will contain the value C calculated from the transaction and context data (which includes the value B as the previous DS_SUMMARY) for DS_SUMMARY_3.

Comments will now be provided on one exemplary and non-limiting form of a one-way-function to calculate DS_SUMMARY. The technique is based on triple DES (Triple Data Encryption Algorithm (TDEA) block cipher). The DS_SUMMARY calculation uses three keys. The technique uses a 12 byte data element called DSPK (Data Storage Partial Key). The value of this data element is derived from the Data Storage Identifier (DS_ID) which is an identifier that is included in the File Control Information of the application so that the terminal retrieves this data element as part of the application selection. The value of DSPK is personalized in the card during personalization and calculated from DS_ID by the terminal when required. DSPK is calculated from DS_ID as follows:

DSPK[i]:=((DS_ID[i] div 16)×10+(DS_ID[i] mod 16))×2, for i=1, 2, . . . , 6 DSPK[6+i]:=((DS_ID[PL−6+i] div 16)×10+(DS_ID[PL−6+i] mod 16))×2, for i=1, 2, . . . , 6
  where PL is the number of bytes in the card's PAN+1

In addition to above, the data storage operator will typically implement its own proprietary algorithms to protect the authenticity and integrity of the operator data set (ODS) data it stores on the card. It is expected that the operator will generate a MAC on the data it wishes to store and include this MAC with the ODS data it writes to the card. It is also expected that the operator will include the value of DS_SUMMARY in the calculation of this MAC and thereby ensure that any attempt to interfere with correct storage of the data will invalidate the MAC rendering the stored data useless.

Figure 18:
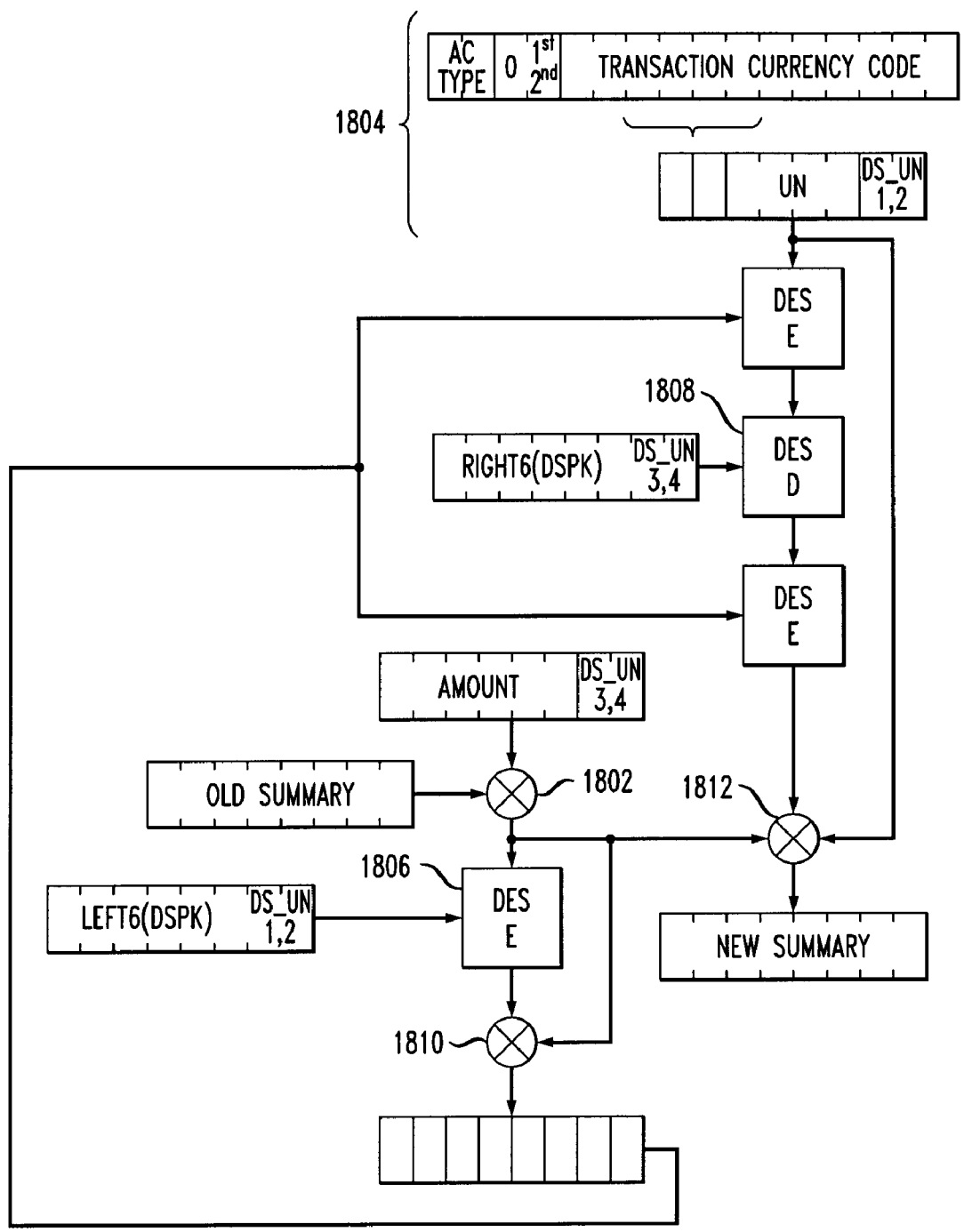
FIG. 18 depicts an exemplary summary calculation.

Reference should now be had to FIG. 18. For the DS_SUMMARY calculation, the card application takes the following input:

Amount-Authorized (numeric)
Transaction Currency Code
Unpredictable Number
Type of Application Cryptogram requested i.e. TC, ARQC or AAC; the coding is equal to bit 8 and bit 7 of Reference Control Parameter P1 in GENERATE AC command, with bits 6-1 set equal to zero.
DS Unpredictable Number (DS_UN)
Flag indicating first GENERATE AC or second GENERATE AC command (0b for $1^{st}$, 1b for $2^{nd}$)
The current value of DS_SUMMARY (that may be zeroes if a new slot is being allocated)
DSPK The DS_SUMMARY is calculated in three steps:
(1) Two blocks each of eight bytes are created:
   a. The first block is created by X-ORing the current DS_SUMMARY with the concatenation of the Amount-Authorized and last two bytes of DS_UN, as at 1802.
   b. The second block is created by concatenating (well defined parts of) the information from the GENERATE AC command; the type of Application Cryptogram, the flag indicating first or second GENERATE AC command, the Transaction Currency Code, the Unpredictable Number (UN) from the terminal, and the first two bytes of DS_UN, as at 1804.
(2) Three temporary DES keys are created.
   a. The first and the second key are created using well-defined parts of DSPK and DS_UN, as at 1806, 1808.
   b. The third key is created by encrypting the first block with the first key and X-ORing the result of this encryption with first block, as at 1810.
(3) The second block is encrypted with the second and the third key, using triple DES and the result of this encryption is then X-ORed with the first and the second block, as at 1812.

A non-limiting exemplary security architecture will now be discussed. The security design is done against the following assumptions:

The service provided by the operator is based on the data read and is conditional to the data being authentic
The operator has a mechanism to prove to his own satisfaction that data have not been tampered with
The security of the resulting system is built on a combination of the operator's proprietary mechanism and strong EMV offline card authentication using public key cryptography, one-way functions, counters and random numbers
It is up to the operator to properly use the security mechanisms as proposed by an entity such as the operator of a payment card network (not to be confused with the transit or similar operator, referred to simply as "operator")
The operator has the option not to use the security mechanism(s) for goods that are considered of no value and that do not warrant protection against overwriting, cloning, copying or alteration.

The data storage security architecture must ensure that operators can implement systems wherein the data storage satisfies the security properties listed in the table of FIG. 19.

In one or more embodiments, each card is assigned a unique identifier, the Data Storage ID (DSID). At the beginning of every transaction involving data storage operations, the card generates an unpredictable number, called UNC.

Every data being written to a slot is protected by a MAC. That MAC is computed by the operator terminal, normally using an operator-specific secret key stored in the operator terminal. The way that this MAC is created, the technique used, or even if it is a cryptographic function at all, is purely the responsibility of the operator. It is the operator's responsibility to include that MAC in the ODS written to the card, so that it is stored by the card with the actual payload (e.g., e-merchandise-related information), and returned by the card with the data at the time or reading.

The card and the operator terminal share a way to compute a hash value called the Summary. The Summary is a data item that is:

Computed independently by both the card and the operator terminal at each write operation
Computed as a one-way function on the following input:
   Identity of the card
   Summary corresponding to the data already stored on the card
   Transaction-related data, including a card-provided random challenge (UNC).
Included by the operator terminal in the computation of the MAC on the operator data that is included in the ODS
Stored by the card with the ODS provided by the operator terminal
Returned by the card to the operator terminal when the data is read next time
Included in the CDA signature of the transaction to authenticate the data read.

The Summary is computed as described below under 'Skimming Controls.'

The Digest is a value stored by the card together with an ODS. The Digest is used for the purposes of write controls. The Digest is computed as described below under, 'Write Controls.'

The data storage security architecture relies on the security mechanisms listed in the table of FIG. 20.

Figure 21:
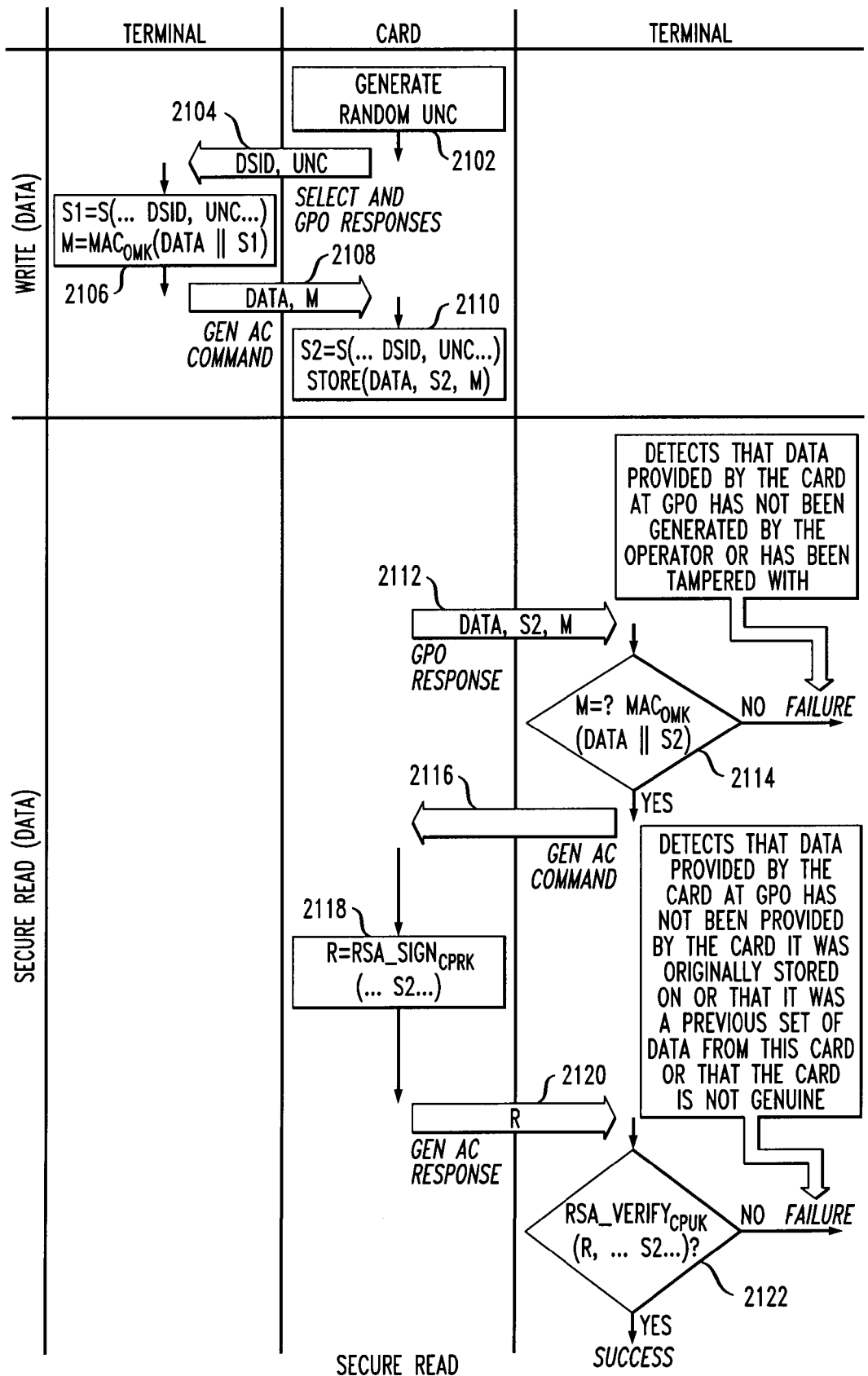
FIG. 21 depicts an exemplary secure read.

Data Writing: the data writing protocol is illustrated in the top part of FIG. 21. The relevant OID is provided to the card in the command data of the GET PROCESSING OPTIONS command. The GET PROCESSING OPTIONS response includes a card unpredictable challenge, the UNC (see 2102, 2104). The operator terminal computes a new Summary in 2106, based on the data to be written, on the UNC and on the received Summary. That new Summary is input, together with the data to be written, to the computation of the operator-proprietary MAC. That MAC and the data to be written are used to build the ODS to be written. The ODS is written using the GENERATE AC command, as at 2108. The operator terminal appends the necessary data elements as specified by the DSDOL (including the ODS) to the Generate AC command data. Upon receipt of the GENERATE AC command, the card computes its own version of the new Summary (based on the Summary that corresponds to the already stored ODS) and stores it together with the newly received ODS in the relevant slot, as in 2110.

Data Reading: the data reading protocol is illustrated in the bottom part of FIG. 21. The relevant OID is provided to the card in the command data of the GET PROCESSING OPTIONS command. The card, if it holds an ODS for that OID returns it in the response to this command at 2112, avoiding the need to perform GET DATA operations. The Summary that corresponds to the ODS is also returned at the same time. The operator terminal recovers the data read and the relevant MAC from the ODS. The operator terminal may verify the authenticity of the data read by validating that the operator-proprietary MAC, based on the data read and on the Summary, at 2114. The operator terminal may also verify that the data read is not returned by another card than the genuine card it was originally stored on. This is done by executing a standard EMV GENERATE AC command at 2116 with generation of a CDA signature. As no write operation is involved the operator terminal does not append any data elements as specified by the DSDOL (including the ODS) to the GENERATE AC command data. When used on an operator terminal relying on data storage functionality, the card generates a CDA signature in 2118 for every type of application cryptogram (including AAC) and includes the relevant Summary in the input to the CDA signature process. The operator terminal, at 2122 verifies the CDA signature from 2120, based on its own calculation of the Summary.

Figure 22:
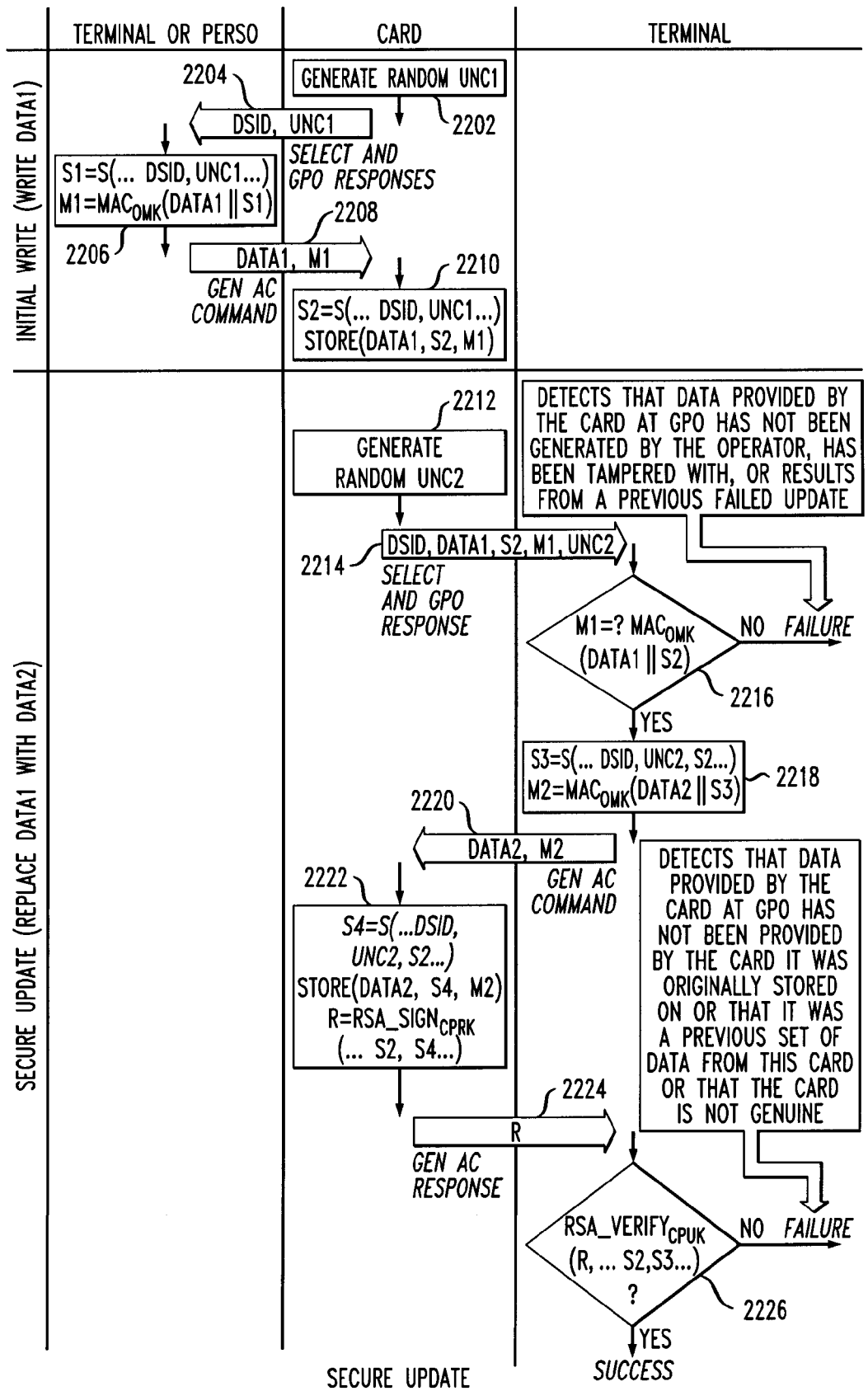
FIG. 22 depicts an exemplary secure update.

Data Update: the data update protocol is illustrated in FIG. 22. The skilled artisan will appreciate that the data update protocol illustrated in FIG. 22 requires that at some previous time data had been written to the card, either at personalization, or through the Data Writing process described above. This is illustrated by steps 2202-2210 which match steps 2102-2110 described above and thus do not require separate description. The relevant OID is provided to the card in the command data of the GET PROCESSING OPTIONS command. The card returns the ODS for that OID in the response to this command avoiding the need to perform GET DATA operations. The Summary that corresponds to the already stored ODS is also returned at the same time. The GET PROCESSING OPTIONS response also includes the UNC. See 2212, 2214. The operator terminal recovers the data read and the relevant MAC from the ODS. The operator terminal may verify the authenticity of the data read by validating that proprietary MAC, based on the data read and the Summary, as per 2216. The operator terminal computes a new Summary, in 2218, on the UNC and on the received Summary. That new Summary is input, together with the data to be written, to the computation of the operator-proprietary MAC, in 2218. That MAC and the data to be written are used to build the ODS to be written. The ODS is written using the GENERATE AC command at 2220. The operator terminal appends the necessary data elements as specified by the DSDOL (including the ODS) to the GENERATE AC command data. The operator terminal may also verify that the data read is not returned by another card than the genuine card it was originally stored on. This is done by executing a standard EMV GENERATE AC command with generation of a CDA signature. When used on an operator terminal relying on data storage functionality, cards do generate a CDA signature and include the Summary in the input to the CDA signature process. When used on an operator terminal relying on data storage functionality, the card generates a CDA signature for every type of application cryptogram (including AAC) and includes the relevant Summary in the input to the CDA signature process. The operator terminal verifies the CDA signature, which input includes the Summary. Calculation of S4 by the card, with subsequent storage, is shown at 2222, based on the GENERATE AC response 2224. Failure of decision block 2226 indicates the aforementioned condition wherein the data read is returned by another card than the genuine card it was originally stored on (or was a previous set of data from this card or that the card is not genuine).

Skimming Controls: copying and cloning as well as wedge attacks are prevented through the combination of the following mechanisms:

Validation of the DSID (built from the PAN and PSN) against the PAN and PSN actually retrieved from the ICC certificate (which authenticity is checked through the validation of the EMV certificate chain)

Inclusion of critical data, including the DSID and the UNC, in the input to the Summary computation Validation by the operator terminal of an operator-proprietary MAC computed on the concatenation of the ODS and the Summary Inclusion of both a Summary for the data read and a Summary for the data written in the CDA signature computation as part of the ICC Dynamic Data.

Tampering of the communication between operator terminal and card is detected as part of the CDA verification. In case the transaction is interrupted during the CDA process, normal clearing processing takes place, under the assumption that the card has stored the received data and that only the card with the PAN and PSN (PAN sequence number) corresponding to the DSID (data storage ID) may make use of that data.

The one-way function used for computing the Summary is described elsewhere herein. Part of the input to that one-way function is the previous value of the Summary, as stored on the card and retrieved by the operator terminal. Other input data used in the Summary computation include transaction details, the DSID and the UNC.

It might be the case that at this stage the operator terminal realizes that the data read (and on which the updated data provided to the card was based on) originated from another card than the genuine card it was originally stored on. Clearly, the updated data has already been written by the card in the relevant slot. However, this will be detected by the MAC validation at the next secure read or update. That is because the Summary is part of the MACed data and the Summary calculation uses as input the Summary computed on data initially read. In such a case the operator terminal-computed Summary (based on the previous Summary provided by the fraudulent card) and the card-computed Summary (based on the card-stored previous Summary) will differ. Hence the MAC will not verify successfully.

FIG. 21 illustrates the skimming control mechanism applied to a read operation using an operator-proprietary Message Authentication Code function MAC and an operator secret key OMK. The card features a private RSA key CPRK corresponding to a public key CPUK which has been retrieved and authenticated by the operator terminal using the EMV certificate chain. FIG. 22 illustrates the skimming control mechanism applied to an update operation using an operator-proprietary Message Authentication Code function MAC and an operator secret key OMK.

Conditional Write As part of the GENERATE AC command, the card performs card risk management activities and decides on a type of application cryptogram (TC, ARQC or AAC). The card does not store the ODS provided if the type of application cryptogram provided by the card is different from the type application cryptogram requested by the operator terminal. In addition, the card declines a transaction if the operator labels the data as critical and the data storage fails. Other input to that function includes transaction details (amount, currency code).

Write Controls: write controls are designed to prevent unauthorized overwriting of data. The write controls work by having, for each write operation, the operator terminal demonstrating the authority to update the relevant slot by revealing a value to the card. That value is the preimage corresponding to the Digest, that is, the result of a one-way function stored in the relevant slot of the card at the previous write operation. The card applies the one-way function to the operator terminal-provided preimage and proceeds with writing if and only if the result matches the digest stored in the card. Writing involves storage of both the ODS and another operator terminal-provided output of the one-way function to be used for write control at next write operation. Requirements for proper operation of such write controls are as follows:

The preimage can be recreated from card returned data by the operator terminal. This allows successive data storage operations to be performed by independent, offline operator terminals.

Preimage varies unpredictably. It cannot be predicted from eavesdropping one or several transactions performed with a given card which preimage will be required in any subsequent transaction performed with the same card.

Preimage is card-dependent. It cannot be predicted from eavesdropping one or several transactions performed with a card which preimage will be required in any subsequent transaction performed with another card. This is especially relevant when initial data is set.

Preimages are released confidentiality-protected and to authenticated cards only, in order to prevent pre-images to be received with fraudulent card or a wedge device then used with a genuine card.

Comments will now be provided on one exemplary and non-limiting form of a one-way function used for computing Digest from an 8-byte input block. The technique is based on triple DES (Triple Data Encryption Algorithm (TDEA) block cipher). The Digest calculation uses two keys. The technique uses a 12 byte data element called DSPK (Data Storage Partial Key). The value of this data element is derived from the Data Storage Identifier (DS_ID) which is an identifier that is included in the File Control Information of the application so that the terminal retrieves this data element as part of the application selection. The value of DSPK is personalized in the card during personalization and calculated from DS_ID by the terminal when required. DSPK is calculated from DS_ID as follows:

DSPK[i]:=((DS_ID[i] div 16)×10+(DS_ID[i] mod 16))×2, for i=1, 2, . . . , 6 DSPK[6+i]:=((DS_ID[PL−6+i] div 16)×10+(DS_ID[PL−6+i] mod 16))×2, for i=1, 2, . . . , 6 where PL is the number of bytes in the card's PAN+1

The Digest is calculated from the 8 byte Input in three steps:
a. A temporary block of eight bytes is created by the X-ORing the Input and the Operator ID (OID)
b. Two temporary DES are created. The first key is formed by taking the first six bytes of DSPK followed by the $5^{th}$ and $6^{th}$ bytes of the OID. The second key is formed by taking the last six bytes of DSPK followed by the $7^{th}$ and $8^{th}$ bytes of the OID.
c. The temporary block is encrypted using two key triple DES with the two temporary DES keys and the result is X-ORed with the initial temporary block to produce the Digest.

The 8-byte input to that one-way function (the preimage) is operator-specific. However, it is anticipated that the operator will cryptographically derive the preimage (using a secret key shared by all operator terminals) from the operator data (which includes the operator-generated MAC).

The operator terminal regenerates the preimage to be revealed from the data returned by the card in the GET PROCESSING OPTIONS response.

Similarly, the next preimage is cryptographically derived from the new data that is to be written to the card.

The first three requirements above are met, since:

The preimage is cryptographically derived from the data which is returned by the card in the GET PROCESSING OPTIONS response.

The preimage is calculated from the data using a secret key and the data includes a MAC calculated using the Summary and the Summary is in turn based on the card-generated UNC, which varies unpredictably at each transaction.

The preimage is calculated from the data using a secret key and the data includes a MAC calculated using the Summary and the Summary is in turn based on the DSID which is card dependent.

The last requirement is not met by the exemplary implementation of the write controls, meaning that there is a residual risk of wedge device attacks on the write controls functionality. The complexity of supporting that requirement is believed to outweigh the risks, as even if successfully performed by an attacker it would only result in data destruction, not the ability to create "bogus" data. A possible mitigation measure could be the obfuscation of the presence of an operator's data. The Operator ID given to the card to select the slot may be diversified by the operator from the card's identity meaning that it is not possible to determine externally whether the card is or is not holding data for a given operator.

Figure 23:
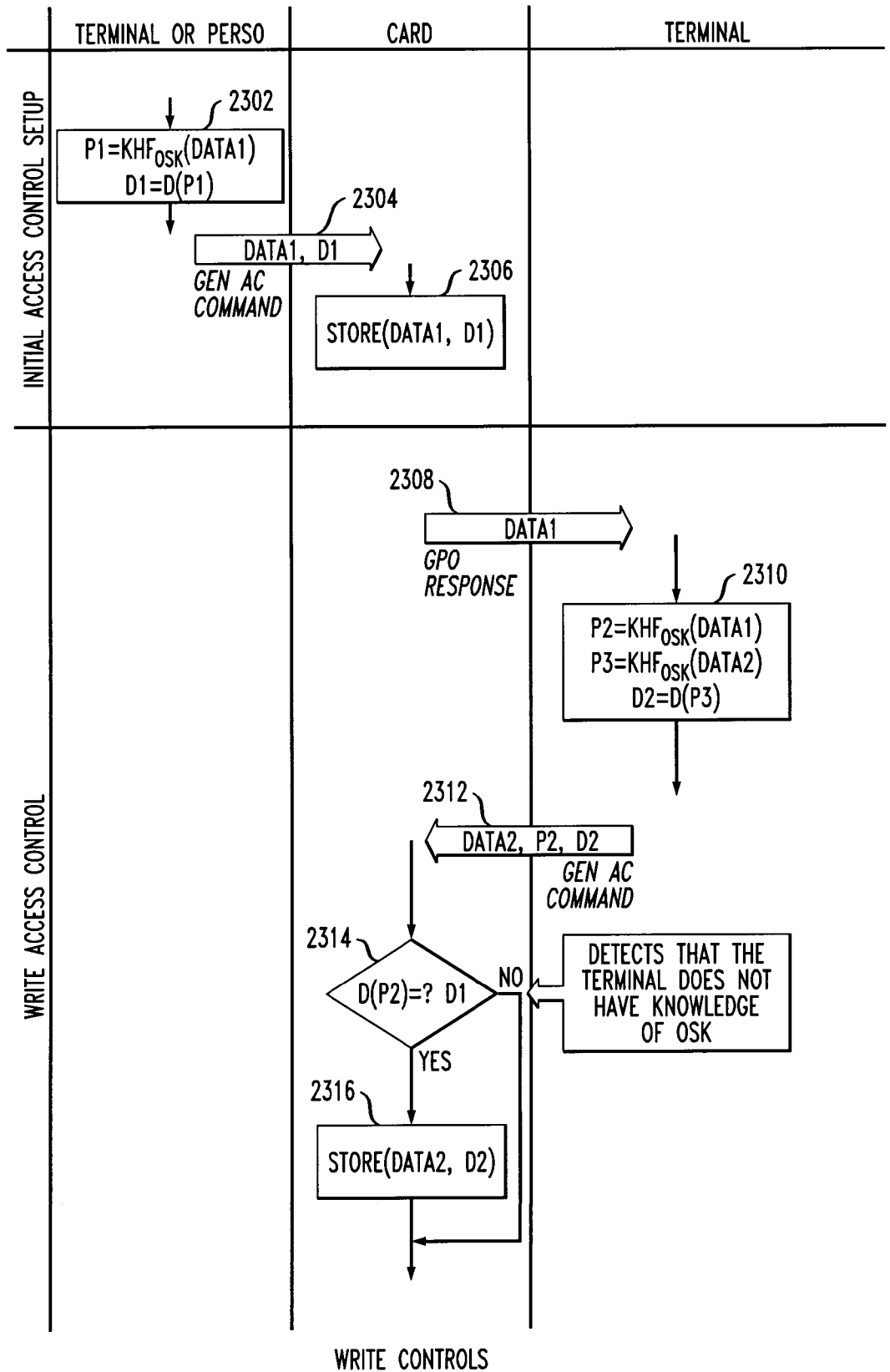
FIG. 23 depicts exemplary write controls.

FIG. 23 illustrates the exemplary write control mechanism which uses a cryptographic keyed hash function (KHF) and an operator secret key (OSK). Steps 2302, 2304, and 2306 depict initial access control setup. Steps 2308, 2310, 2312, 2314, and 2316 depict write access control. The skilled artisan will appreciate that the security mechanisms described herein to bind the payment and the data storage can, given the teachings herein, easily be combined with other traditional read or write access control mechanisms that are well known in the industry.

During the initialization of the access control the operator creates a first set of operator data (DATA1) and calculates a corresponding first preimage (P1) using a cryptographic keyed hash function (KHF) and the operator's secret key (OSK) (illustrated as P1=KHF$_{OSK}$(DATA1) in step 2302). The operator calculates a first Digest (D1) from this preimage using the specified one-way function for calculating the Digest (illustrated as D1=D(P1) in step 2302).

The first set of operator data (DATA1) and the first Digest (D1) are written to the card either by the operator using the GENERATE AC command (as illustrated in step 2304) or by sending them to the card issuer to store in the card during personalization. The operator is able to write this data freely if write access control has not yet been established by the card issuer.

The card stores this first set of data (DATA1) for subsequent read operations and stores the first Digest (D1) which establishes the write access control, as per 2306.

Now that write access control has been established subsequent data writes need to demonstrate knowledge of the correct preimage that calculates the currently stored Digest value (D1).

When an operator wishes to write new data they must first read the data that is currently stored, as per step 2308, and re-calculate the preimage that corresponds to this data (illustrated as P2=KHF$_{OSK}$(DATA1) in step 2310). The operator also calculates a new preimage (P3) from the new data to be written (DATA2) and calculates a new Digest (D2) from this new preimage (P3) as shown in step 2310.

The new data to be written (DATA2) is sent to the card in the Generate AC command along with the preimage (P2) that should correspond to the currently stored Digest (D1) and the new Digest (D2) as shown in step 2312.

The card uses the specified one-way function for calculating the Digest to calculate the Digest corresponding to the supplied preimage (P2). It then checks that this Digest matches the Digest currently stored by the card (D1) as shown in step 2314. If the card calculated Digest matches the currently stored Digest (D1) then the write access control has been satisfied and the new data (DATA2) is stored by the card along with the new Digest (D2) from the operator as shown in step 2316. Otherwise the new data and Digest are not stored and the card retains the original data (DATA 1) and Digest (D1)

As only the operator that originally stored the Digest (D1) knows the corresponding preimage (P1) only they can write new data to the slot.

The table of FIG. 24 summarizes security mechanism coverage.

In the case of data storage, access to permanent slots will require some form of issuer/operator agreement, allowing for a suitable (yet indirect) level of control to be maintained.

Privacy concerns may be mitigated by means of operator ID (OID) diversification based on the data storage ID (DSID). Such a diversification needs to be subject to a prior agreement between the issuer and the operator.

When an operator terminal attempting to write an operator data set (ODS) does not receive a response to the GENERATE AC command or experiments a CDA verification failure, it cannot conclude on whether the ODS has been properly stored by the card or not. In such a case, and if a financial transaction is involved, the terminal does not have any other option than submitting a clearing record for the affected transaction (despite not having received a valid TC), hoping that the issuer will not be issuing a chargeback.

As noted, one or more embodiments make use of the aforementioned EMV specifications. The skilled artisan will appreciate that EMV has a public key management infrastructure designed for authentication of payment cards to payment terminals without provision for authenticating payment terminals to payment cards. The skilled artisan will also appreciate that the EMV specifications allow the card to specify through Data Object Lists (DOLS) which data elements should be provided by the terminal to the card in the GET PROCESSING OPTIONS and the GENERATE AC commands. They will also appreciate that additional proprietary data elements may be added to the ICC Dynamic Data that is included in the card's CDA signature.

It should be noted that one or more embodiments of the invention (for example, as described with respect to FIGS. 13-24) deliver considerable performance benefits (e.g. the data is read with the GET PROCESSING OPTIONS command and written with the GENERATE AC command so that additional GET DATA and PUT DATA commands are not required).

As discussed elsewhere herein, some embodiments include steps of facilitating interrogation of the electronic device by the first terminal to obtain a transaction counter, an electronic device identifier, and an electronic device-generated random number; facilitating calculation of an authentication code based on the e-merchandise related information, the transaction counter, the electronic device identifier, and the electronic device-generated random number; and facilitating detection of replay fraud via the transaction counter and the device-generated random number. The steps of facilitating interrogation, calculation, and detection are carried out substantially without key sharing with the electronic device. It should be noted that in other embodiments, the ATC can be omitted as it isn't really required if the card is generating and returning a random number; in such embodiments, it is not necessary to use the ATC the random number is employed.

In one or more instances, for basic security the minimum that is required is one of (the account number or device identity) and one of (the ATC transaction counter or a card generated random number). This minimum basic security can then be enhanced by including more transaction and/or context related data items; e.g., the amount etc. Then this can be further enhanced by hashing together all these relevant data items so they do not all need to be stored and returned with the data when it is read but only the hash result needs to be stored and returned with the data.

By way of review, FIG. 3 and its accompanying text describe a first embodiment of security processing. In the embodiment shown in FIG. 3, the e-merchandise (and its associated MAC calculation 310) includes the PAN and ATC, these are transmitted to the card along with the rest of the e-merchandise, and the card processing verifies that these values match the card's current values 312 and refuses to store the data if they are not correct, at 316.

FIG. 7 and its accompanying text describe a second embodiment of security processing. In the embodiment shown in FIG. 7, the e-merchandise MAC calculation includes the Card ID, ATC and RND as at 709, however these are not transmitted to the card (the Card ID field is not included at all and the ATC and RND fields are replaced with FFs), the card does not check the ATC and RND fields but instead just stores the values it already knows, as at 715, with the data. If the terminal and card used different values because they had been interfered with then the verification of the MAC will fail when the data is read.

In another embodiment, techniques similar to those of FIG. 7 are employed, with certain differences. First, the ATC is not used as it is not needed when the RND is available; second, additional transaction and/or context data is included to gain additional security benefits (e.g. the amount and so on); and third, rather than needing to store (and later return) all these many data items, they are hashed together to form the "summary" which is used instead in the MAC calculation and stored by the card (and later returned when the data is read). Furthermore, in at least some cases, refrain from sending FFs in place of the data items (or the summary) to the card as it is a waste of time and/or bandwidth.

Given the discussion thus far, it will be appreciated that, in general terms, an exemplary embodiment of a method for integrated payment and electronic merchandise transfer via: (i) a payment infrastructure, configured in accordance with a payment specification, in association with (ii) an electronic merchandise infrastructure (which method can be implemented in whole or in part by one or more computers and/or other processors) according to one aspect of the invention, includes the step of facilitating interrogation of an electronic device by a first terminal to obtain an account number associated with the electronic device. The electronic device is configured according to the payment specification. The first terminal has a first terminal payment module 212 configured according to the payment specification and a first terminal electronic merchandise module 214 configured according to the electronic merchandise infrastructure and coupled to the first terminal payment module to permit transfer of non-payment e-merchandise related information from the first terminal electronic merchandise module to the first terminal payment module. The interrogation of the electronic device is performed by the first terminal payment module.

The method also includes facilitating generation of the non-payment e-merchandise related information by the first terminal electronic merchandise module; and facilitating transfer of the non-payment e-merchandise related information from the first terminal electronic merchandise module to the electronic device via the first terminal payment module, within a transaction between the electronic device and the first terminal payment module that is conducted in accordance with the payment specification (and optionally, also in accordance with the account number). The non-payment e-merchandise related information is stored on the electronic device in accordance with the payment specification. The method further includes facilitating the electronic device and the first terminal independently calculating a summary data item as described elsewhere herein; and facilitating the first terminal calculating a first message authentication code based on the non-payment e-merchandise related information and a terminal-calculated value of the summary data item, as per step 2106. The non-payment e-merchandise related information is stored on the electronic device together with a electronic device-calculated value of the summary data item and the first message authentication code.

In some instances, additional steps include facilitating interrogation of the electronic device by a second terminal to obtain the non-payment e-merchandise related information, the electronic device-calculated value of the summary data item and the first message authentication code, as at 2112; as well as facilitating the second terminal calculating a second message authentication code based on the non-payment e-merchandise related information and the electronic device-calculated value of the summary data item, and facilitating the second terminal determining whether the first and second message authentication codes match, as at 2114. Responsive to the first and second message authentication codes not matching, it can be determined that the non-payment e-merchandise related information obtained by the second terminal is illicit. The first and second terminals can be the same terminal or different terminals.

In some instances, additional steps includes facilitating the second terminal obtaining a Combined Data Authentication signature from the electronic device, based at least in part on the electronic device-calculated value of the summary data item, as at 2116, 2118, and 2120; as well as facilitating the second terminal verifying the combined data authentication signature from the electronic device, based at least in part on a value of the summary data item calculated by the second terminal, as at 2122.

The summary data item can include a hash of at least an identifier of the electronic device, a random number generated by the electronic device, and an amount of the transaction. The summary data item has also been referred to herein as a summary and has been described in several examples including FIG. 18. The identifier of the electronic device can include the account number and/or a device identity of the electronic device.

In some instances, there is an entitlement to vouchers and those vouchers are the e-merchandise; furthermore, some instances may involve loyalty scheme membership and associated loyalty points are the e-merchandise.

In another aspect, an exemplary embodiment of a method (which method can be implemented in whole or in part by one or more computers and/or other processors) for integrated payment and electronic merchandise transfer via: (i) a payment infrastructure, configured in accordance with a payment specification, in association with (ii) an electronic merchandise infrastructure, includes the step of facilitating interrogation of an electronic device by a first terminal to obtain an account number associated with the electronic device. The electronic device is configured according to the payment specification. The first terminal has a first terminal payment module configured according to the payment specification and a first terminal electronic merchandise module configured according to the electronic merchandise infrastructure and coupled to the first terminal payment module to permit transfer of non-payment e-merchandise related information from the first terminal electronic merchandise module to the first terminal payment module. The interrogation of the electronic device is performed by the first terminal payment module. The method also includes facilitating generation of the non-payment e-merchandise related information by the first terminal electronic merchandise module; and facilitating transfer of the non-payment e-merchandise related information from the first terminal electronic merchandise module to the electronic device via the first terminal payment module, within a transaction between the electronic device and the first terminal payment module that is conducted in accordance with the payment specification (and optionally, also in accordance with the account number). The non-payment e-merchandise related information is stored on the electronic device in accordance with the payment specification. Furthermore, the method includes facilitating interrogation of the electronic device by the first terminal to obtain at least one of a transaction counter and an electronic device-generated random number; as well as at least one of the account number and a device identity of the electronic device. Still further steps include facilitating calculation of a message authentication code based on the e-merchandise related information, the at least one of the transaction counter and the electronic device-generated random number, and the at least one of the account number and the device identity of the electronic device; and facilitating detection of irregularity via the message authentication code. This aspect has been discussed, for example, in connection with the modified FIG. 7 technique.

The skilled artisan will appreciate that "MAC" stands for message authentication code. The abbreviation MAC can be employed to help prevent confusion with application cryptograms. The terms cryptographic message authentication code or message authentication cryptograms could be employed if alternative terminology were desired.

System and Article of Manufacture Details

Figure 12:
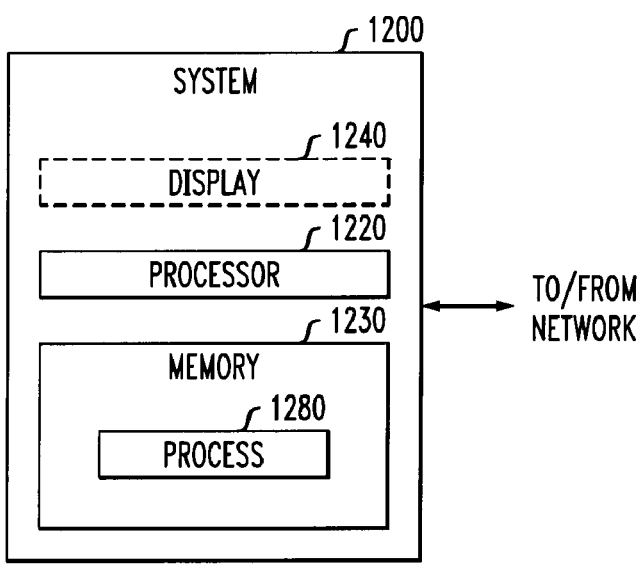
FIG. 12 is a block diagram of an exemplary computer system useful in one or more embodiments of the present invention.

Embodiments of the invention can employ hardware and/or hardware and software aspects. Software includes but is not limited to firmware, resident software, microcode, etc. Software might be employed, for example, in connection with a terminal 122, 124, 126, 134, 206, 208. Firmware might be employed, for example, in connection with payment devices such as cards 102, 112, 1302. FIG. 9 is a block diagram of a system 900 that can implement part or all of one or more aspects or processes of the present invention. As shown in FIG. 12, memory 1230 configures the processor 1220 (which could correspond, e.g., to processor portions 106, 116) to implement one or more aspects of the methods, steps, and functions disclosed herein (collectively, shown as process 1280 in FIG. 12). The memory 1230 could be distributed or local and the processor 1220 could be distributed or singular. The memory 1230 could be implemented as an electrical, magnetic or optical memory, or any combination of these or other types of storage devices (including memory portions as described above with respect to cards 102, 112). It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware. Display 1240 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on elements 102, 112, 142, 122, 124, 126, 134, 140, 206, 208, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 126, 134, 206, 208 or payment devices such as cards 102, 112, 1302 can make use of computer technology with appropriate instructions to implement method steps described herein. By way of further example, a terminal apparatus 122, 124, 126, 134, 206, 208 could include a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card).

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1200 as shown in FIG. 12) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for integrated payment and electronic merchandise transfer via: (i) a payment infrastructure, configured in accordance with a payment specification, in association with (ii) an electronic merchandise infrastructure, comprising the steps of:

facilitating interrogation of an electronic device by a first terminal to obtain an account number associated with said electronic device, said electronic device being configured according to the payment specification, said first terminal having a first terminal payment module configured according to the payment specification and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;

facilitating generation of said non-payment e-merchandise related information by said first terminal electronic merchandise module;

facilitating transfer of said non-payment e-merchandise related information from said first terminal electronic merchandise module to said electronic device via said first terminal payment module, within a transaction between said electronic device and said first terminal payment module that is conducted in accordance with said payment specification, said non-payment e-merchandise related information being stored on said electronic device in accordance with said payment specification;

facilitating said electronic device and said first terminal independently calculating a summary data item; and facilitating said first terminal calculating a first message authentication code based on said non-payment e-merchandise related information and a terminal-calculated value of said summary data item;

wherein said non-payment e-merchandise related information is stored on said electronic device together with an electronic device-calculated value of said summary data item and said first message authentication code.

2. The method of claim 1, further comprising:

facilitating interrogation of said electronic device by a second terminal to obtain said non-payment e-merchandise related information, said electronic device-calculated value of said summary data item and said first message authentication code facilitating said second terminal calculating a second message authentication code based on said non-payment e-merchandise related information and said electronic device-calculated value of said summary data item;

facilitating said second terminal determining whether said first and second message authentication codes match; and responsive to said first and second message authentication codes not matching, determining that said non-payment e-merchandise related information obtained by said second terminal is illicit.

3. The method of claim 2, wherein said first and second terminals are the same.

4. The method of claim 2, wherein said first and second terminals are different.

5. The method of claim 2, further comprising:

facilitating said second terminal obtaining a Combined Data Authentication signature from said electronic device, based at least in part on said electronic device-calculated value of said summary data item;

facilitating said second terminal verifying said combined data authentication signature from said electronic device, based at least in part on a value of said summary data item calculated by said second terminal.

6. The method of claim 1, wherein in said step of facilitating interrogation:

profile data pertaining to a holder of said electronic device is obtained; and said e-merchandise related information is generated by said first terminal electronic merchandise module based on said profile data.

7. The method of claim 6, wherein said profile data includes information identifying said holder of said electronic device as a member of a class having at least one of a plurality of entitlement categories associated therewith, said entitlement categories relating to said e-merchandise.

8. The method of claim 7, wherein said entitlement categories comprise transportation fare categories and said e-merchandise related information comprises transportation ticket information.

9. The method of claim 1, wherein said steps are executed in connection with entrance of a holder to a controlled access system and said e-merchandise related information comprises initial entry point information.

10. The method of claim 1, wherein said summary data item comprises a hash of at least an identifier of said electronic device, a random number generated by said electronic device, and an amount of said transaction.

11. The method of claim 10, wherein said identifier of said electronic device comprises at least one of said account number and a device identity of said electronic device.

12. The method of claim 1, wherein said e-merchandise related information comprises voucher information.

13. The method of claim 1, wherein said e-merchandise related information comprises loyalty point information.

14. A method for integrated payment and electronic merchandise transfer via: (i) a payment infrastructure, configured in accordance with a payment specification, in association with (ii) an electronic merchandise infrastructure, comprising the steps of facilitating interrogation of an electronic device by a first terminal to obtain an account number associated with said electronic device, said electronic device being configured according to the payment specification, said first terminal having a first terminal payment module configured according to the payment specification and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;

facilitating generation of said non-payment e-merchandise related information by said first terminal electronic merchandise module;

facilitating transfer of said non-payment e-merchandise related information from said first terminal electronic merchandise module to said electronic device via said first terminal payment module, within a transaction between said electronic device and said first terminal payment module that is conducted in accordance with said payment specification, said non-payment e-merchandise related information being stored on said electronic device in accordance with said payment specification;

facilitating interrogation of said electronic device by said first terminal to obtain:

at least one of a transaction counter and an electronic device-generated random number; and at least one of said account number and a device identity of said electronic device;

facilitating calculation of an authentication code based on said e-merchandise related information, said at least one of said transaction counter and said electronic device-generated random number, and said at least one of said account number and said device identity of said electronic device; and facilitating detection of irregularity via said authentication code.

15. A terminal for integrated payment and electronic merchandise transfer via: (i) a payment infrastructure, configured in accordance with a payment specification, in association with (ii) an electronic merchandise infrastructure and in conjunction with an electronic device configured according to the payment specification, said terminal comprising:

a payment module configured according to the payment specification and configured to interrogate the electronic device to obtain an account number associated with said electronic device; and an electronic merchandise module configured according to the electronic merchandise infrastructure and coupled to said payment module to permit transfer of non-payment e-merchandise related information from said electronic merchandise module to said payment module, said electronic merchandise module being configured to facilitate processing of said non-payment e-merchandise related information;

wherein said payment module is further configured to facilitate transfer of said non-payment e-merchandise related information to the electronic device, in a transaction between the electronic device and said payment module that is conducted in accordance with said payment specification, said non-payment related e-merchandise related information being stored on said electronic device in accordance with said payment specification; and wherein said payment module and said electronic merchandise module are cooperatively configured to:
  facilitate said electronic device and said first terminal independently calculating a summary data item; and
  facilitate said first terminal calculating a first message authentication code based on said non-payment e-merchandise related information and a terminal-calculated value of said summary data item;
wherein said non-payment e-merchandise related information is stored on said electronic device together with a electronic device-calculated value of said summary data item and said first message authentication code.

16. The terminal of claim 15, wherein said payment module and said electronic merchandise module are further cooperatively configured to:
  facilitate interrogation of said electronic device to obtain said non-payment e-merchandise related information, said electronic device-calculated value of said summary data item and said first message authentication code;
  facilitating calculating a second message authentication code based on said non-payment e-merchandise related information and said electronic device-calculated value of said summary data item;
  facilitating determining whether said first and second message authentication codes match; and
  responsive to said first and second message authentication codes not matching, determining that said non-payment e-merchandise related information obtained by said terminal is illicit.

17. The terminal of claim 16, wherein said payment module and said electronic merchandise module are further cooperatively configured to:
  facilitate obtaining a combined data authentication signature from said electronic device, based at least in part on said electronic device-calculated value of said summary data item; and
  facilitate verifying said combined data authentication signature from said electronic device, based at least in part on a value of said summary data item calculated by said second terminal.

18. An electronic device for facilitating integrated payment and electronic merchandise transfer via: (i) a payment infrastructure, configured in accordance with a payment specification, in association with (ii) an electronic merchandise infrastructure, said electronic device being configured according to the payment specification, said electronic device comprising:
  a memory; and
  at least one processor coupled to said memory, said processor being operative to:
    facilitate interrogation of said electronic device by a first terminal to obtain an account number associated with said electronic device, said first terminal having a first terminal payment module configured according to the payment specification and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;
    facilitate generation of said non-payment e-merchandise related information by said first terminal electronic merchandise module;
    facilitate transfer of said non-payment e-merchandise related information from said first terminal electronic merchandise module to said electronic device via said first terminal payment module, within a transaction between said electronic device and said first terminal payment module that is conducted in accordance with said payment specification, said non-payment e-merchandise related information being stored on said electronic device in accordance with said payment specification;
    facilitate said electronic device and said first terminal independently calculating a summary data item; and
    facilitate said first terminal calculating a first message authentication code based on said non-payment e-merchandise related information and a terminal-calculated value of said summary data item;
  wherein said non-payment e-merchandise related information is stored on said electronic device together with a electronic device-calculated value of said summary data item and said first message authentication code.

19. The electronic device of claim 18, wherein said at least one processor is further operative to:
  facilitate interrogation of said electronic device by a second terminal to obtain said non-payment e-merchandise related information, said electronic device-calculated value of said summary data item and said first message authentication code
  facilitate said second terminal calculating a second message authentication code based on said non-payment e-merchandise related information and said electronic device-calculated value of said summary data item;
  facilitate said second terminal determining whether said first and second message authentication codes match; and
  responsive to said first and second message authentication codes not matching, facilitate determining that said non-payment e-merchandise related information obtained by said second terminal is illicit.

20. The electronic device of claim 19, wherein said at least one processor is further operative to:
  facilitate said second terminal obtaining a combined data authentication signature from said electronic device, based at least in part on said electronic device-calculated value of said summary data item; and
  facilitate said second terminal verifying said combined data authentication signature from said electronic device, based at least in part on a value of said summary data item calculated by said second terminal.

21. A computer program product comprising a tangible computer readable recordable storage medium including computer usable program code for integrated payment and electronic merchandise transfer via: (i) a payment infrastructure, configured in accordance with a payment specification, in association with (ii) an electronic merchandise infrastructure, said computer program product including:
- computer usable program code for facilitating interrogation of an electronic device by a first terminal to obtain an account number associated with said electronic device, said electronic device being configured according to the payment specification, said first terminal having a first terminal payment module configured according to the payment specification and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;
- computer usable program code for facilitating generation of non-payment e-merchandise related information by said first terminal electronic merchandise module;
- computer usable program code for facilitating transfer of said non-payment e-merchandise related information from said first terminal electronic merchandise module to said electronic device via said first terminal payment module, within a transaction between said electronic device and said first terminal payment module that is conducted in accordance said payment specification, said non-payment e-merchandise related information being stored on said electronic device in accordance with said payment specification;
- computer usable program code for facilitating said electronic device and said first terminal independently calculating a summary data item; and
- computer usable program code for facilitating said first terminal calculating a first message authentication code based on said non-payment e-merchandise related information and a terminal-calculated value of said summary data item;
- wherein said non-payment e-merchandise related information is stored on said electronic device together with a electronic device-calculated value of said summary data item and said first message authentication code.

22. A system for integrated payment and electronic merchandise transfer via: (i) a payment infrastructure, configured in accordance with a payment specification, in association with (ii) an electronic merchandise infrastructure, comprising:
- means for facilitating interrogation of an electronic device by a first terminal to obtain an account number associated with said electronic device, said electronic device being configured according to the payment specification, said first terminal having a first terminal payment module configured according to the payment specification and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;
- means for facilitating generation of said non-payment e-merchandise related information by said first terminal electronic merchandise module;
- means for facilitating transfer of said non-payment e-merchandise related information from said first terminal electronic merchandise module to said electronic device via said first terminal payment module, within a transaction between said electronic device and said first terminal payment module that is conducted in accordance with said payment specification, said non-payment e-merchandise related information being stored on said electronic device in accordance with said payment specification;
- means for facilitating said electronic device and said first terminal independently calculating a summary data item; and
- means for facilitating said first terminal calculating a first message authentication code based on said non-payment e-merchandise related information and a terminal-calculated value of said summary data item;
- wherein said non-payment e-merchandise related information is stored on said electronic device together with a electronic device-calculated value of said summary data item and said first message authentication code.

* * * * *